US012724491B2

(12) United States Patent
Barachant et al.

(10) Patent No.: US 12,724,491 B2
(45) Date of Patent: Sep. 1, 2026

(54) POWER-EFFICIENT PROCESSING OF NEUROMUSCULAR SIGNALS TO CONFIRM OCCURRENCES OF USER GESTURES, AND SYSTEMS AND METHODS OF USE THEREOF

(71) Applicant: Meta Platforms Technologies, LLC, Menlo Park, CA (US)

(72) Inventors: Alexandre Barachant, Brooklyn, NY (US); Bijan Treister, Brooklyn, NY (US); Shan Chu, Syosset, NY (US); Igor Gurovski, Mountain View, CA (US); Chetan Parag Gupta, New York, NY (US); Tahir Turan Caliskan, Lund (SE); Pascal Alexander Bentioulis, Malmo (SE); Viswanath Sivakumar, San Francisco, CA (US); Zhong Zhang, Santa Clara, CA (US); Ramzi Elkhater, San Marcos, CA (US); Maciej Lazarewicz, Hamel, MN (US); Per-Erik Bergstrom, Malmo (SE); Peter Andrew Matsimanis, Menlo Park, CA (US); Chengyuan Yan, San Bruno, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 172 days.

(21) Appl. No.: 18/470,306

(22) Filed: Sep. 19, 2023

(65) Prior Publication Data

US 2024/0168567 A1 May 23, 2024

Related U.S. Application Data

(60) Provisional application No. 63/426,678, filed on Nov. 18, 2022.

(51) Int. Cl.
*G06F 3/01* (2006.01)
*G06F 1/16* (2006.01)
*G06F 1/3231* (2019.01)

(52) U.S. Cl.
CPC .............. *G06F 3/017* (2013.01); *G06F 1/163* (2013.01); *G06F 1/3231* (2013.01); *G06F 3/015* (2013.01)

(58) Field of Classification Search
CPC ........ G06F 3/017; G06F 1/163; G06F 1/3231; G06F 3/015; G06F 1/1686; G06F 1/1694;
(Continued)

(56) References Cited

U.S. PATENT DOCUMENTS 11,467,675 B1 * 10/2022 Hooker .................. G06F 3/017
2021/0342002 A1 * 11/2021 Schick .................. G06F 1/3293
2022/0276723 A1 * 9/2022 Sirois .................. H04R 1/1041

OTHER PUBLICATIONS

European Search Report for European Patent Application No. 23207004.5, dated Feb. 29, 2024, 12 pages.
(Continued)

*Primary Examiner* — Phuong H Nguyen
(74) *Attorney, Agent, or Firm* — Morgan, Lewis & Bockius LLP

(57) ABSTRACT

The various implementations described herein include methods and systems for power-efficient processing of neuromuscular signals. In one aspect, a method includes: (i) obtaining a first set of neuromuscular signals; (ii) after determining, using a low-power detector, that the first set of neuromuscular signals require further processing to confirm that a predetermined in-air hand gesture has been performed: (a) processing the first set of neuromuscular signals using a high-power detector; and (b) in accordance with a determination that the processing indicates that the predetermined in-air hand gesture did occur, registering an occurrence of the predetermined in-air hand gesture; (iii) receiving a
(Continued)

second set of neuromuscular signals; and (iv) after determining, using the low-power detector and not using the high-power detector, that a different predetermined in-air hand gesture was performed, performing an action in response to the different predetermined in-air hand gesture.

20 Claims, 38 Drawing Sheets

(58) Field of Classification Search
CPC .......... G06F 1/325; G06F 3/011; G06F 3/014; G06F 3/016; G06F 3/03547; G06F 3/0482; G06F 3/04842
See application file for complete search history.

(56) References Cited

OTHER PUBLICATIONS

Office Action mailed Dec. 19, 2025 for European Patent Application No. 23207004.5, filed on Oct. 31, 2023, 7 pages.

* cited by examiner

| Neuromuscular Sensors | **Active** |
|---|---|
| Ultra-Low-Power Detector | **Active** |
| Low-Power Detector | Inactive |
| High-Power Detector | Inactive |

| Neuromuscular Sensors | **Active** |
|---|---|
| Ultra-Low-Power Detector | **Active** |
| Low-Power Detector | Inactive |
| High-Power Detector | Inactive |

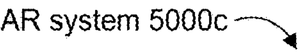
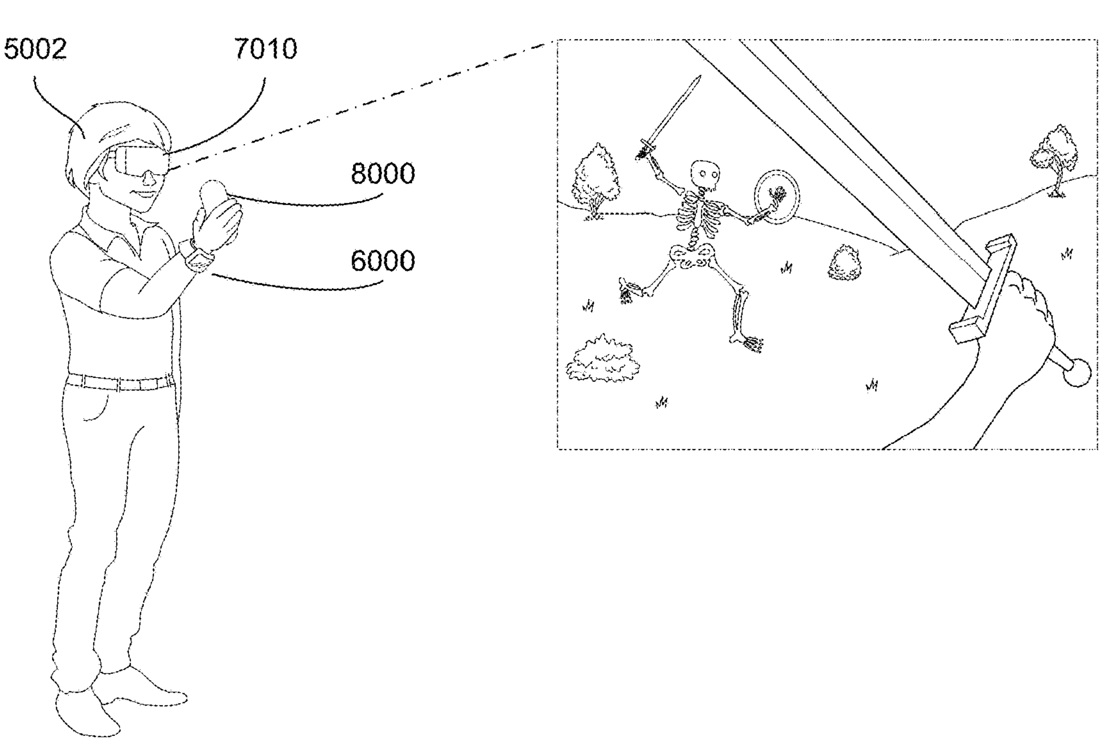
FIG. 9C-1
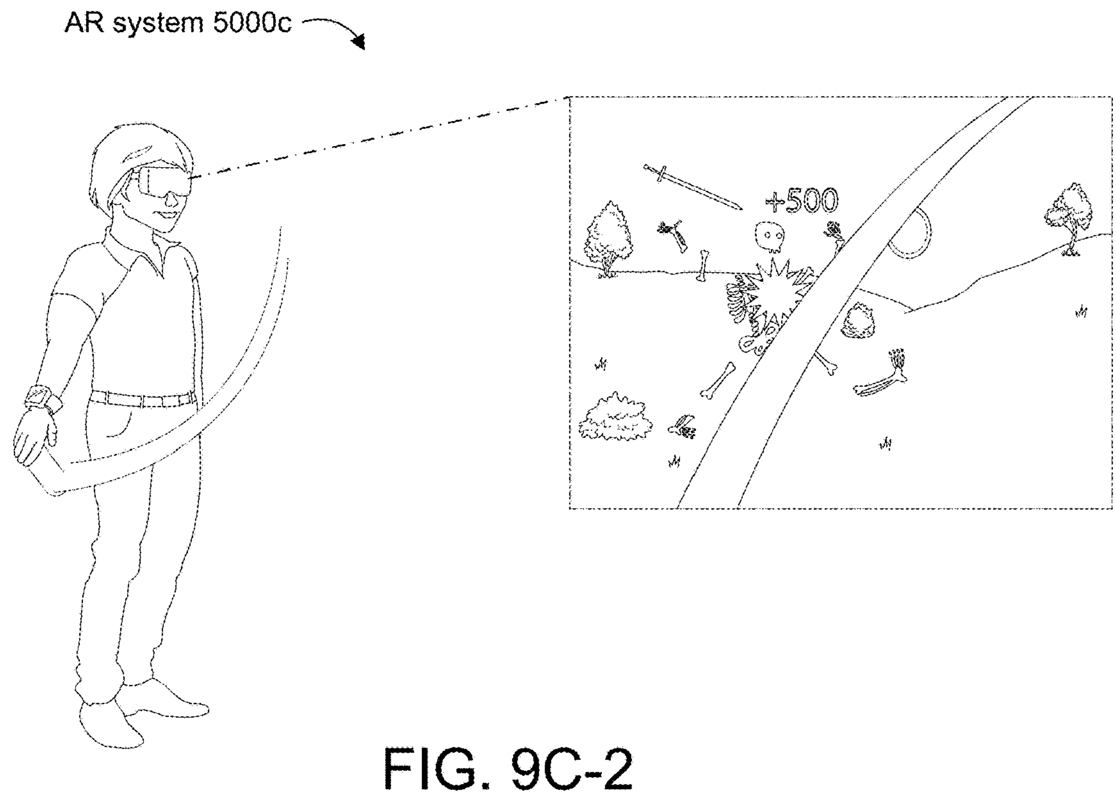
FIG. 9C-2

9000

9062-1
9062-2
9062-3
9004

POWER-EFFICIENT PROCESSING OF NEUROMUSCULAR SIGNALS TO CONFIRM OCCURRENCES OF USER GESTURES, AND SYSTEMS AND METHODS OF USE THEREOF

RELATED APPLICATIONS

This application claims priority to U.S. Provisional Patent Application No. 63/426,678, filed Nov. 18, 2022, titled "Power-Efficient Processing of Neuromuscular Signals to Confirm Occurrences of User Gestures, and Systems and Methods of Use Thereof," which is hereby incorporated by reference in its entirety.

TECHNICAL FIELD

The present disclosure relates generally to devices and methods for detecting and confirming occurrences of user gestures (e.g., in-air hand gestures performed by a user's hand without contacting a touch screen, such as a touch screen of a wrist-wearable device), including but not limited to, detecting neuromuscular signals via a wearable device and power-efficient processing of the neuromuscular signals to recognize user gestures (e.g., making use of a low-power detector for initial processing of the neuromuscular signals, followed by confirmation that a gesture has been detected using a high-power detector, such that, in some embodiments, the high-power detector can remain in a sleeping or waiting state until it receives a request to process neuromuscular signals from the low-power detector).

BACKGROUND

Users typically carry a number of electronic devices to assist them in their daily lives. For example, users carry smartphones, smartwatches, and other electronic devices that help make the users' days run more smoothly, e.g., by allowing them to send messages and emails, and to capture images and take notes. For users to be able to rely on their devices, they need to have sufficient battery capacity to operate throughout the day. Thus, power efficiency is a key aspect for these electronic devices, and there is a need for low-power techniques of user interaction and gesture processing (e.g., allowing aspects of a device, such as those aspects responsible for gesture-based processing activities, to enter a low-power or sleep mode or inactive state at various points in time). The power-efficiency needs can be particularly pronounced for new in-air hand gestures that can be detected based on neuromuscular signals, because, as one example, the machine-learning models used to process the neuromuscular signals can have high-power consumption requirements to operate, which can lead to quickly draining power supplies for, e.g., wearable devices that also include neuromuscular-signal sensors.

SUMMARY

As discussed above, there is a need for power-efficient techniques for interacting with electronic devices, such as wearable devices, including power-efficient techniques for processing and interpretation of in-air hand gestures (e.g., including properly utilizing low-power detectors, ultra-low-power detectors, and high-power detectors at different points in time, such as by cycling these various detectors between active and inactive states in the processing of certain types of signals, including neuromuscular signals). Accordingly, the systems, devices, and methods described herein allow for a more efficient and simplified man-machine interface, as well as efficient underlying data-processing and data-interpretation techniques, because they can provide a user with techniques for interacting with electronic devices and digital mediums without inconveniencing the user or requiring the user to physically interact with any electronic devices to manually turn high-power consumption operations on and/or off. For example, the devices described herein include low-power and high-power detectors (and, in some embodiments, ultra-low-power detectors) such that at least some interactions are detected and responded to without the need to power up the high-power detectors, and such that, even if the high-power detectors are utilized, use of those high-power detectors is done in a power-efficient manner.

The present disclosure includes systems and methods for waking a wearable device using a particular gesture, such as a middle-finger-and-thumb-pinch gesture and performing the wake processing in a power-efficient manner. In some embodiments, a low-power gesture detector algorithm, a high-power gesture detector algorithm, and a low-power buffer are used. In some embodiments, one or more physical sensors (e.g., IMU, EMG, and/or barometer) are used to supply the low-power detector and the buffer with real-time gesture data. As an example, when the low-power detector identifies a target gesture from the data, the low-power detector activates (wakes up) the high-power detector. The high-power detector can then use the real-time buffered data to confirm the target gesture. If the high-power detector confirms that the target gesture has been received, then a corresponding action can be performed.

In some embodiments, the multiple signals that are processed using the high-power detector are selected from among a set of signals in accordance with predefined signal-selection criteria. In some embodiments, the low-power detector is, or includes, a microcontroller unit (MCU), the high-power detector is, or includes, a system-on-a-chip (SoC), and the MCU and SoC are distinct and separate units. In some embodiments, the sensors include at least one of: an inertial measurement unit (IMU), a Photoplethysmography (PPG) sensor, or a hall-effect sensor. As described in further detail below, some of the gestures and operations described herein can be performed without any user interfaces being displayed, which allows users to interact with digital technology more seamlessly as they perform their daily tasks in the physical world and reduces energy consumption of the digital technology. In one particular example, certain gestures can be instantly detecting using a low-power detector (e.g., a smaller subset of available in-air hand gestures, which can be referred to as instant actions or instant-actions in-air hand gestures) and without the need to move a high-power detector to an active state.

In accordance with some embodiments, a method is provided for power-efficient processing of neuromuscular signals to confirm occurrence of a predetermined event (e.g., an example of the predetermined event can be detection of a wake gesture for waking a wrist-wearable device to display a home-screen user interface). The method includes (i) obtaining a first set of neuromuscular signals from a neuromuscular-signal sensing component of a wearable device; (ii) after determining, by using a low-power detector of the wearable device, that the first set of neuromuscular signals require further processing to confirm that a predetermined in-air hand gesture has been performed at the wearable device: (a) processing the first set of neuromuscular signals using a high-power detector of the wearable device, the high-power detector configured to detect a first number of in-air hand gestures while consuming a first amount of power from the wearable device and the low-power detector configured to detect a second number of in-air hand gestures, less than the first number of in-air hand gestures, while consuming a second amount of power from the wearable device that is less than the first amount of power from the wearable device and (b) in accordance with a determination that the processing indicates that the predetermined in-air hand gesture did occur, registering an occurrence of the predetermined in-air hand gesture; (iii) receiving a second set of neuromuscular signals from the neuromuscular-signal sensing component of the wearable device; and (iv) after determining, by using the low-power detector and not using the high-power detector, that a different predetermined in-air hand gesture, distinct from the predetermined in-hand gesture, was performed at the wearable device, performing an action in response to the different predetermined in-air hand gesture at the wearable device.

In some embodiments, a computing device (e.g., a wrist-wearable device or a head-mounted device, or an intermediary device, such as a smartphone or desktop or laptop computer that can be configured to coordinate operations at the wrist-wearable device and the head-mounted device) includes one or more processors, memory, a display (in some embodiments, the display can be optional, such as for certain example intermediary devices that can coordinate operations at the wrist-wearable device and the head-mounted device, and thus have ample processing and power resources, but need not have its own display), and one or more programs stored in the memory. The programs are configured for execution by the one or more processors. The one or more programs include instructions for performing (or causing performance of) any of the methods described herein (e.g., the methods 600, 700, and 800).

In some embodiments, a non-transitory computer-readable storage medium stores one or more programs configured for execution by a computing device (e.g., a wrist-wearable device or a head-mounted device, or an intermediary device, such as a smartphone or desktop or laptop computer that can be configured to coordinate operations at the wrist-wearable device and the head-mounted device) having one or more processors, memory, and a display (in some embodiments, the display can be optional, such as for certain example intermediary devices that can coordinate operations at the wrist-wearable device and the head-mounted device, and thus have ample processing and power resources, but need not have its own display). The one or more programs include instructions for performing (or causing performance of) any of the methods described herein (e.g., the methods 600, 700, and 800).

Thus, methods, systems, and computer-readable storage media are disclosed for neuromuscular-signal based detection and recognition of hand gestures. Such methods and systems may complement or replace conventional methods for gesture detection and recognition.

The features and advantages described in the specification are not necessarily all inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not to necessarily be considered limiting, for the description can admit to other effective features as the person of skill in this art will appreciate upon reading this disclosure.

FIGS. 9A, 9B, 9C-1, 9C-2, 9D-1, and 9D-2 illustrate example AR systems in accordance with some embodiments.

FIGS. 11A, 11B-1, 11B-2, and 11C illustrate example artificial-reality systems in accordance with some embodiments.

In accordance with common practice, the various features illustrated in the drawings are not necessarily drawn to scale, and like reference numerals can be used to denote like features throughout the specification and figures.

DETAILED DESCRIPTION

Figure 1A:
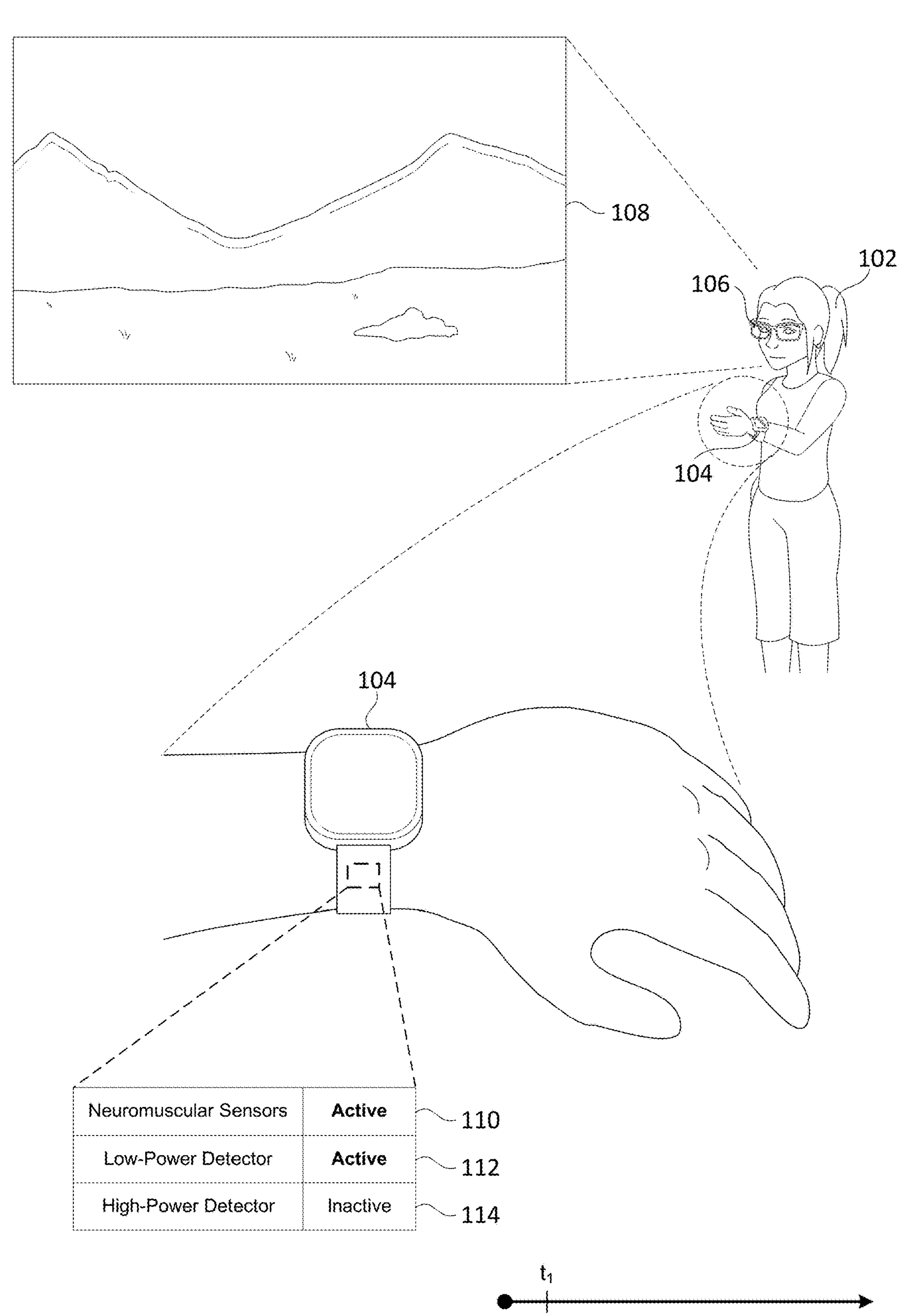
FIGS. 1A-1G illustrate an example user scenario of interacting with a wearable device in accordance with some embodiments.

Gesture recognition is a convenient input modality that allows users to interact quickly and efficiently with an electronic device. However, constantly operating circuitry for gesture detection and recognition results in significant power consumption and reduced battery life. The systems, devices, and methods described herein include a low-power detector (e.g., configured to recognize a limited set of gestures) and a high-power detector (e.g., configured to recognize a larger set of gestures and/or more complex gestures). By maintaining the high-power detector in an inactive (e.g., off or sleep state) in the absence of a viable gesture candidate detected by the low-power detector, power consumption is reduced, and battery life can be extended. Additionally, by storing gesture data in a buffer component, the high-power detector is able to evaluate a gesture that occurred before it was activated, as opposed to requiring the user to first wake the high-power detector then perform (or reperform) the gesture.

In an EMG-based user input system, multiple sensors may continuously collect samples to detect user muscle activity. These samples may then be used in a machine-learning model to derive a user's input intent. Such intent may be to wake a system from a lower-power sleep state and perform an action such as the shutter button for a photo or more advanced user interactions. These actions may be performed in a human wearable device that operates from a battery with a limited amount of energy storage. The user may initiate these actions at any time, and for a preferred user experience the user activity should not be missed when the device is in a low-power state.

Some gesture systems continuously operate by first amplifying the analog signals obtained from a plurality of sensor contacts and then converting these analog signals to digital values by means of an analog-to-digital convertor (ADC). These digital values are then processed by a machine-learning model(s) to derive the user's intended action. However, for some period of time the user may not be performing actions and the entire system is operating in anticipation of a user action even when there is none, thus consuming necessary power.

Systems in the present disclosure may improve upon conventional systems by maintaining most of the system in a low-power sleep state until there is some muscle activity detected while continuing to buffer the ADC sample values in a low-power sub-system. While there is no muscle activity, the buffer space may be reused and old sample values discarded. Once some muscle activity has been detected, additional parts of the system may be enabled from a low-power state and the buffered samples processed to derive the user intent similarly to that described above. No information is lost as the samples have been buffered, and the processing of the buffered samples can occur faster than real time, so there is no increase in latency or a degradation to the user experience in many situations. As much of the system may be kept in a lower-power state, less energy is consumed. This can enable longer battery life, or allow for a smaller, lower-capacity batteries to be used.

The above may be further expanded to a hierarchical implementation where a first low-complexity model is used to identify limited actions such as a wake action or an instant action and processed in a low-power subsystem. If that low-power subsystem identifies that the user intent exceeds that which may be identified and/or processed locally, it can then wake higher performance and commensurately higher power portions of the system. Similar to that described above, samples can again be buffered such that no user information or intent is lost.

Embodiments of this disclosure may include or be implemented in conjunction with various types or embodiments of artificial-reality systems. Artificial reality constitutes a form of reality that has been altered by virtual objects for presentation to a user. Such artificial reality may include and/or represent virtual reality (VR), augmented reality (AR), mixed reality (MR), hybrid reality, or some combination and/or variation of one or more of the these. Artificial-reality content may include completely generated content or generated content combined with captured (e.g., real-world) content. The artificial-reality content may include video, audio, haptic feedback, or some combination thereof, any of which may be presented in a single channel or in multiple channels (such as stereo video that produces a three-dimensional effect to a viewer). Additionally, in some embodiments, artificial reality may also be associated with applications, products, accessories, services, or some combination thereof, which are used, for example, to create content in an artificial reality and/or are otherwise used in (e.g., to perform activities in) an artificial reality.

Artificial-reality systems may be implemented in a variety of different form factors and configurations. Some artificial-reality systems include a near-eye display (NED), which provides visibility into the real world or that visually immerses a user in an artificial reality. While some artificial-reality devices are self-contained systems, other artificial-reality devices communicate and/or coordinate with external devices to provide an artificial-reality experience to a user. Examples of such external devices include handheld controllers, mobile devices, desktop computers, devices worn by a user, devices worn by one or more other users, and/or any other suitable external system.

FIGS. 1A-1G illustrate an example user scenario of interacting with a wearable device in accordance with some embodiments. FIG. 1A shows a user 102 wearing a wrist-wearable device 104 (e.g., a smartwatch) and a head-wearable device 106 (e.g., AR glasses). The user 102 in FIG. 1A is viewing a scene 108 (e.g., with no visible user interface or overlay) at a first time, $t_1$. The wrist-wearable device 104 in FIG. 1A includes a set of neuromuscular sensors 110, a low-power detector 112, and a high-power detector 114. In FIG. 1A the neuromuscular sensors 110 are active, e.g., actively monitoring neuromuscular signals in the user's arm. The low-power detector 112 is also active in FIG. 1A, e.g., actively analyzing data from at least a subset of the neuromuscular sensors 110 to identify/recognize user gestures being performed. The high-power detector 114 in FIG. 1A is inactive (e.g., powered off and/or in a low-power state). In some embodiments, the low-power detector 112 consumes less power than the high-power detector 114 when analyzing (recognizing) user gestures.

Figure 1B:
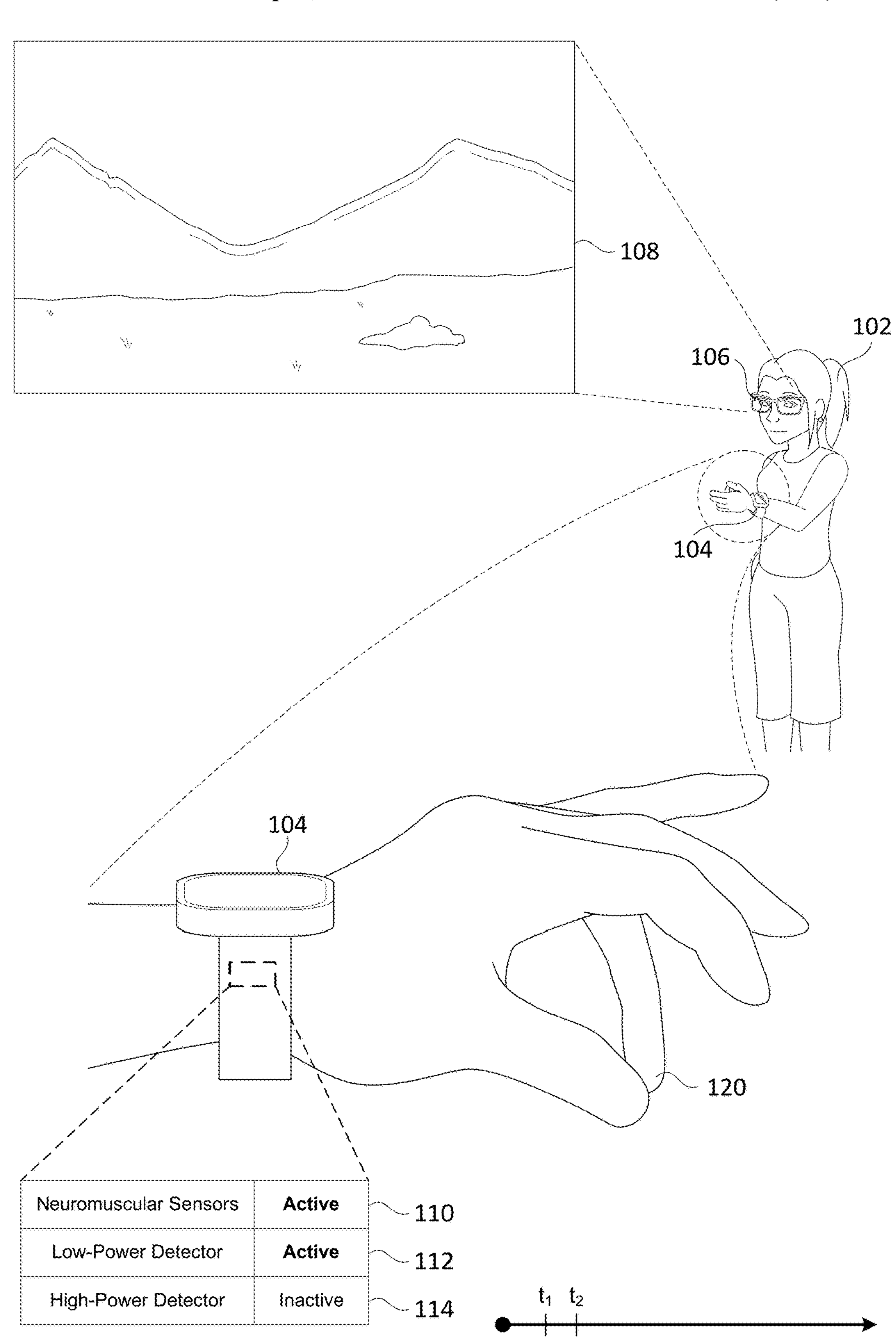
Figure 1C:
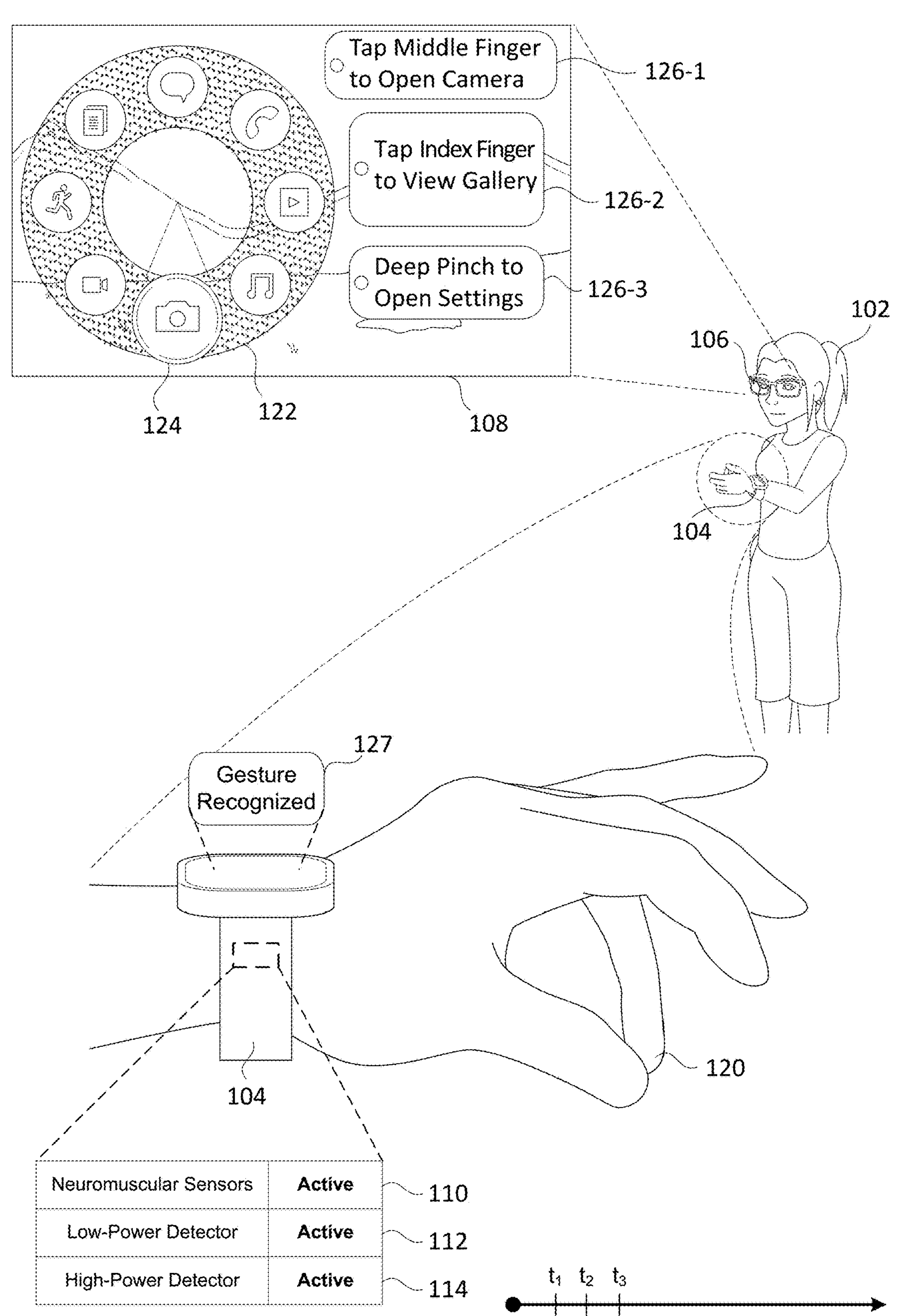

FIG. 1B shows the user 102 performing a pinch gesture 120 (e.g., a ring-finger-and-thumb-pinch gesture) at a second time, $t_2$, while the low-power detector 112 is active and the high-power detector 114 is inactive. FIG. 1C shows activation of the high-power detector 114 to recognize the pinch gesture 120 at a third time, $t_3$, and corresponding display of a user interface that includes a menu 122. FIG. 1C further shows an indication 127 that the gesture was recognized. In some embodiments, the indication 127 is presented at a display of the wrist-wearable device 104. In some embodiments, the indication 127 is, or includes, an audio indication and/or haptic indication. In some embodiments, an indication that the user gesture is recognized is not presented to the user.

In the example of FIGS. 1B and 1C the pinch gesture 120 corresponds to an action to activate the menu 122 (e.g., cause display of the menu 122 and cause the menu 122 to be responsive to subsequent user gestures). For example, the pinch gesture 120 is recognized by the high-power detector 114, and in response the menu 122 is activated. In FIG. 1C a camera element 124 is in focus and the user interface further shows gesture options 126, including an option 126-1 to open the camera application (responsive to a middle-finger-tap gesture), an option 126-2 to view an image gallery (responsive to an index-finger-tap gesture), and an option 126-3 to open camera settings (responsive to a deep-pinch gesture). In some embodiments, a deep-pinch gesture is a pinch gesture that has a force that meets one or more force criteria (e.g., the force exceeds a preset force threshold). In some embodiments, the middle-finger-tap gesture involves the user 102 touching their middle finger to their ring finger while maintaining the ring finger and thumb pinch. In some embodiments, the index-finger-tap gesture involves the user 102 touching their index finger to their ring finger while maintaining the ring finger and thumb pinch.

Figure 1D:
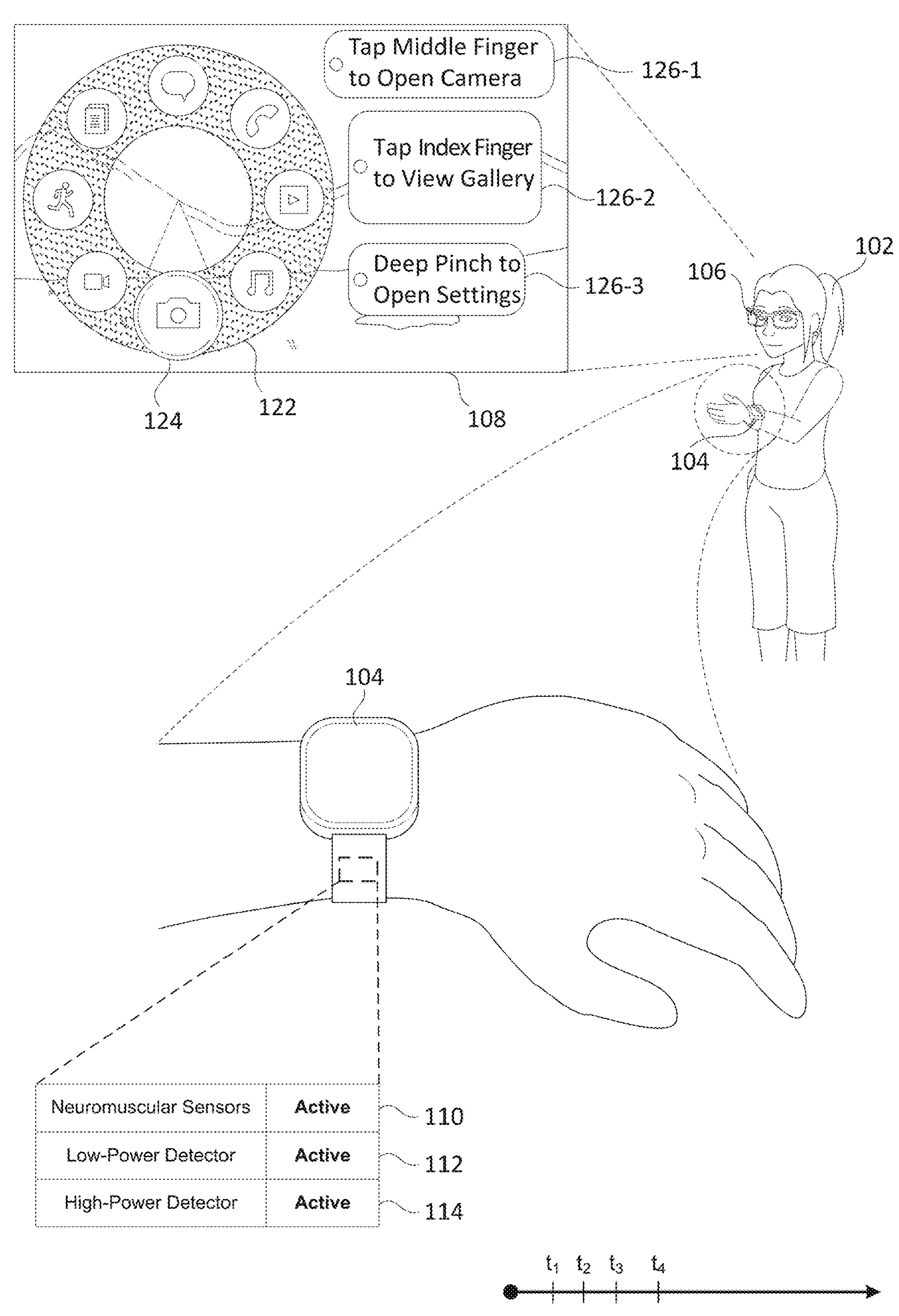

FIG. 1D shows the user 102 having ceased performing the pinch gesture 120 at a fourth time, $t_4$, and the user interface continuing to be displayed. FIG. 1D also shows the high-power detector 114 remaining in the active state. In some embodiments, the high-power detector 114 remains in the active state for a set amount of time after being activated (e.g., 10 seconds, 30 seconds, or 1 minute). In some embodiments, the high-power detector 114 remains in the active state for a set amount of time after a gesture is detected (e.g., a gesture requiring analysis by the high-power detector).

Figure 1E:
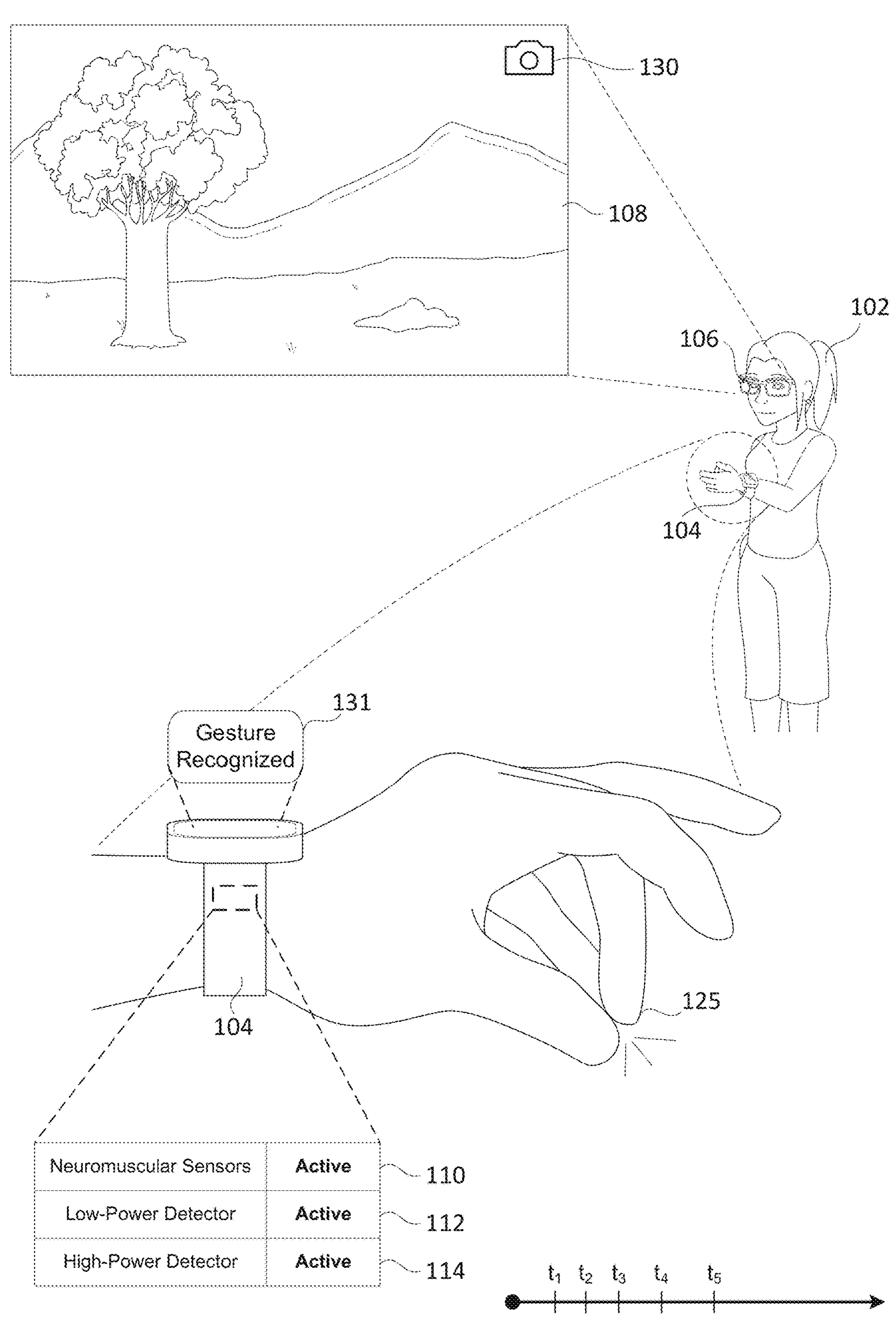

FIG. 1E shows the user performing a tap gesture 125 (e.g., a middle-finger-and-thumb-tap gesture) at a fifth time, $t_5$. FIG. 1E further shows activation of a camera application in response to the tap gesture 125 (corresponding to the option 126-1 in FIG. 1D) as indicated by the camera symbol 130 in the scene 108. For example, the tap gesture 125 is recognized by the high-power detector 114, and in response the camera application is activated. FIG. 1E also shows an indication 131 that the gesture was recognized. In the example of FIG. 1E, the high-power detector 114 is active (e.g., is utilized to analyze the tap gesture 125).

Figure 1F:
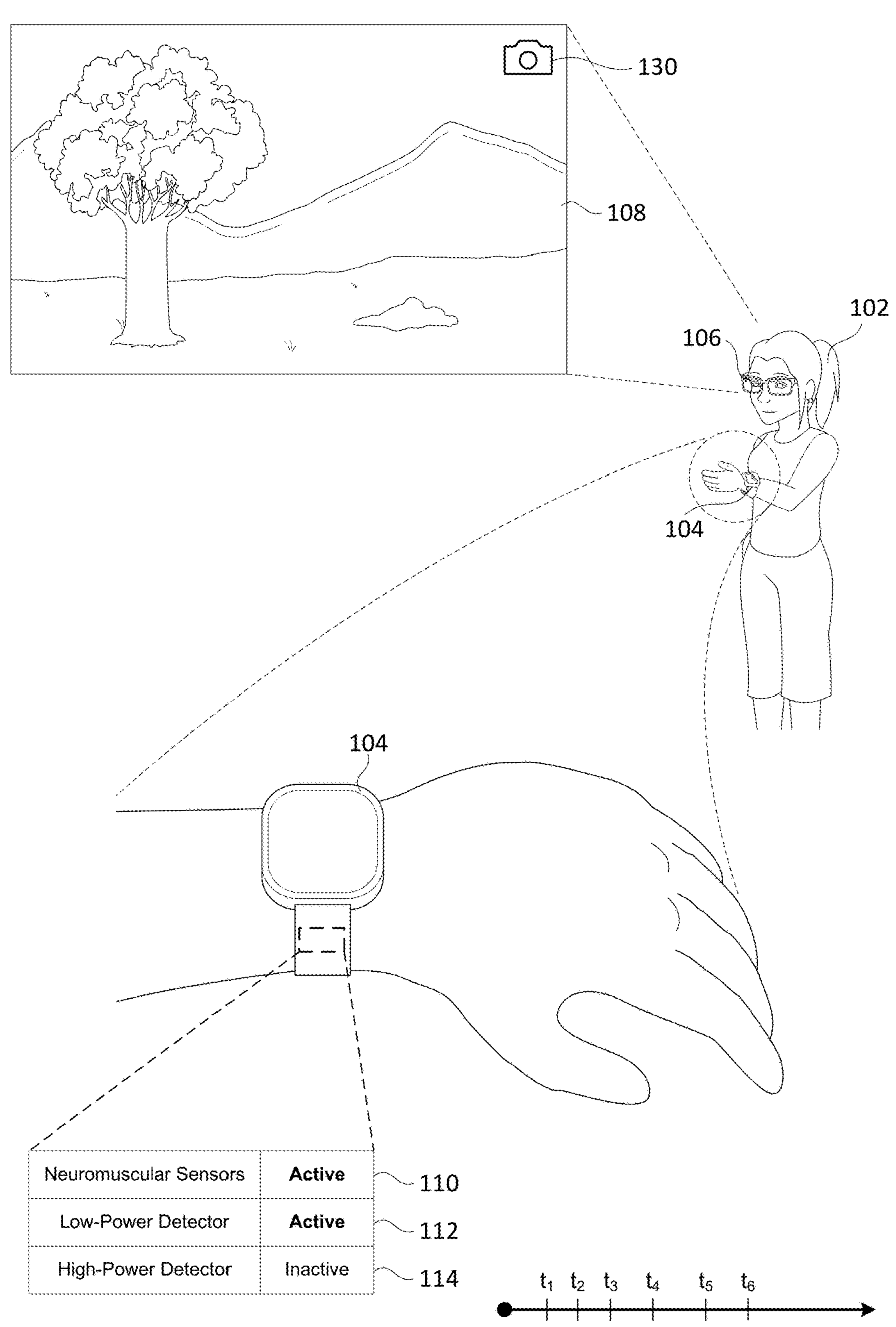

FIG. 1F shows the user 102 having ceased performing the tap gesture 125 at a sixth time, $t_6$, and the camera application remaining active as indicated by the camera symbol 130 continuing to be displayed in FIG. 1F. FIG. 1F also shows the high-power detector 114 having transitioned to the inactive state. In some embodiments, the high-power detector 114 transitions to the inactive state a set amount of time after being activated (e.g., 10 seconds, 30 seconds, or 1 minute). In some embodiments, the high-power detector 114 transitions to the inactive state a set amount of time after a gesture is detected (e.g., a gesture requiring analysis by the high-power detector).

Figure 1G:
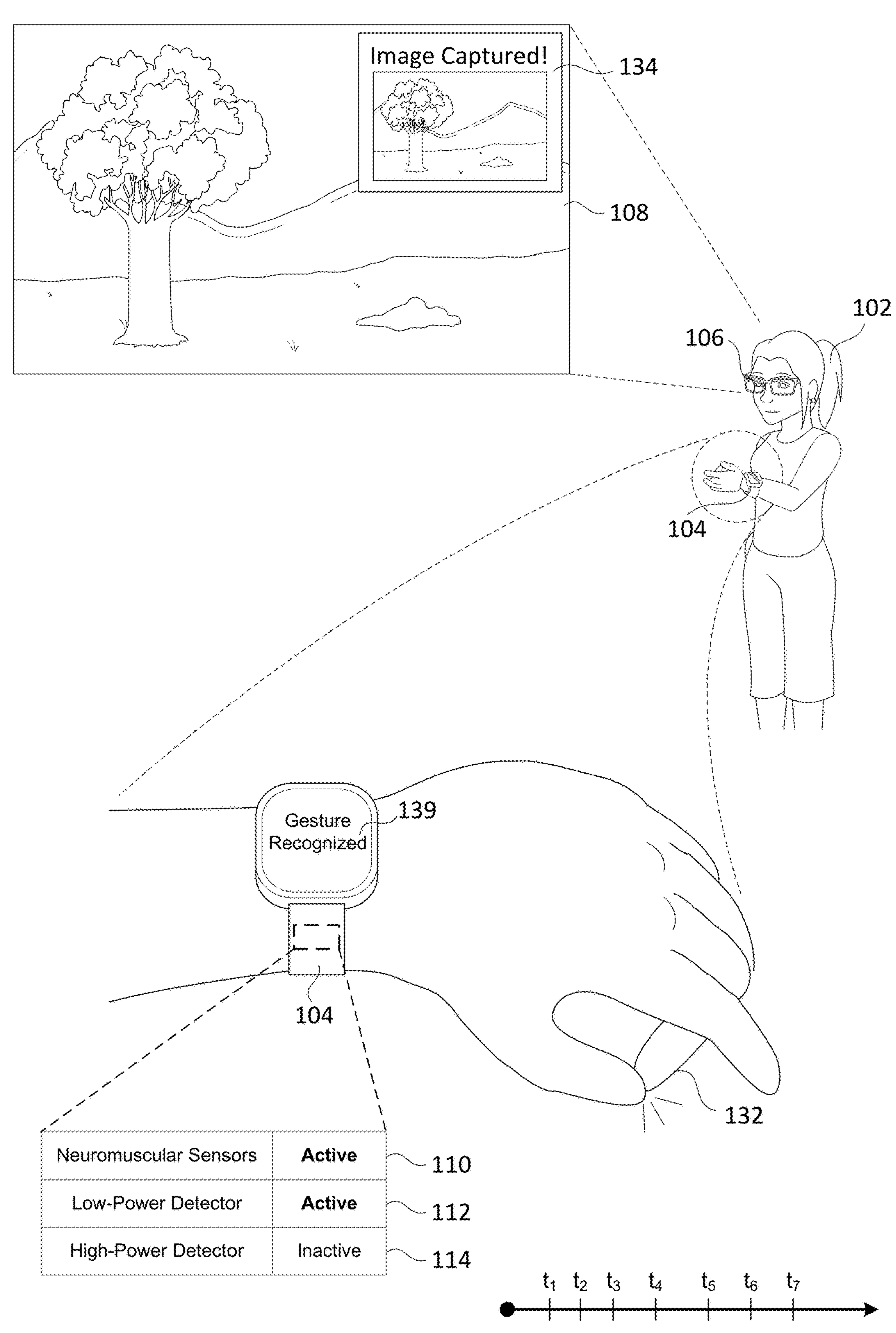

FIG. 1G shows the user performing a tap gesture 132 (e.g., a middle-finger-and-thumb-tap gesture) at a seventh time, $t_7$. FIG. 1G further shows activation of a camera function (e.g., an image capture function) in response to the tap gesture 132, as indicated by the notification 134 in the scene 108. For example, the tap gesture 132 is recognized by the low-power detector 112, and in response the camera function is activated. FIG. 1G also shows an indication 139 that the gesture was recognized. In the example of FIG. 1G, the high-power detector 114 remains in the inactive state (e.g., the low-power detector 112 is able to recognize the tap gesture 132 without the high-power detector 114).

Figure 2A:
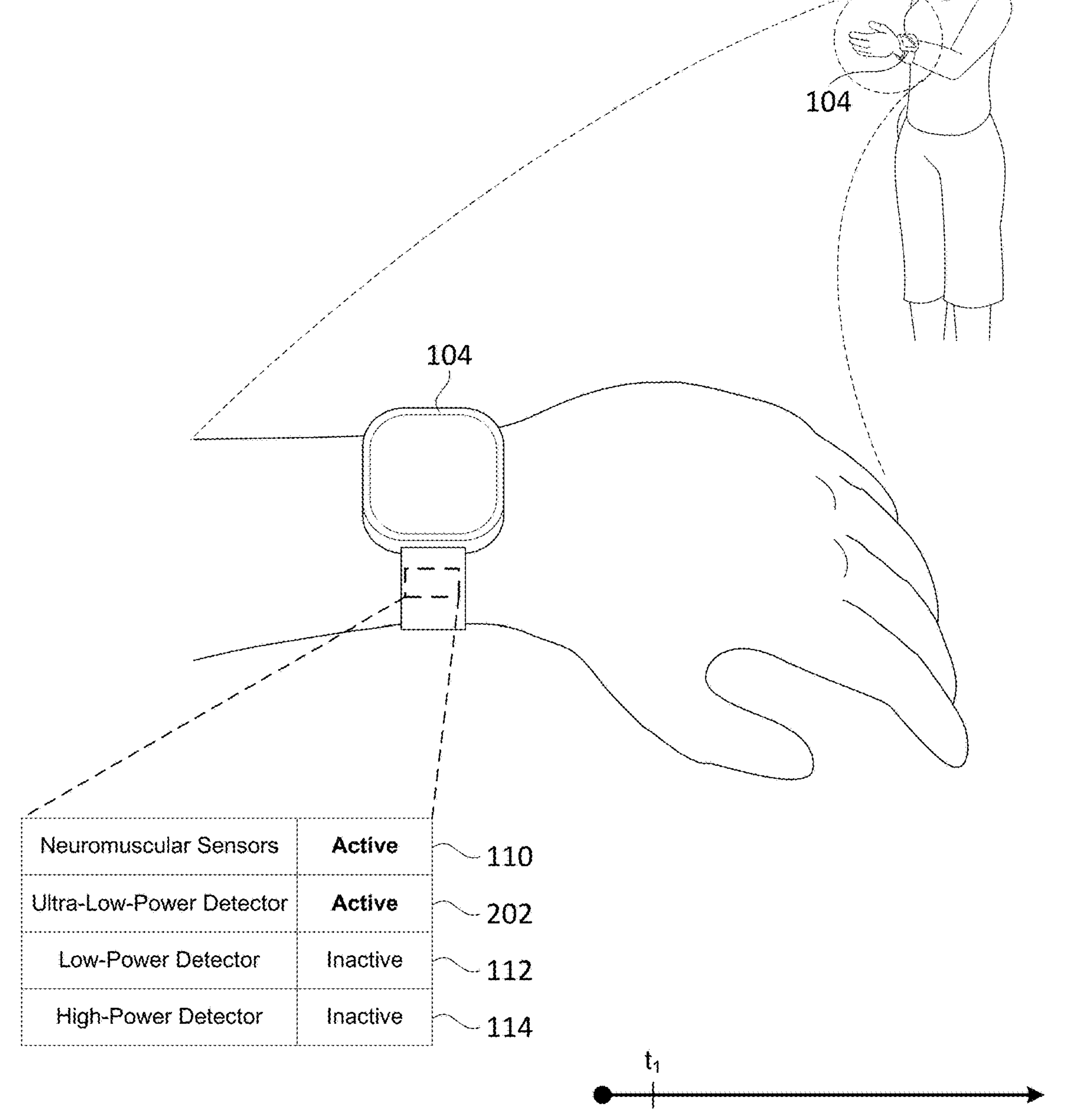
FIGS. 2A-2H illustrate another example user scenario of interacting with a wearable device in accordance with some embodiments.

FIGS. 2A-2H illustrate another example user scenario of interacting with a wearable device in accordance with some embodiments. FIG. 2A shows a user 102 wearing the wrist-wearable device 104 (e.g., a smartwatch) and the head-wearable device 106 (e.g., AR glasses). The user 102 in FIG. 2A is viewing the scene 108 (e.g., with no visible user interface or overlay) at a first time, $t_1$. The wrist-wearable device 104 in FIG. 2A includes the set of neuromuscular sensors 110, the low-power detector 112, and the high-power detector 114. The wrist-wearable device 104 in FIG. 2A further includes an ultra-low-power detector 202. In FIG. 2A the neuromuscular sensors 110 and the ultra-low-power detector 202 are active, and the low-power detector 112 and the high-power detector 114 are inactive. In some embodiments, the ultra-low-power detector 202 is configured to detect motion (e.g., includes or is coupled to an accelerometer and/or a gyroscope). In some embodiments, the ultra-low-power detector 202 consumes less power than the low-power detector 112 when detecting (and/or analyzing) user gestures.

Figure 2B:
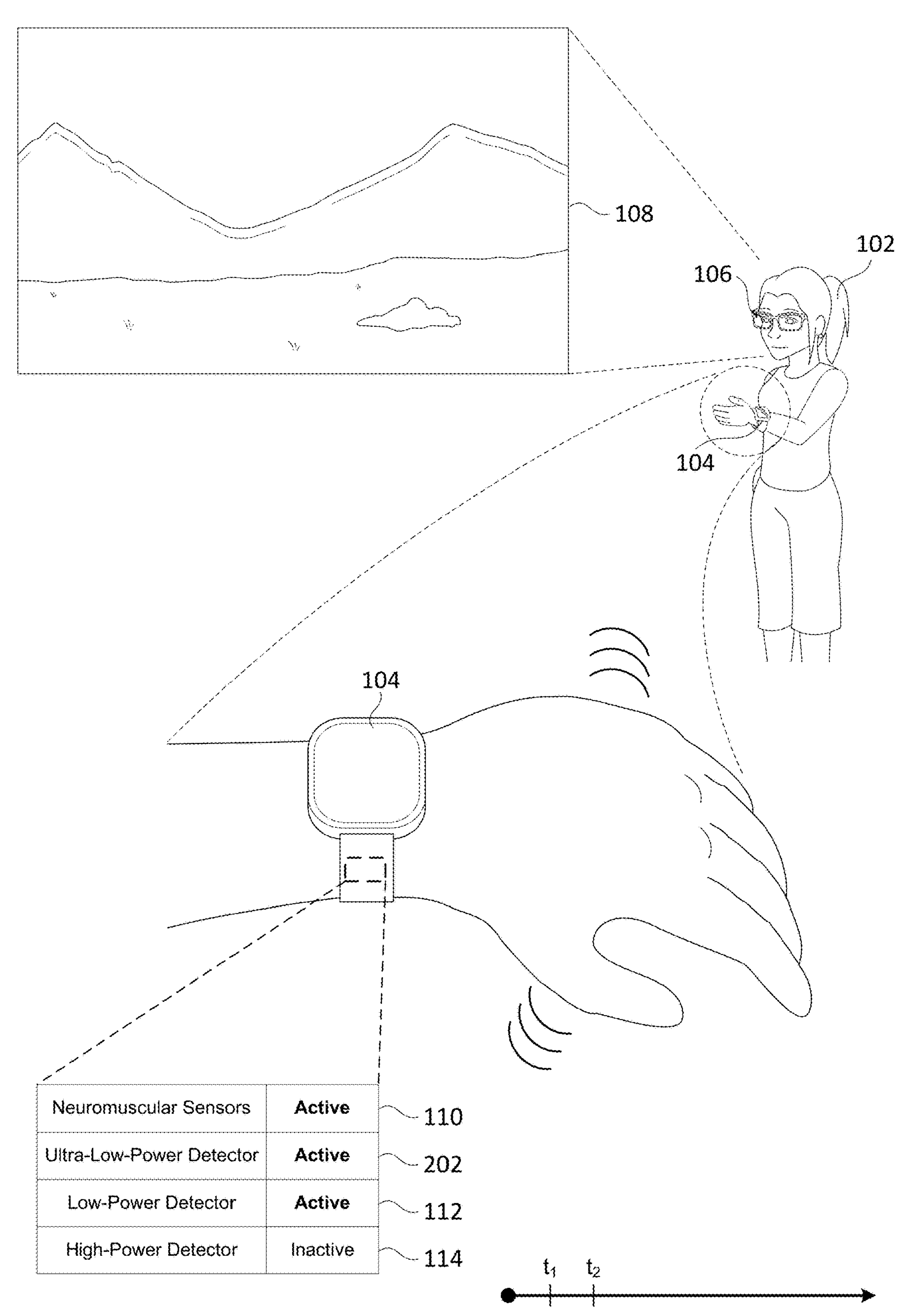
Figure 2C:
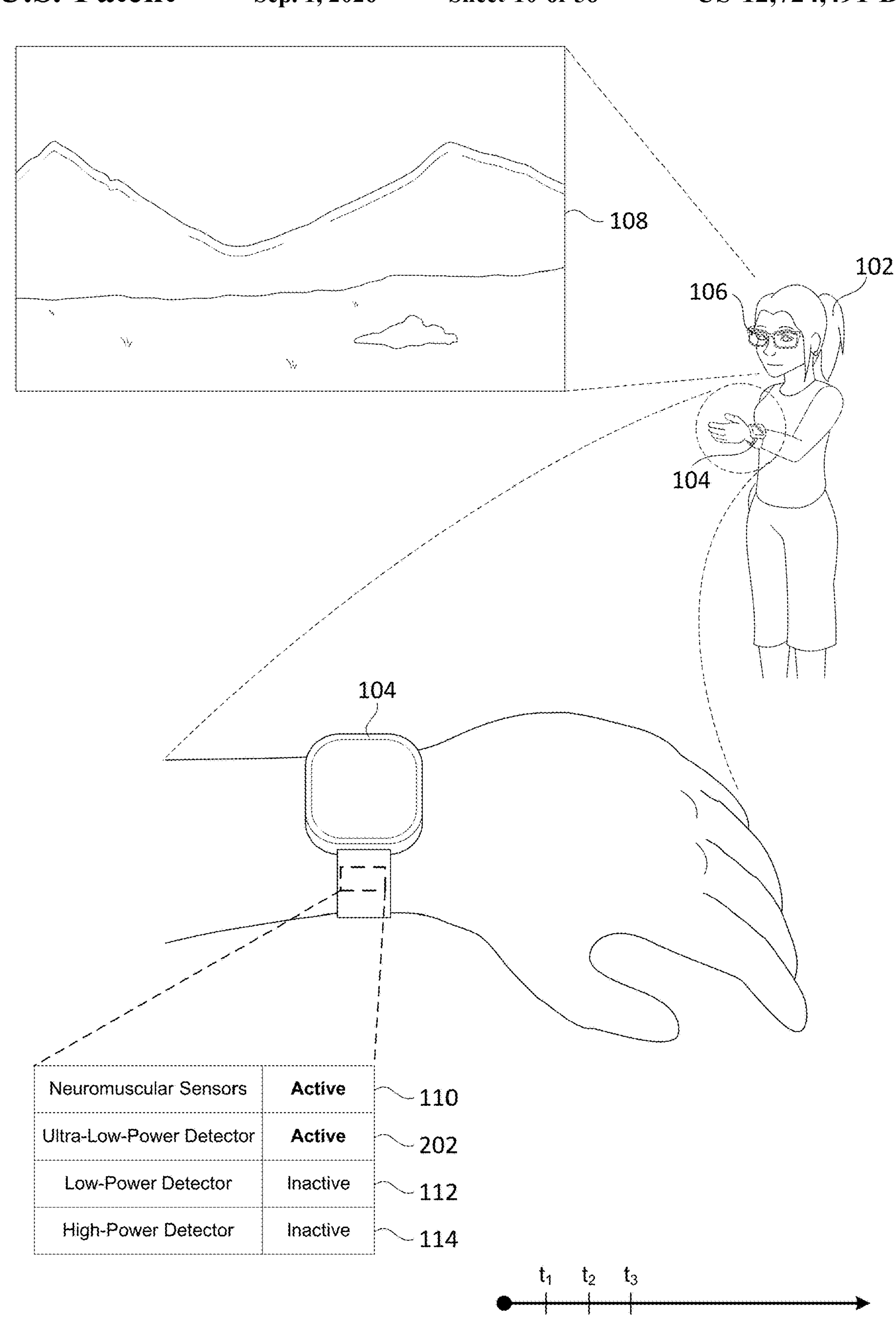

FIG. 2B shows the user 102 making a shaking movement with their hand at a second time, $t_2$. In the example of FIG. 2B, the ultra-low-power detector 202 detects the shaking movement and activates the low-power detector 112 to analyze the movement. FIG. 2C shows the low-power detector 112 in the inactive state again at a third time, $t_3$. In the example of FIGS. 2B and 2C, the shaking movement does not correspond to an input gesture (e.g., is a false positive). Accordingly, the low-power detector 112 analyzes the shaking movement and determines that the shaking movement does not correspond to an input gesture. In accordance with that determination, the low-power detector 112 returns to the inactive state.

Figure 2D:
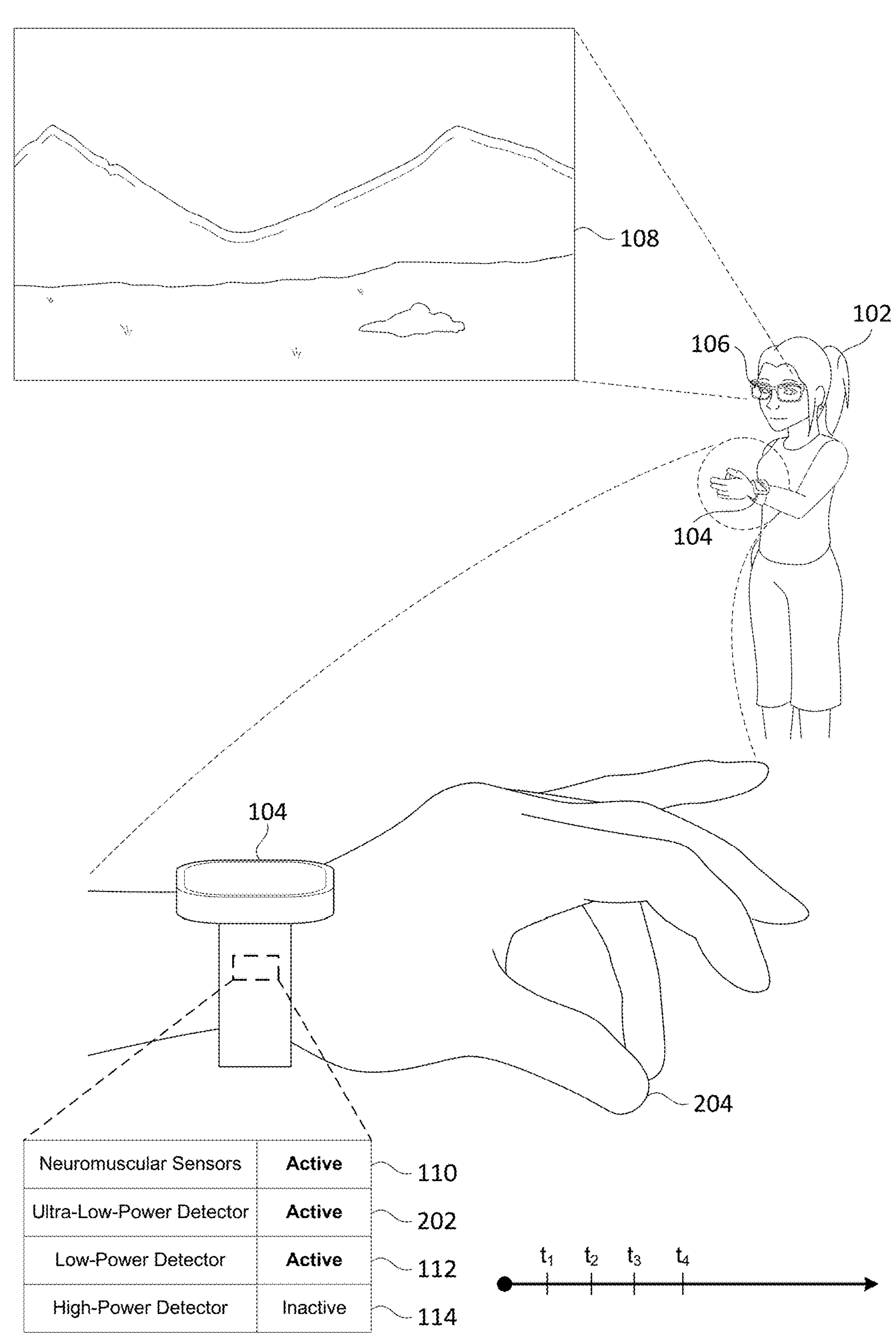
Figure 2E:
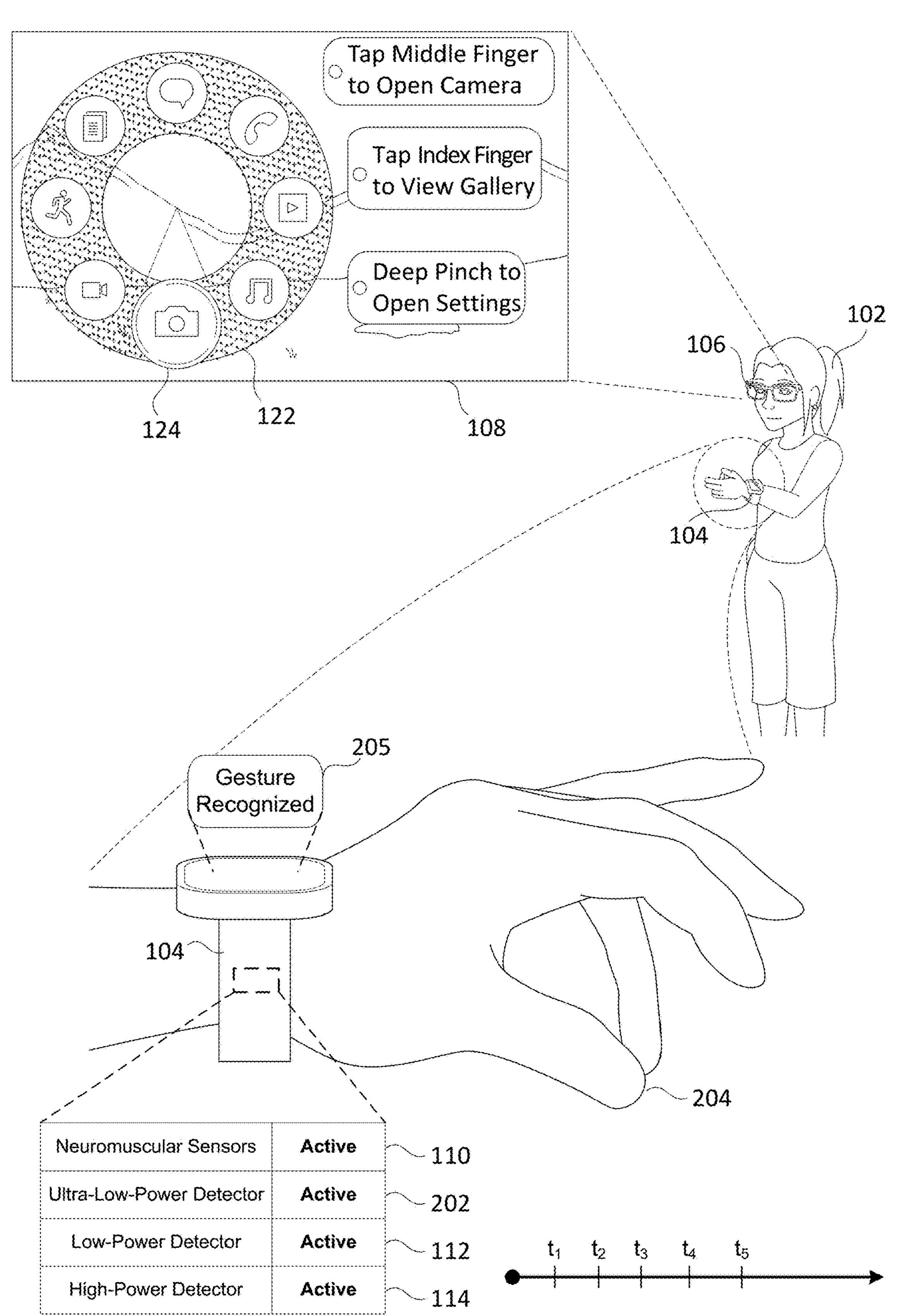

FIG. 2D shows the user performing a pinch gesture 204 (e.g., a ring-finger-and-thumb-pinch gesture) at a fourth time, $t_4$. In the example of FIG. 2D, the ultra-low-power detector 202 detects the pinch-gesture movement and activates the low-power detector 112 to analyze the movement. FIG. 2E shows activation of the high-power detector 114 to recognize the pinch gesture 204 at a fifth time, $t_5$, and corresponding display of a user interface that includes a menu 122. For example, the pinch gesture 204 is recognized by the high-power detector 114, and in response the menu 122 is activated. FIG. 2E further shows an indication 205 that the gesture was recognized. In some embodiments, the indication 205 is presented at a display of the wrist-wearable device 104. In some embodiments, the indication 205 is, or includes, an audio indication and/or haptic indication. In some embodiments, an indication that the user gesture is recognized is not presented to the user. Also, in FIG. 2E, the camera element 124 is in focus within the menu 122.

Figure 2F:
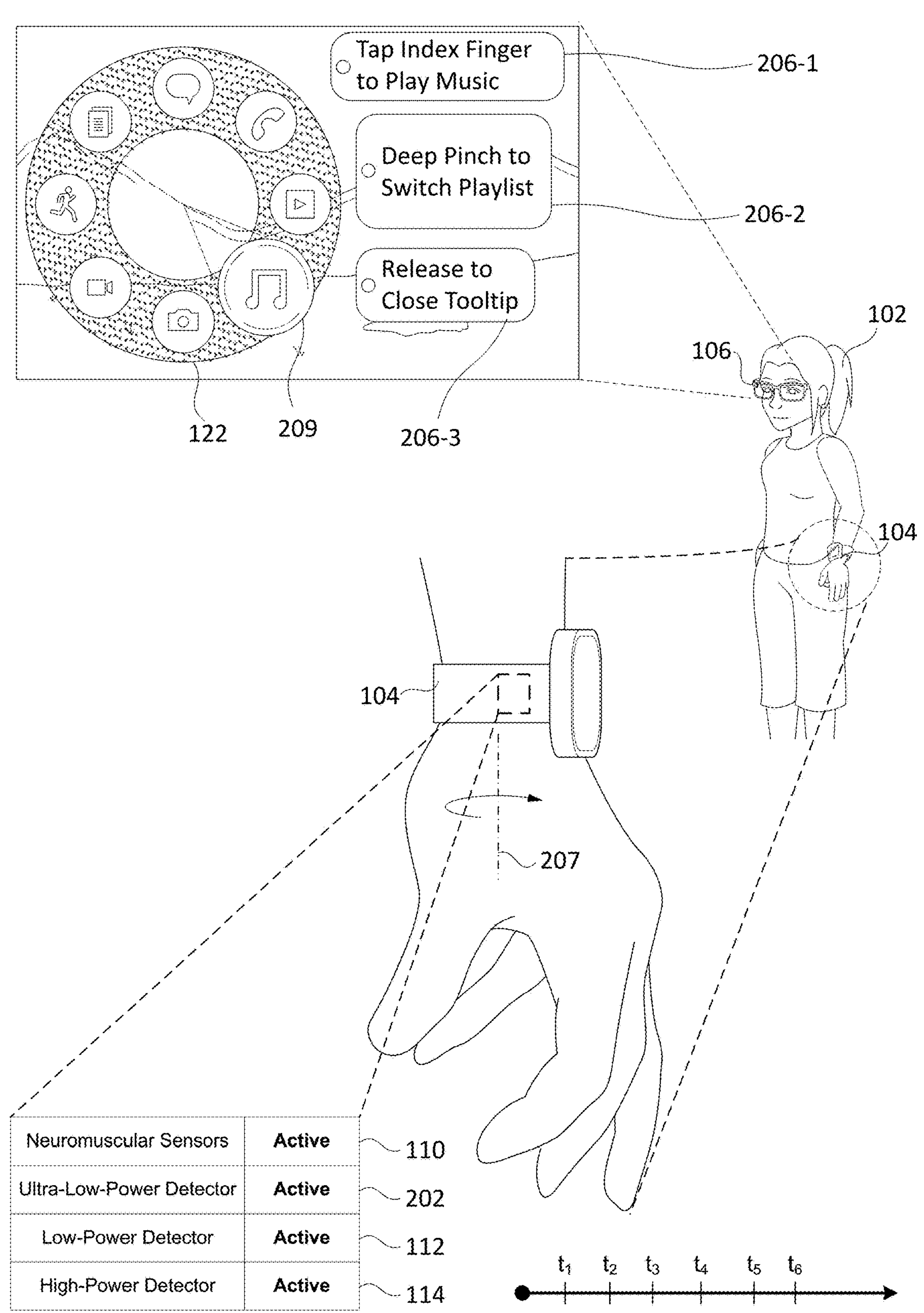

FIG. 2F shows the user 102 performing a rotation gesture 207 (e.g., a rotation of the wrist and/or forearm while maintaining the pinch gesture 204) at a sixth time, $t_6$, while the low-power detector 112 and the high-power detector 114 are active. In the example of FIG. 2F the rotation gesture 207 corresponds to a navigation action within the menu 122 (e.g., moves a point of focus to different elements within the menu 122). For example, the rotation gesture 207 is recognized by the high-power detector 114, and in response the navigation action is activated. In FIG. 2F, a music element 209 is in focus and the user interface further shows gesture options 206, including an option 206-1 to play music in a current playlist (responsive to an index-finger-tap gesture), an option 206-2 to switch to a different playlist (responsive to a deep-pinch gesture), and an option 206-3 to close (e.g., cease to display) the gesture option 206 tooltips.

Figure 2G:
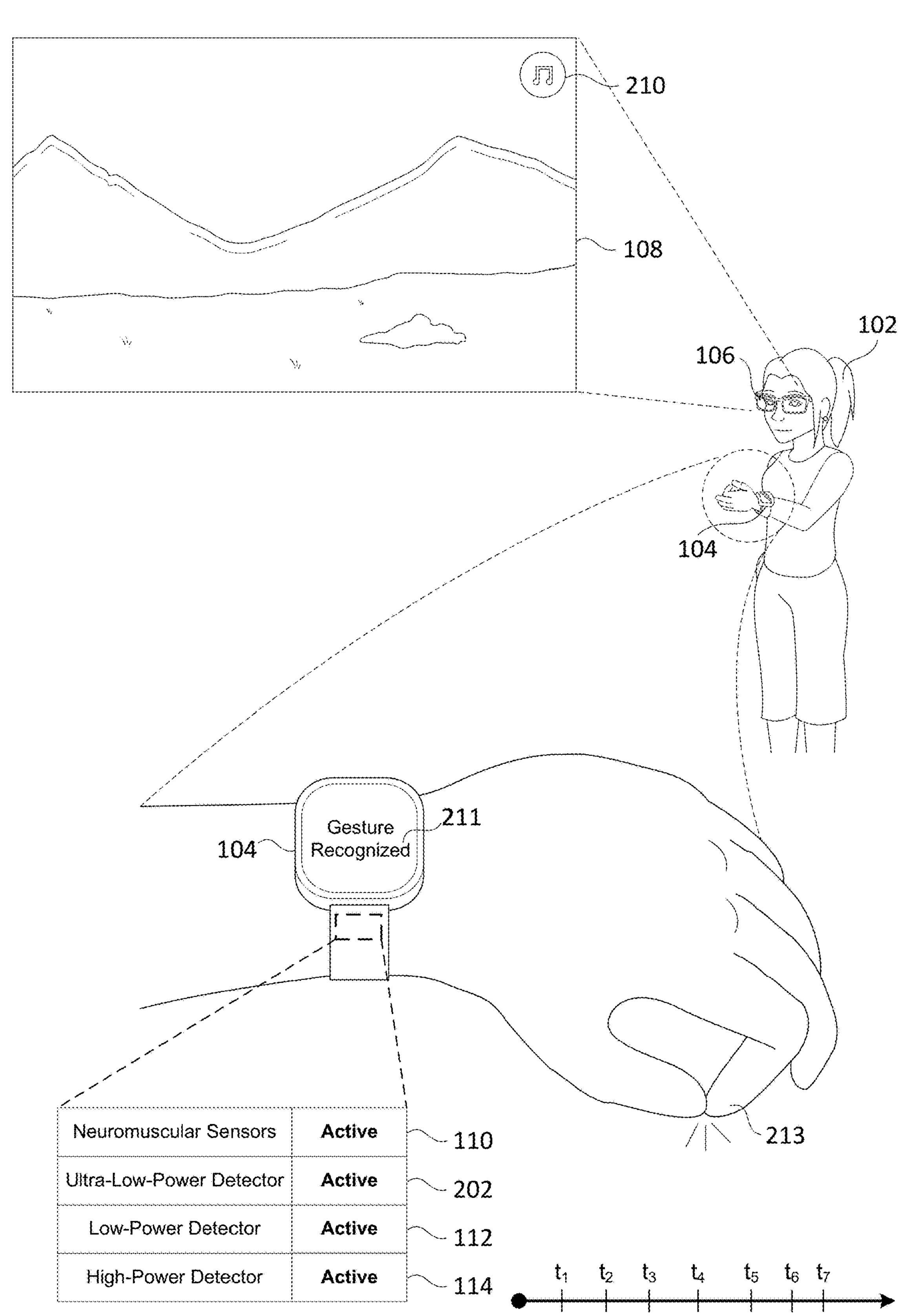

FIG. 2G shows the user performing a tap gesture 213 (e.g., an index-finger-and-thumb tap gesture) at a seventh time, $t_7$. FIG. 2G further shows activation of a music application (and playback of a music item) in response to the tap gesture 213 (corresponding to the option 206-1 in FIG. 2F) as indicated by the music symbol 210 in the scene 108. For example, the tap gesture 213 is recognized by the high-power detector 114, and in response the music application is activated and the music item is played. FIG. 2G also shows an indication 211 that the gesture was recognized.

Figure 2H:
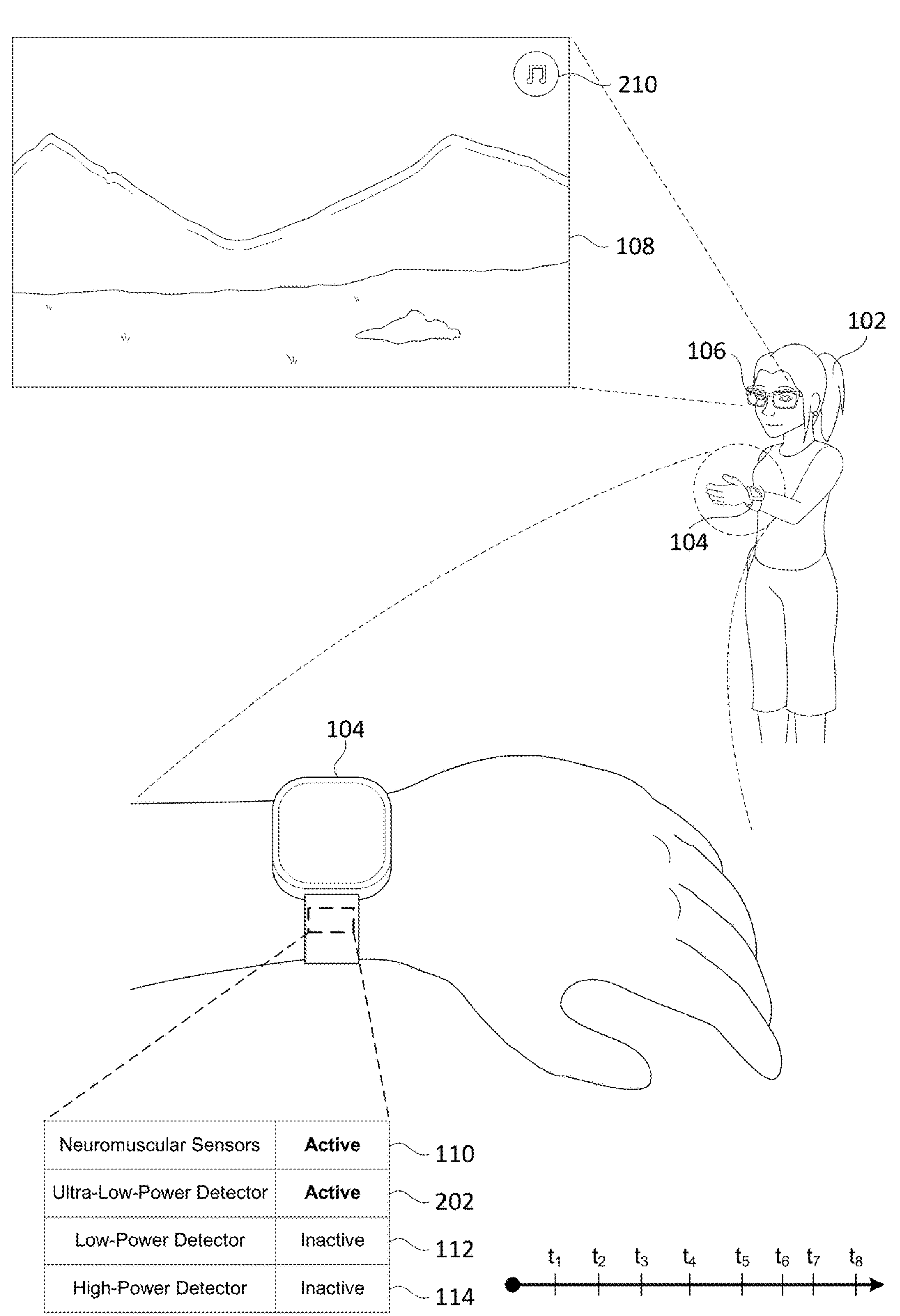

FIG. 2H shows the user 102 having ceased performing the tap gesture 213 at an eighth time, $t_8$, and the music application remaining active as indicated by the music symbol 210 continuing to be displayed in FIG. 2H. FIG. 2H also shows the high-power detector 114 and the low-power detector 112 having transitioned to the inactive state. In some embodiments, the low-power detector 112 and the high-power detector 114 transition to the inactive state a set amount of time after being activated (e.g., 10 seconds, 30 seconds, or 1 minute). In some embodiments, the low-power detector 112 and the high-power detector 114 transition to the inactive state a set amount of time after a gesture is detected (e.g., a gesture requiring analysis by the power detectors).

Figure 3A:
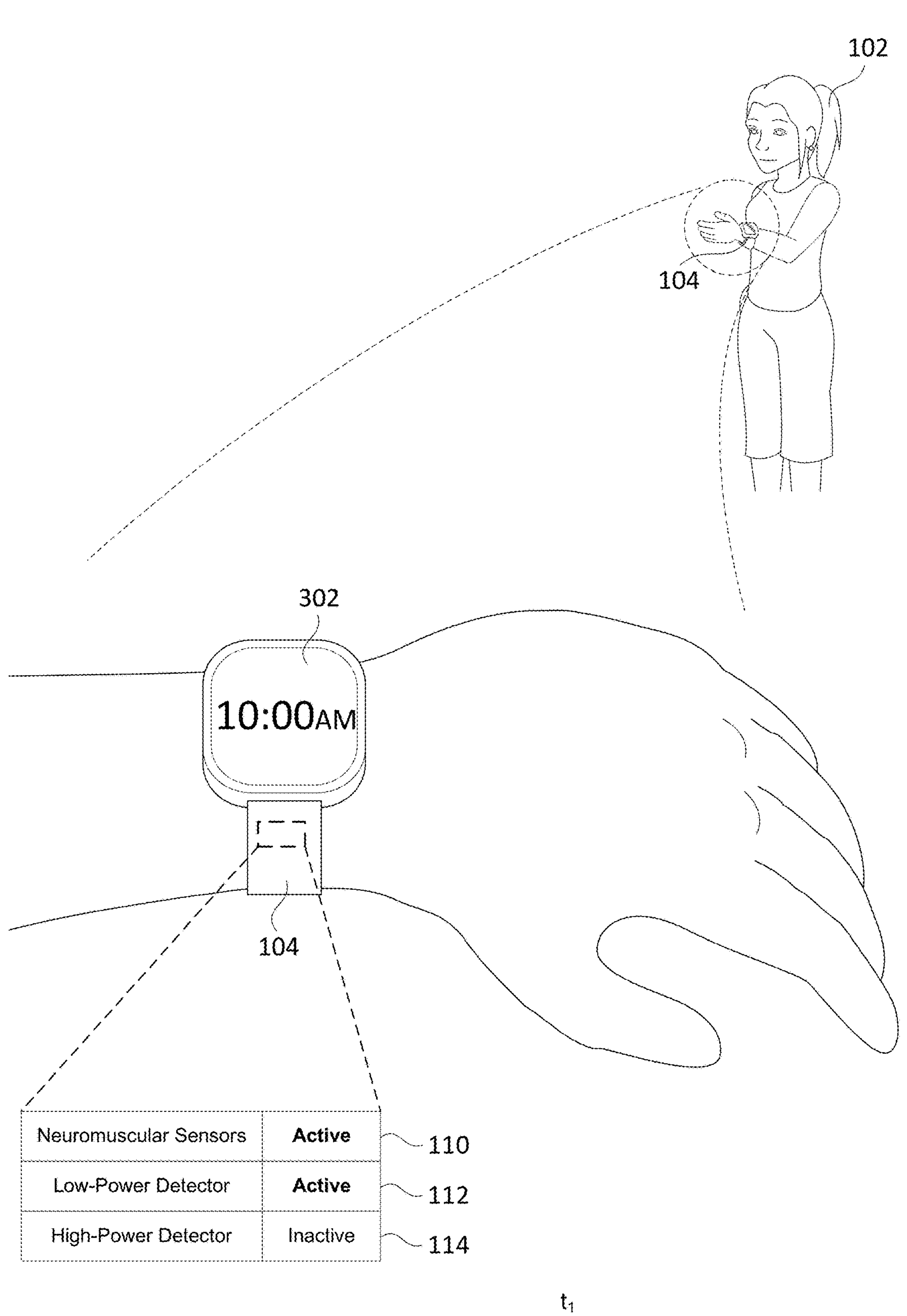
FIGS. 3A-3D illustrate another example user scenario of interacting with a wearable device in accordance with some embodiments.

FIGS. 3A-3D illustrate another example user scenario of interacting with a wearable device in accordance with some embodiments. FIG. 3A shows a user 102 wearing the wrist-wearable device 104 with a user interface 302 (e.g., indicating a time of day) displayed at a first time, $t_1$. The wrist-wearable device 104 in FIG. 3A includes the set of neuromuscular sensors 110, the low-power detector 112, and the high-power detector 114. In FIG. 3A the neuromuscular sensors 110 are active, e.g., actively monitoring neuromuscular signals in the user's arm. The low-power detector 112 is also active in FIG. 3A, e.g., actively analyzing data from at least a subset of the neuromuscular sensors 110 to identify/recognize user gestures being performed. The high-power detector 114 in FIG. 3A is inactive (e.g., powered off and/or in a low-power state).

Figure 3B:
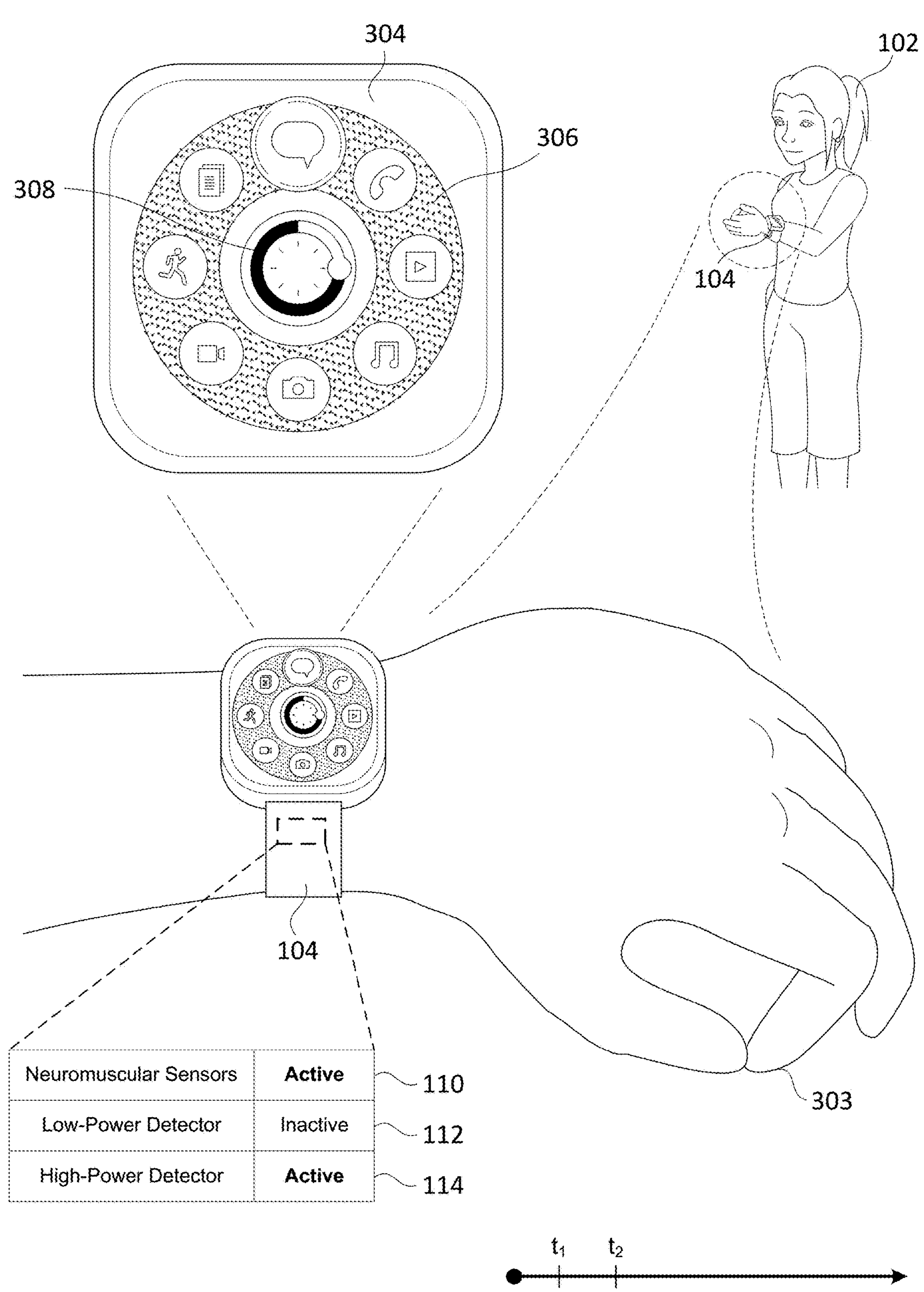

FIG. 3B shows the user 102 performing a pinch gesture 303 (e.g., an index-finger-and-thumb-pinch gesture) at a second time, $t_2$. FIG. 3B further shows activation of the high-power detector 114 to recognize the pinch gesture 303 and corresponding display of a user interface 304 that includes a menu 306. The low-power detector 112 in FIG. 3B is transitioned to the inactive state while the high-power detector 114 is active (e.g., to conserve power, only one of the detectors is active at a time). The menu 306 includes elements corresponding to a plurality of applications and a time-out indicator 308 indicating an amount of time before the menu 306 is deactivated again.

Figure 3C:
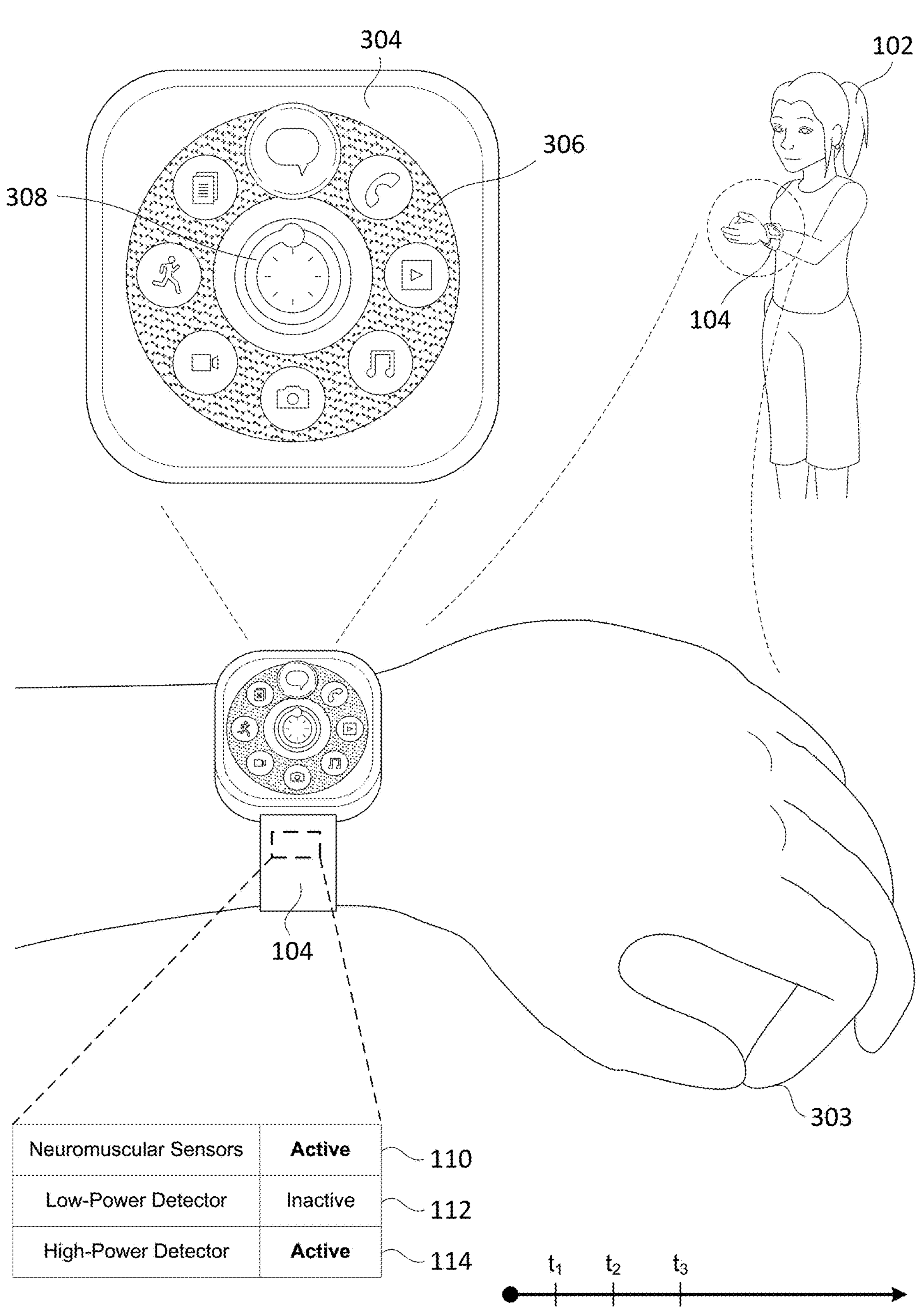

FIG. 3C shows the user 102 maintaining the pinch gesture 303 at a third time, $t_3$, and the time-out indicator 308 indicating that the menu 306 is to be deactivated in accordance with no subsequent gesturing being detected and/or recognized. FIG. 3C further shows the high-power detector 114 remaining active so as to analyze and/or recognize any subsequent gestures performed during the time-out period.

Figure 3D:
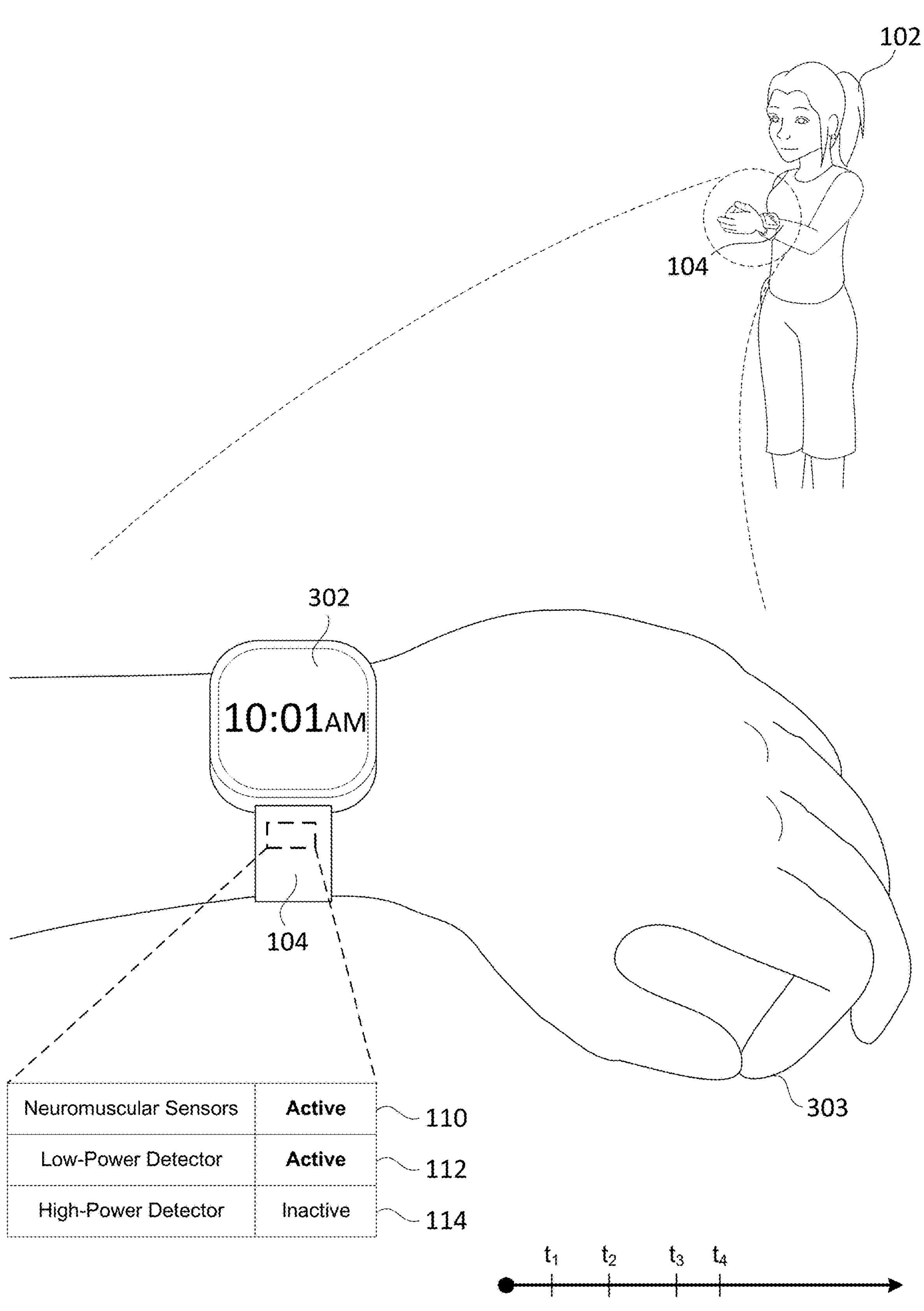

FIG. 3D shows the user 102 maintaining the pinch gesture 303 at a fourth time, $t_4$, and display of the user interface 302 (e.g., in accordance with the menu 306 having been deactivated). FIG. 3D further shows the high-power detector 114 being inactive and the low-power detector 112 being active (e.g., to detect and/or analyze subsequent gestures). In some embodiments, the low-power detector 112 and the high-power detector 114 toggle between the active and inactive states in accordance with the time-out period ending.

Figure 9A:
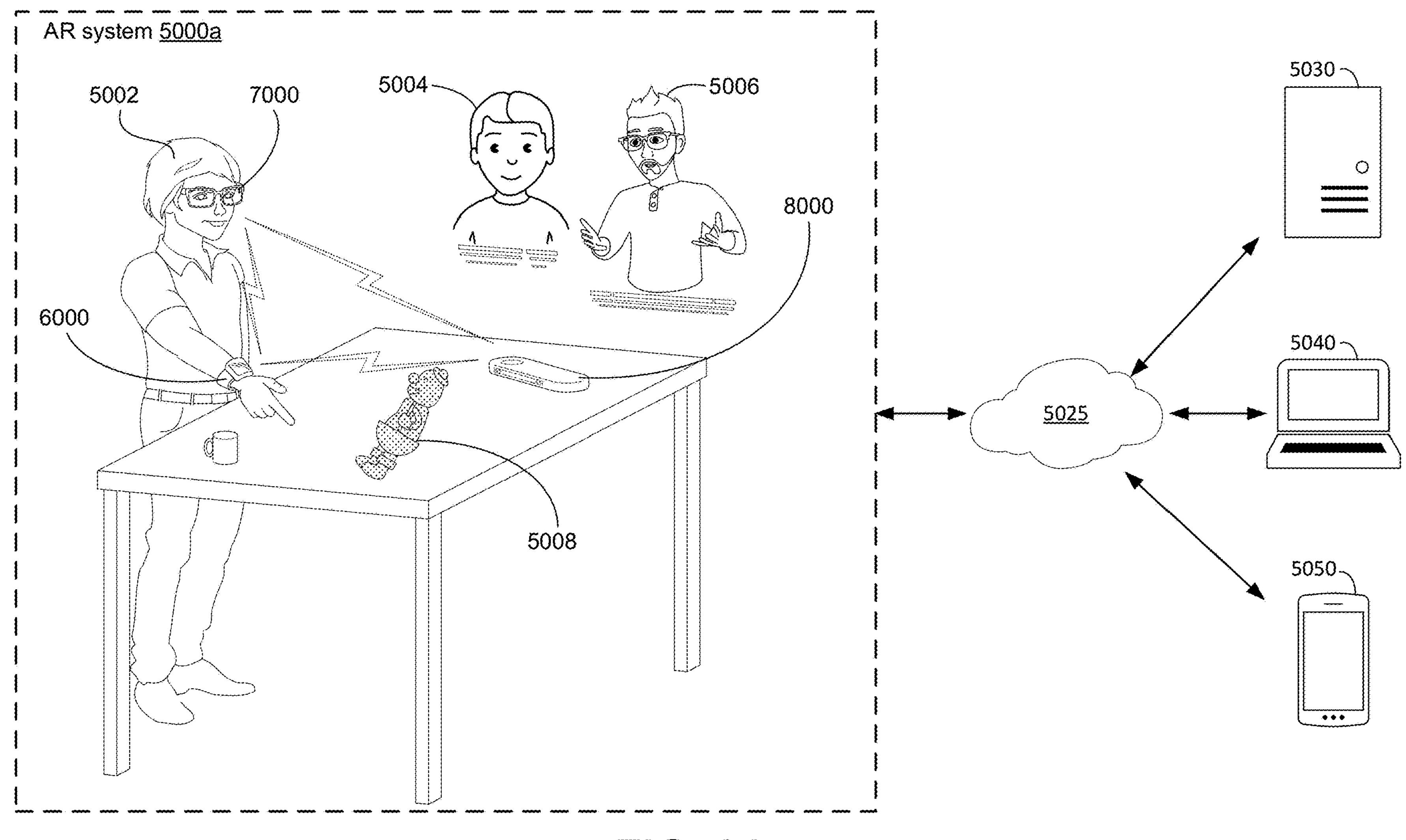
Figure 9B:
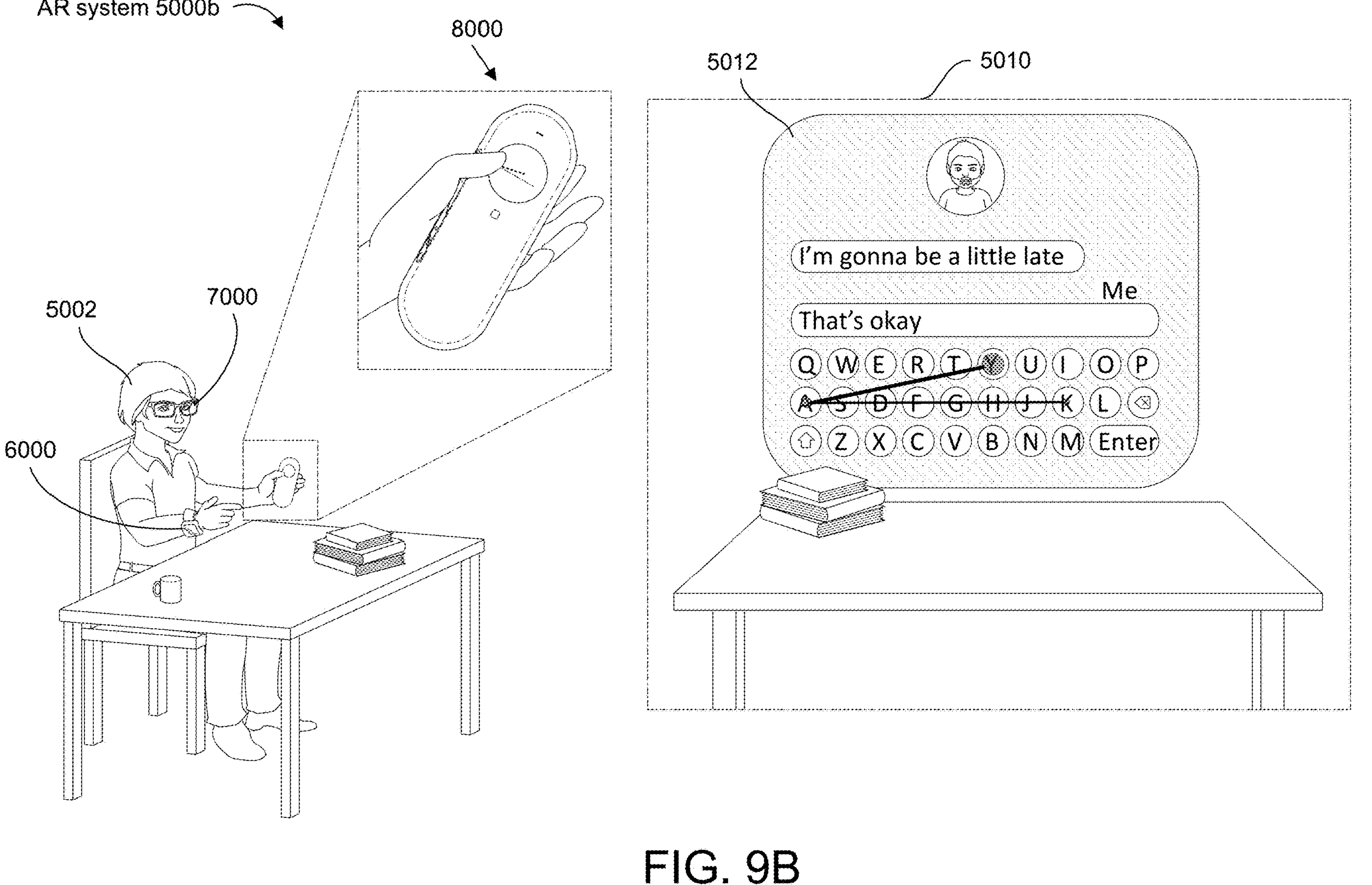
Figures 1, 9D:
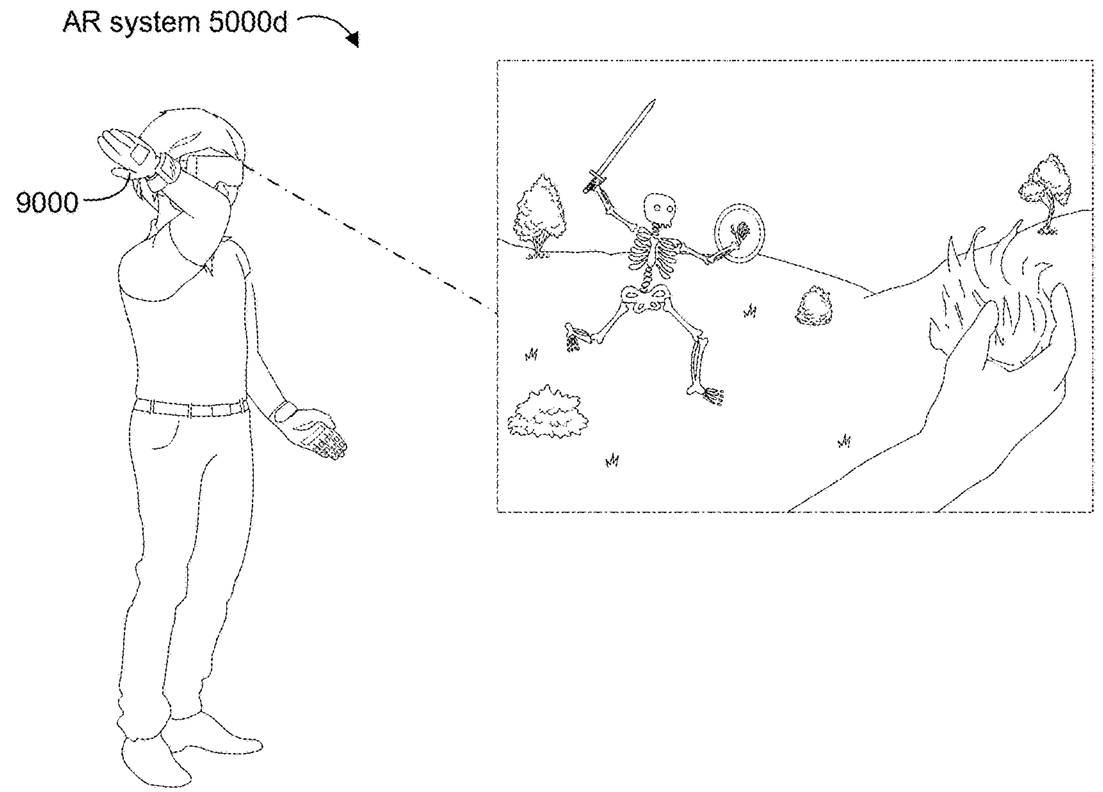
Figures 2, 9D:
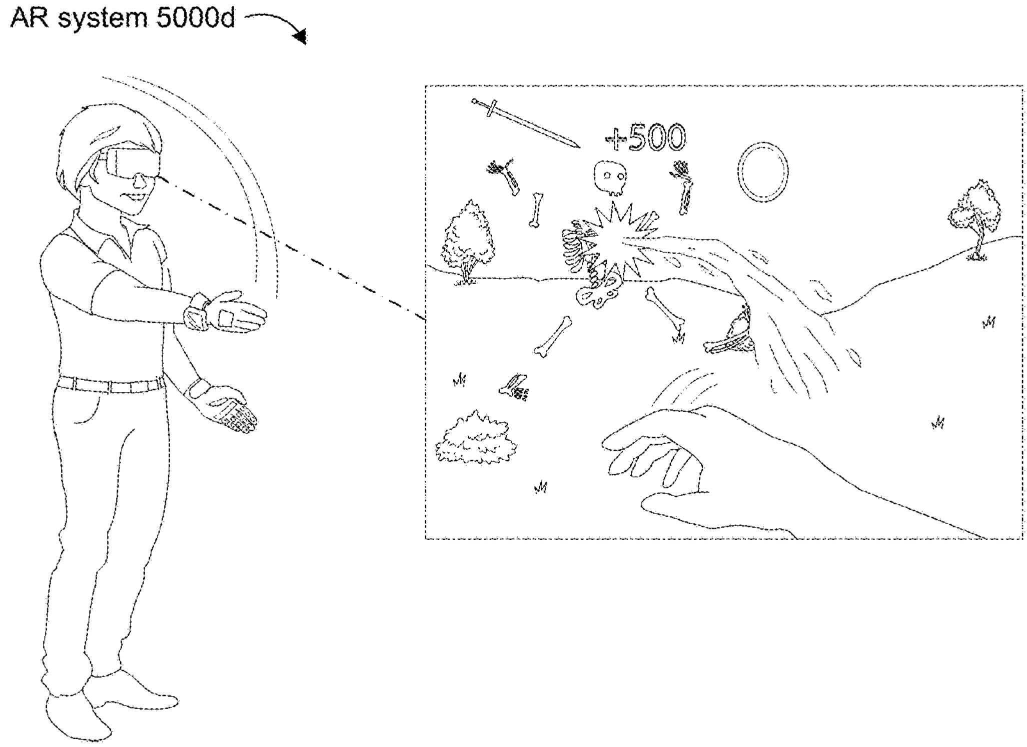

Additionally, although the user scenarios described with respect to the series of FIGS. 1 through 3 are described as separate sequences, in some embodiments, the user scenarios are combined with one another. For example, the sequence described with respect to FIGS. 2A-2H could occur before (or after) the sequences described with respect to FIGS. 1A-1G and 3A-3D (e.g., all three sequences could occur while the user 102 is on a morning walk).

The user scenarios described with respect to the series of FIGS. 1 through 3 involved specific user interface and applications, such as the menu 122 in FIG. 1B and the user interface 304 in FIG. 3B. However, the sequences, gestures, actions, and operations can be used in conjunction with other types of menus and applications, such as web-browsing, note-taking, messaging, social media, word processing, data-entry, programming, and the like.

In some embodiments, other types of events are detected, identified, and responded to. For example, the wearable device may be a smartwatch with a detachable display, and the event may correspond to a display attachment event. In this example, after the attachment event, the display of the wearable device is turned on. As another example, the wearable device may be a pair of smart glasses, and the event may correspond to the user wearing the smart glasses. When the event corresponds to wearing the smart glasses, the system may cause a virtual assistant to prompt the user (e.g., through the speakers) to provide a command.

Figure 4:
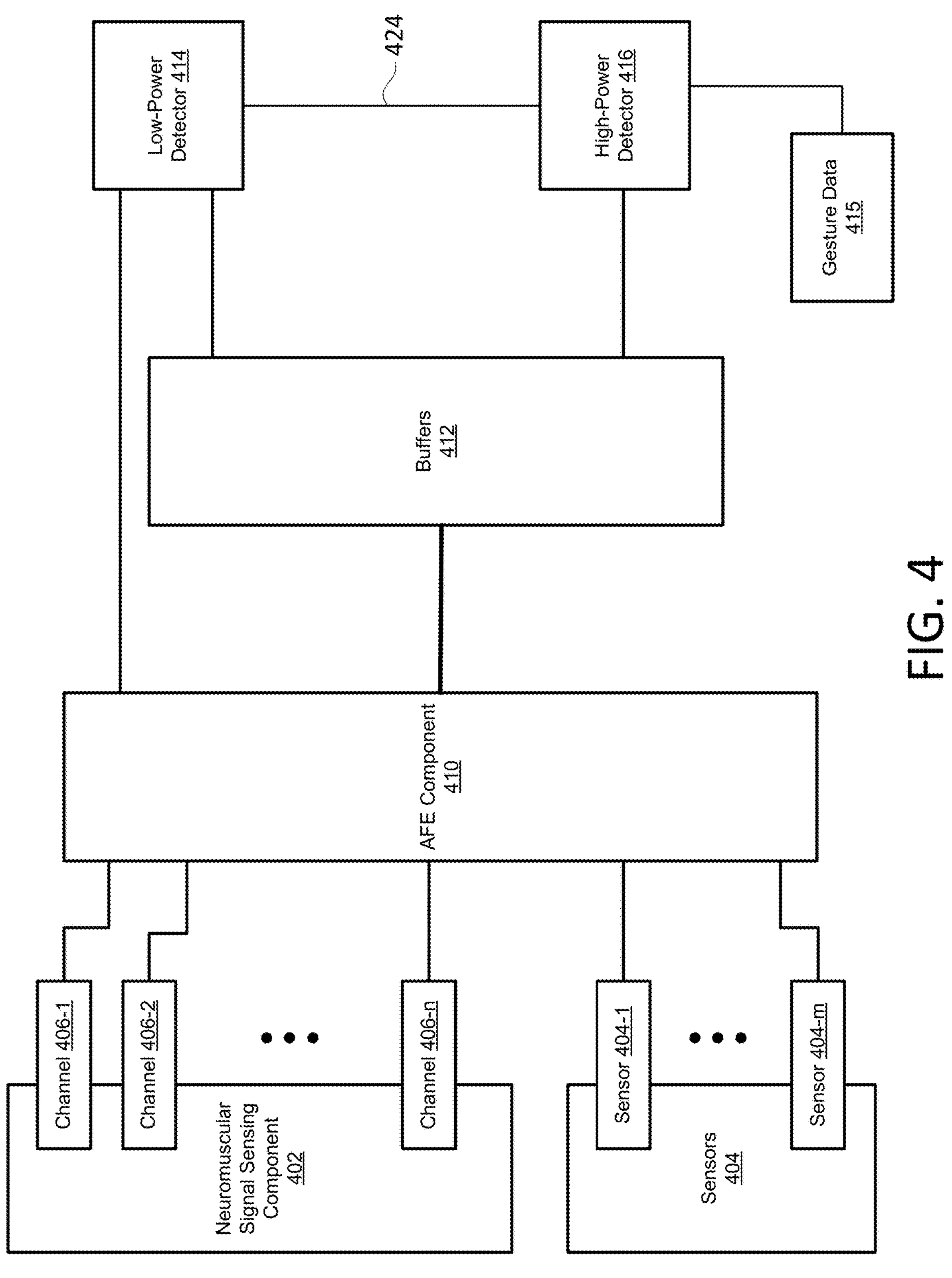
FIG. 4 is a block diagram illustrating example components for detecting and recognizing user gestures in accordance with some embodiments.

FIG. 4 is a block diagram illustrating example components for detecting and recognizing user gestures in accordance with some embodiments. In some embodiments, one or more of the components shown in FIG. 4 are components of a wearable device (e.g., the wrist-wearable device 104). As shown in FIG. 4, a neuromuscular-signal sensing component 402 and sensors 404 are coupled to an analog frontend (AFE) component 410. The neuromuscular-signal sensing component 402 includes multiple channels (e.g., channel 406-1 through 406-*n*). In some embodiments, each channel corresponds to a pair of sensors (e.g., a pair of electrodes). The sensors 404 include a plurality of individual sensors (e.g., sensors 404-1 through 404-*m*). In some embodiments, the sensors 404 include one or more IMUs, accelerometers, gyroscopes, magnetometers, and/or other types of sensors. In some embodiments, the AFE component 410 includes one or more analog-to-digital converters (ADCs). In some embodiments, the AFE component 410 includes one or more filters (e.g., high-pass, band-pass, and/or low-pass filters). For example, the sensors 404 include an accelerometer, and the AFE component 410 may include a high-pass filter for the accelerometer (e.g., a 10 Hertz high-pass filter). In some embodiments, the AFE component 410 includes a classifier subcomponent for obtaining Haar features from EMG signals. In some embodiments, the AFE component 410 includes an ultra-low-power-detector component (e.g., a motion-analyzing component), such as the ultra-low-power detector 202.

The AFE component 410 is coupled to one or more buffers 412. In some embodiments, the buffers 412 include a respective buffer for each channel 406. In some embodiments, the buffers 412 include a respective buffer for each sensor 404. In some embodiments, the buffers 412 include one or more first-in-first-out (FIFO) buffers and/or one or more circular buffers. The buffers 412 store data from the AFE component 410 at least temporarily, e.g., until the data is overwritten, deleted, and/or the buffer is powered down. In some embodiments, the buffers 412 are configured (e.g., have a capacity) to store sensor data corresponding to one or more hand gestures (e.g., 1, 2, or 3 seconds of data).

A low-power detector 414 is coupled to the AFE component 410 and the buffers 412. In some embodiments, the low-power detector 414 is coupled to the AFE component 410 (e.g., to be able to analyze gesture data in real time). In some embodiments, the low-power detector 414 is coupled to the buffers 412 (e.g., to be able to analyze a set of buffered data that corresponds to a gesture period). In some embodiments, the low-power detector 414 is coupled to a particular channel (e.g., the channel 406-1) to identify gestures based on data from the particular channel. In some embodiments, the low-power detector 414 is an instance of the low-power detector 112. In some embodiments, the low-power detector 414 is, or includes, a processor, a controller, a microcontroller, an ASIC, and/or other control circuitry. In some embodiments, the low-power detector 414 is coupled to the AFE component 410 such that the AFE component 410 is able to wake (initiate a power-up process) the low-power detector 414.

A high-power detector 416 is coupled to the buffers 412 (e.g., to be able to analyze a set of buffered data that corresponds to a gesture period). In some embodiments, the high-power detector 416 is coupled to a set of channels 406 (e.g., a larger set of channels than the low-power detector 414). In some embodiments, the high-power detector 416 is an instance of the high-power detector 114. In some embodiments, the high-power detector 416 is, or includes, a system-on-chip (SoC), a processor (e.g., a CPU), a digital signal processor (DSP), a controller, a microcontroller, an ASIC, and/or other control circuitry. The high-power detector 416 is coupled to the low-power detector 414 via a control line 424 such that the low-power detector 414 is able to wake (initiate a power up process) the high-power detector 416. In some embodiments, the high-power detector 416 is coupled to the AFE component 410 such that the AFE component 410 is able to wake the high-power detector 416. In accordance with some embodiments, the high-power detector 416 is coupled to gesture data 415 (e.g., stored in memory at the device). In some embodiments, the gesture data 415 is used by the high-power detector 416 to supplement data from the buffers 412 for gesture identification and/or recognition. For example, the high-power detector 416 is configured to select gesture data 415 that corresponds to data from the buffers 412 (e.g., matches the data from the buffers with gesture data corresponding to a particular type of user gesture).

Figure 5A:
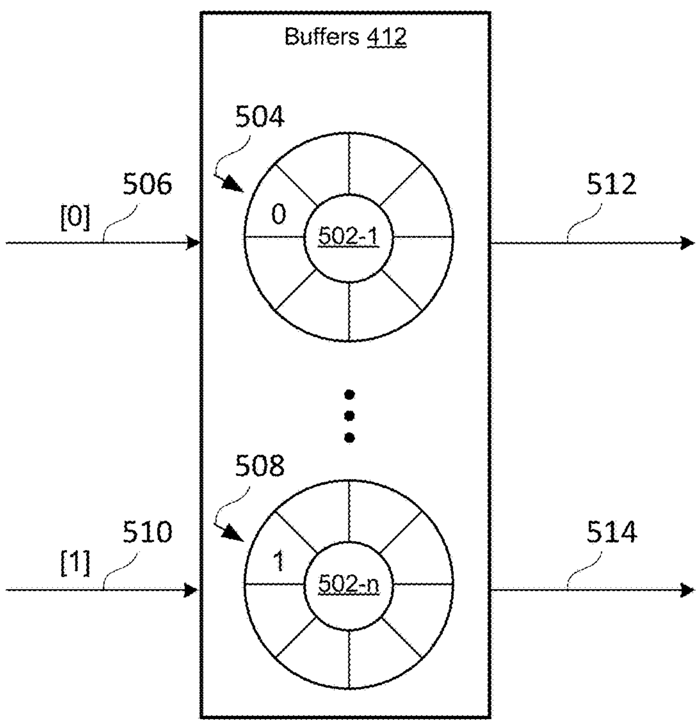
FIGS. 5A-5D illustrate example operation of buffer components in accordance with some embodiments.

FIGS. 5A-5D illustrate example operation of buffer components in accordance with some embodiments. FIG. 5A shows the buffers 412 including multiple circular buffers 502 (e.g., buffer 502-1 through buffer **502-*n*). Each circular buffer 502 in FIG. 5A is able to store up to eight data points. In some embodiments, each circular buffer 502 has a capacity that corresponds to a gesture performance period (e.g., 1-2 seconds). FIG. 5A corresponds to a first time when a first value (0) is obtained for the buffer 502-1 via an input line 506 and a first value (1) is obtained for the buffer 502-*n* via an input line 510. In some embodiments, each input line is coupled to the AFE component 410. In some embodiments, each input line corresponds to a respective channel 406. The buffer 502-1 stores its first value (0) at a location based on a write pointer 504, and the buffer 502—stores its first value (1) at a location based on the write pointer 508. In FIG. 5A, data is not read out of either buffer 502 (e.g., output lines 512 and 514** are inactive). In accordance with some embodiments, each write pointer moves in a clockwise direction (e.g., iteratively refers to a location that is clockwise from the previous write location).

Figure 5B:
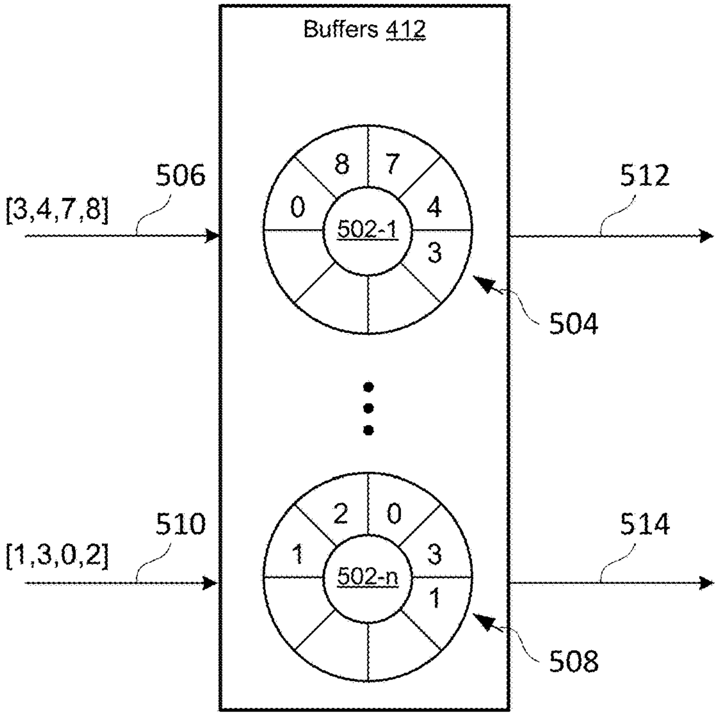

FIG. 5B shows operation of the buffers 412 at a second time, subsequent to the first time. In FIG. 5B, a series of values (3,4,7,8) were obtained via the input line 506 and stored in the buffer 502-1 in accordance with the write pointer 504. Also, in FIG. 5B, a series of values (1,3,0,2) were obtained via the input line 510 and stored in the buffer **502-*n* in accordance with the write pointer 508. In FIG. 5B, data is not read out of either buffer 502 (e.g., the output lines 512 and 514** are inactive).

Figure 5C:
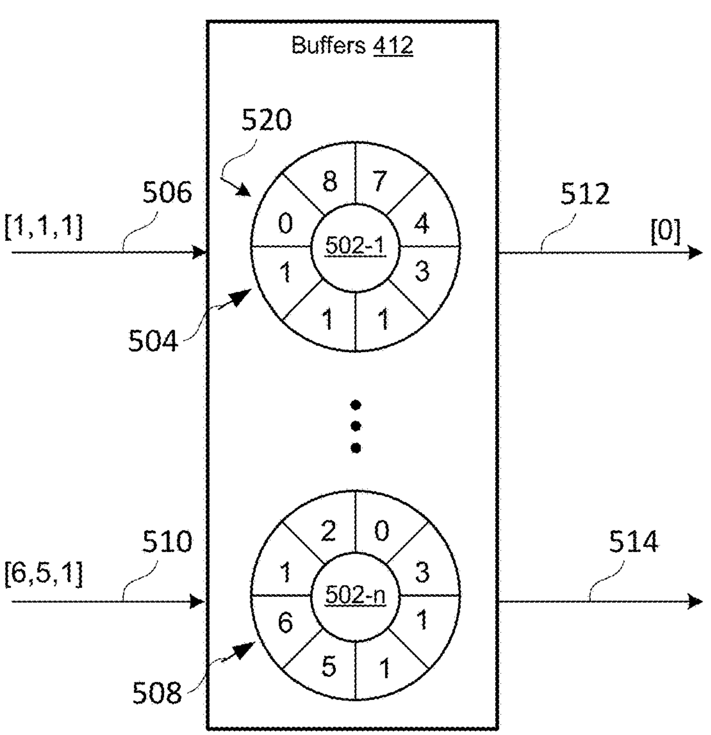

FIG. 5C shows operation of the buffers 412 at a third time, subsequent to the second time. In FIG. 5C, a second series of values (1,1,1) were obtained via the input line 506 and stored in the buffer 502-1 in accordance with the write pointer 504; and a second series of values (6,5,1) were obtained via the input line 510 and stored in the buffer **502-*n* in accordance with the write pointer 508. In FIG. 5C, each buffer 502 is filled with data (e.g., at full capacity), and the first data value (0) is read out via the output line 512 in accordance with read pointer 520**.

Figure 5D:
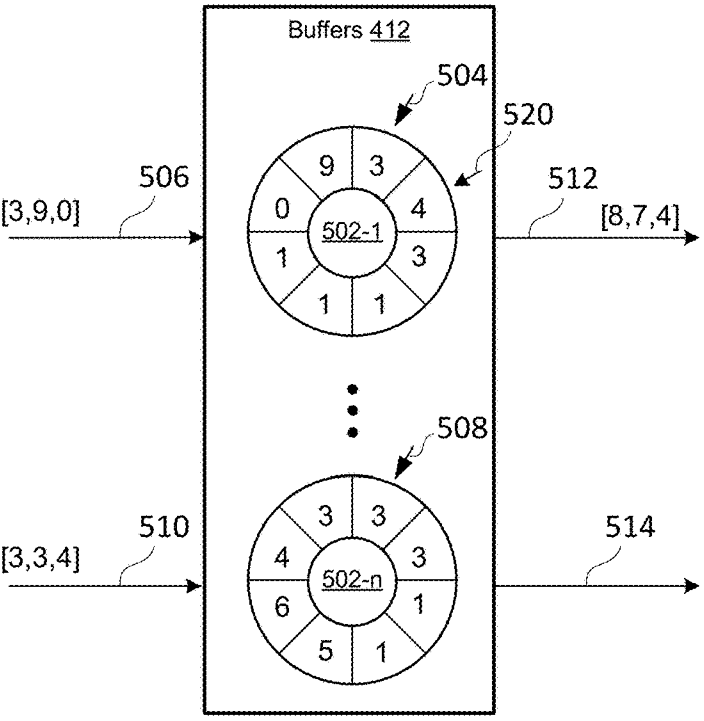

FIG. 5D shows operation of the buffers 412 at a fourth time, subsequent to the third time. In FIG. 5D, a third series of values (3,9,0) were obtained via the input line 506 and stored in the buffer 502-1 in accordance with the write pointer 504 (e.g., overwriting the (0,8,7) values that were stored previously); and a third series of values (3,3,4) were obtained via the input line 510 and stored in the buffer **502-*n* in accordance with the write pointer 508 (e.g., overwriting the (1,2,0) values that were stored previously). FIG. 5D also shows values (8,7,4) being read out via the output line 512 (e.g., read out prior to being overwritten as the read pointer 520 is referencing a location that is one location ahead of the write pointer 504). In this example, the values (1,2,0) stored in the buffer 502-*n* in FIG. 5C were not read out prior to being overwritten in FIG. 5D**.

Figure 6:
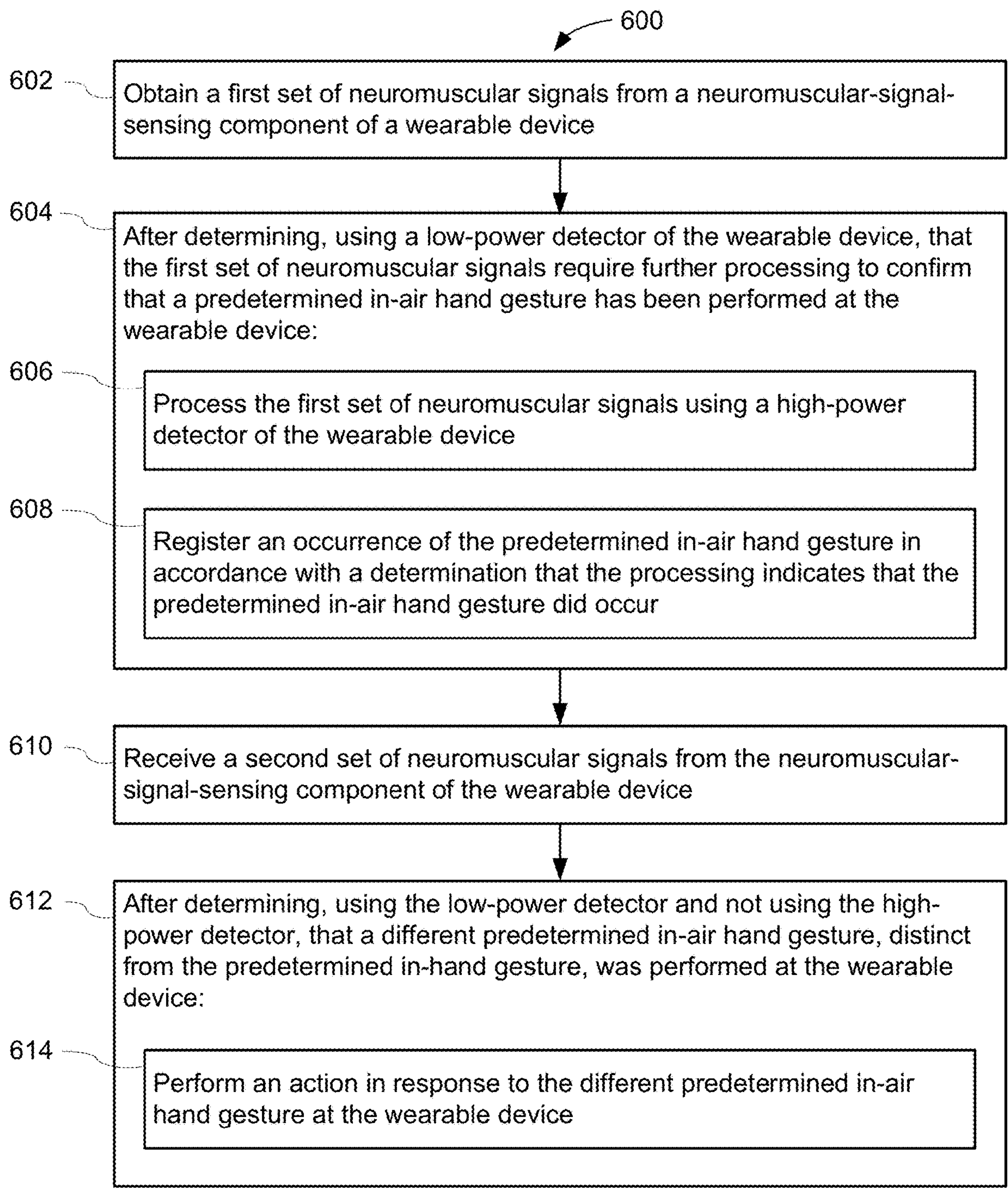
FIG. 6 is a flow diagram illustrating an example method for confirming occurrence of a predetermined event in accordance with some embodiments.

FIG. 6 is a flow diagram illustrating a method 600 for confirming occurrence of a predetermined event in accordance with some embodiments. The method 600 is performed at a computing system (e.g., a wearable device or intermediary device) having one or more processors and memory. In some embodiments, the memory stores one or more programs configured for execution by the one or more processors. At least some of the operations shown in FIG. 6 correspond to instructions stored in a computer memory or computer-readable storage medium (e.g., the memory 6080, 6050, and/or 7050). In some embodiments, the computing system is a wearable device, such as the wrist-wearable device 104 or the head-wearable device 106. In some embodiments, the computing system is, or includes, an intermediary device such as a smartphone.

The system obtains (602) a first set of neuromuscular signals from a neuromuscular-signal sensing component (e.g., the neuromuscular-signal sensing component 402) of a wearable device. In some embodiments, the neuromuscular-signal sensing component includes an IMU and/or an EMG sensor. In some embodiments, the neuromuscular-signal sensing component includes a plurality of channels (e.g., channels 406).

After determining (604), using a low-power detector (e.g., the low-power detector 414) of the wearable device, that the first set of neuromuscular signals require further processing to confirm that a predetermined in-air hand gesture has been performed at the wearable device, the system processes (606) the first set of neuromuscular signals using a high-power detector (e.g., the high-power detector 416) of the wearable device. In some embodiments (i) the first set of neuromuscular signals is a set of analog signals; (ii) the system converts the set of analog signals to a corresponding set of digital signals using an analog-to-digital converter (e.g., the AFE component 410) component; and (iii) the determining that the respective neuromuscular signal requires further processing is based on analysis of a respective digital signal of the corresponding set of digital signals.

In some embodiments: (i) the neuromuscular-signal sensing component includes a plurality of neuromuscular-signal sensors that correspond to the high-power detector; (ii) while the high-power detector is in an active state, data from the plurality of neuromuscular-signal sensors is processed by the high-power detector; and (iii) while the high-power detector is in an inactive state, data from the plurality of neuromuscular-signal sensors is stored at the wearable device and not processed by the high-power detector.

In some embodiments: (i) prior to determining that the first set of neuromuscular signals requires further processing to confirm that the predetermined in-air hand gesture has been performed at the wearable device, the high-power detector is in an inactive state; and (ii) in accordance with determining that the first set of neuromuscular signals requires further processing to confirm that the predetermined in-air hand gesture has been performed at the wearable device, the system transitions the high-power detector to an active state.

In some embodiments, the low-power detector operates in a default-active state to process detected neuromuscular signals from the neuromuscular-signal sensing component, and the high-power detector operates in a default-inactive state in which it does not process neuromuscular signals in the absence of a trigger signal.

After determining (604), using a low-power detector of the wearable device, that the first set of neuromuscular signals require further processing to confirm that a predetermined in-air hand gesture has been performed at the wearable device, the system also registers (608) an occurrence of the predetermined in-air hand gesture in accordance with a determination that the processing indicates that the predetermined in-air hand gesture did occur. In some embodiments, the predetermined in-air hand gesture comprises a wake gesture.

In some embodiments: (i) the neuromuscular-signal sensing component includes a plurality of neuromuscular-signal sensors that correspond to the high-power detector; (ii) while the high-power detector is in an active state, each of the plurality of neuromuscular-signal sensors are active; and (iii) while the high-power detector is in an inactive state, at least a subset of the plurality of neuromuscular-signal sensors are inactive.

In some embodiments: (i) the system determines, using the low-power detector, that the respective neuromuscular signal of the first set of neuromuscular signals requires further processing to confirm that the predetermined in-air hand gesture has been performed at the wearable device; and (ii) in accordance with the determination that the respective neuromuscular signal of the first set of neuromuscular signals requires further processing, the system transitions the high-power detector to an active state and transitioning the low-power detector to an inactive state. In some embodiments, after registering the occurrence of the predetermined in-air hand gesture, the system transitions the high-power detector to an inactive state and transitioning the low-power detector to an active state.

In some embodiments, before registering the occurrence of the predetermined in-air hand gesture, the system evaluates data from a second sensor (e.g., the sensors 404) of the wearable device to confirm that the predetermined in-air hand gesture occurred at the wearable device, where the second sensor is distinct from the neuromuscular-signal sensing component. In some embodiments, in conjunction with determining, by using the low-power detector, that the respective neuromuscular signal requires further processing, the system evaluates data from a second sensor of the wearable device to confirm that an in-air hand gesture occurred, where the second sensor is distinct from the neuromuscular-signal sensing component. In some embodiments, the second sensor of the wearable device is an IMU.

In some embodiments, the first set of neuromuscular signals is stored in a buffer (e.g., the buffers 412) at the wearable device, and the high-power detector is configured to obtain the first set of neuromuscular signals from the buffer. In some embodiments: (i) in accordance with a determination that the buffer has insufficient data to confirm that the predetermined in-air hand gesture has been performed at the wearable device, the system selects supplemental data for the data in the buffer, including one or more of: (a) using machine learning to predict precursor neuromuscular signals; and (b) selecting a predefined set of precursor neuromuscular signals based on the data in the buffer; and (ii) aggregating the data in the buffer and the selected supplemental data.

In some embodiments, in accordance with a determination that the buffer has sufficient data to confirm that the predetermined in-air hand gesture has been performed at the wearable device, the system forgoes selecting supplemental data for the data in the buffer. In some embodiments, a capacity of the buffer corresponds to a minimum length of a neuromuscular-signal-detection period during which the predetermined in-air hand gesture is performed.

The system receives (610) a second set of neuromuscular signals from the neuromuscular-signal sensing component of the wearable device.

After determining (612), using the low-power detector and not using the high-power detector, that a different predetermined in-air hand gesture, distinct from the predetermined in-hand gesture, was performed at the wearable device, the system performs (614) an action in response to the different predetermined in-air hand gesture at the wearable device.

In some embodiments: (i) the predetermined in-air hand gesture includes a wake gesture followed by at least one other in-air hand gesture; and (ii) registering the occurrence of the predetermined in-air hand gesture includes: (a) registering an occurrence of the wake gesture to cause the high-power detector to remain in an active state; and (b) registering an occurrence of the other in-air hand gesture to cause the wearable device to execute a function that corresponds to the other in-air gesture to perform an action within a user interface.

In some embodiments, prior to using the low-power detector to determine that the respective neuromuscular signal of the first set of neuromuscular signals requires further processing to confirm that the predetermined in-air hand gesture has been performed at the wearable device, the system transitions the low-power detector from an inactive state to an active state based on muscular activity detected via the neuromuscular-signal sensing component satisfying a muscular-activity wake-up criteria. In some embodiments, while the low-power detector is in the active state, in accordance with a determination that data from the neuromuscular-signal sensing component indicates that the muscular-activity wake-up criteria are no longer satisfied, the system transitions the low-power detector to the inactive state.

In some embodiments, after performing the action in response to the different predetermined in-air hand gesture at the wearable device, the system transitions both the high-power detector and the low-power detector to inactive states in accordance with a predetermined amount of time having elapsed. In some embodiments, during the predetermined amount of time, no respective neuromuscular signal is determined to require further processing to confirm that an in-air hand gesture has been performed at the wearable device.

In some embodiments: (i) the system determines, using the low-power detector, that another different predetermined in-air hand gesture was performed at the wearable device, the determining based on a respective neuromuscular signal of a third set of neuromuscular signals, where the another different predetermined in-air hand gesture is distinct from the different predetermined in-air hand gesture and the predetermined in-air hand gesture; and (ii) in response to determining that the another different predetermined in-air hand gesture was performed at the wearable device, the system performs another action at the wearable device, the another action being distinct from the action.

In some embodiments: (i) the system determines, using the low-power detector, that one additional predetermined in-air hand gesture was performed at the wearable device, the determining based on a respective neuromuscular signal of a fourth set of neuromuscular signals, where the one additional predetermined in-air hand gesture is distinct from the another different predetermined in-air hand gesture, the different predetermined in-air hand gesture, and the predetermined in-air hand gesture; and (ii) in response to determining that the one additional predetermined in-air hand gesture was performed at the wearable device, the system performs yet another action at the wearable device, the yet another action being distinct from the action and the another action. In some embodiments, one or both of the action and the another action are performed while a display of the wearable device is in an off state.

Figure 7:
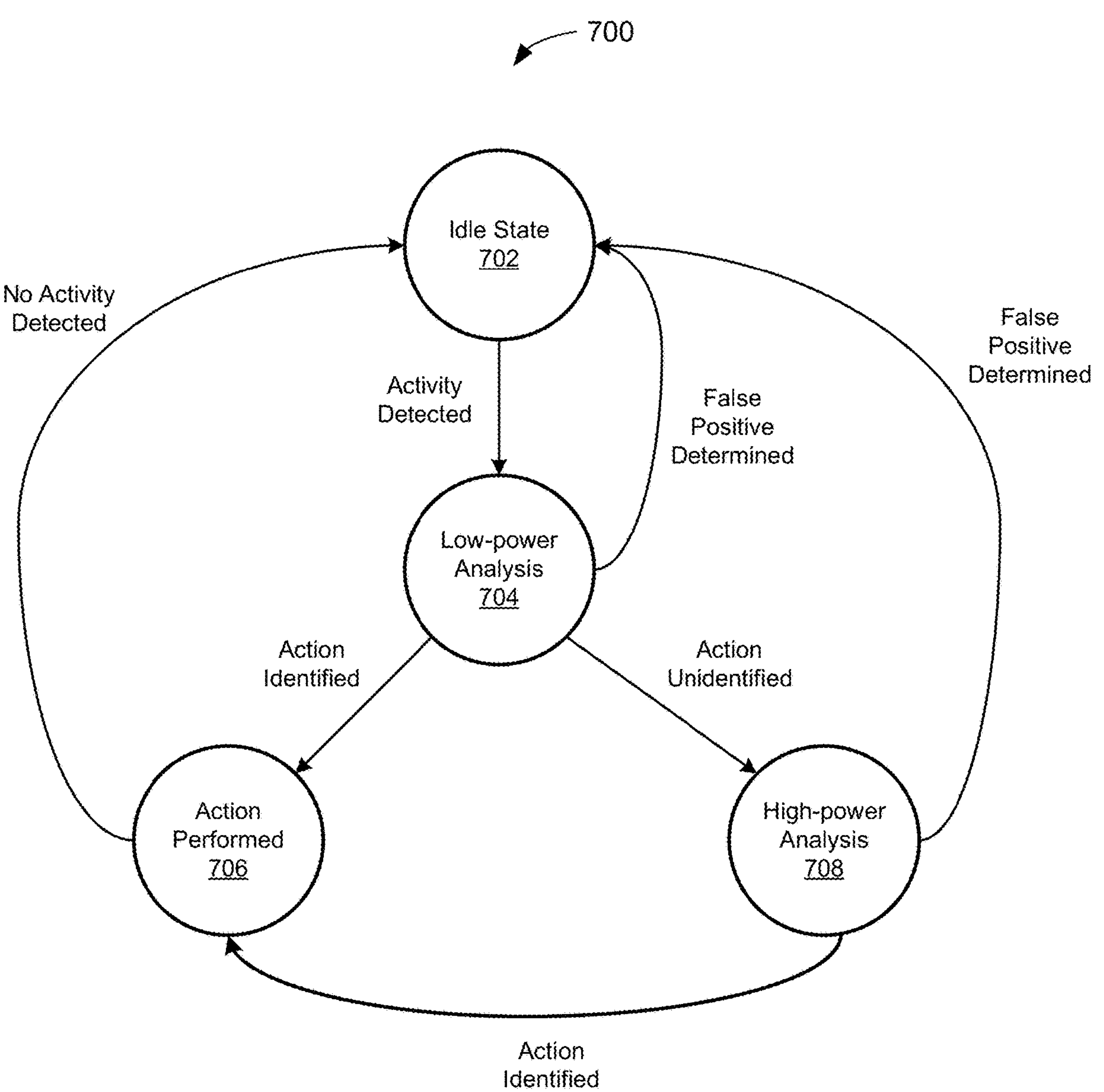
FIG. 7 is a flow diagram illustrating an example method for identifying actions and performing corresponding actions in accordance with some embodiments.

FIG. 7 is a flow diagram illustrating a method 700 for identifying actions and performing corresponding actions in accordance with some embodiments. The method 700 is performed at a computing system (e.g., a wearable device or intermediary device) having one or more processors and memory. In some embodiments, the memory stores one or more programs configured for execution by the one or more processors. At least some of the operations shown in FIG. 7 correspond to instructions stored in a computer memory or computer-readable storage medium (e.g., the memory 6080, 6050, and/or 7050). In some embodiments, the computing system is a wearable device, such as the wrist-wearable device 104 or the head-wearable device 106. In some embodiments, the computing system is, or includes, an intermediary device such as a smartphone.

At 702, the system is in an idle state (e.g., awaiting user activity) during which the high-power detector (e.g., the high-power detector 114) and/or the low-power detector (e.g., the low-power detector 112) is in an inactive (low-power) state. In some embodiments, while in the idle state 702, neuromuscular sensors are active (e.g., to obtain neuromuscular data for user movements and/or gestures). In some embodiments, while in the idle state 702, data from the neuromuscular sensors is stored in one or more buffers (e.g., for potential future analysis by the low-power and/or high-power detector).

In accordance with activity being detected (e.g., by the low-power detector and/or an ultra-low-power detector), the system transitions to a low-power analysis state 704. In the low-power analysis state 704 the system attempts to identify a user action (user gesture) from the detected activity. For example, activity data is transferred to the low-power detector for analysis.

In accordance with a determination that the detected activity is a false positive (e.g., does not correspond to any user action), the system transitions back to the idle state 702. In accordance with an action being identified by the low-power analysis, the system transitions to an action performance state 706 (performs the identified action). In some embodiments, transitioning to the action performance state 706 includes transitioning the low-power detector to an inactive (sleep) state. After performing the identified action, if no further activity is detected (e.g., within a preset time period), the system transitions back to the idle state 702.

In accordance with an action being unidentified (e.g., a potential action is identified), the system transitions to a high-power analysis state 708. In the high-power analysis state 708 the system attempts to identify the user action (user gesture) from the detected activity, e.g., using additional compute power, such as the high-power detector 114.

In accordance with a determination that the detected activity is a false positive (e.g., does not correspond to any user action), the system transitions back to the idle state 702. In accordance with an action being identified by the high-power analysis, the system transitions to an action performance state 706 (performs the identified action). In some embodiments, transitioning to the action performance state 706 includes transitioning the high-power detector and/or the low-power detector to an inactive (sleep) state. After performing the identified action, if no further activity is detected (e.g., within a preset time period), the system transitions back to the idle state 702. In some embodiments, transitioning to the idle state 702 (e.g., from any other state) includes transitioning the high-power detector and/or the low-power detector to an inactive (sleep) state.

Figure 8:
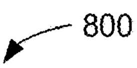
FIG. 8 is a flow diagram illustrating an example method for reporting gestures in accordance with some embodiments.
Figure 8:
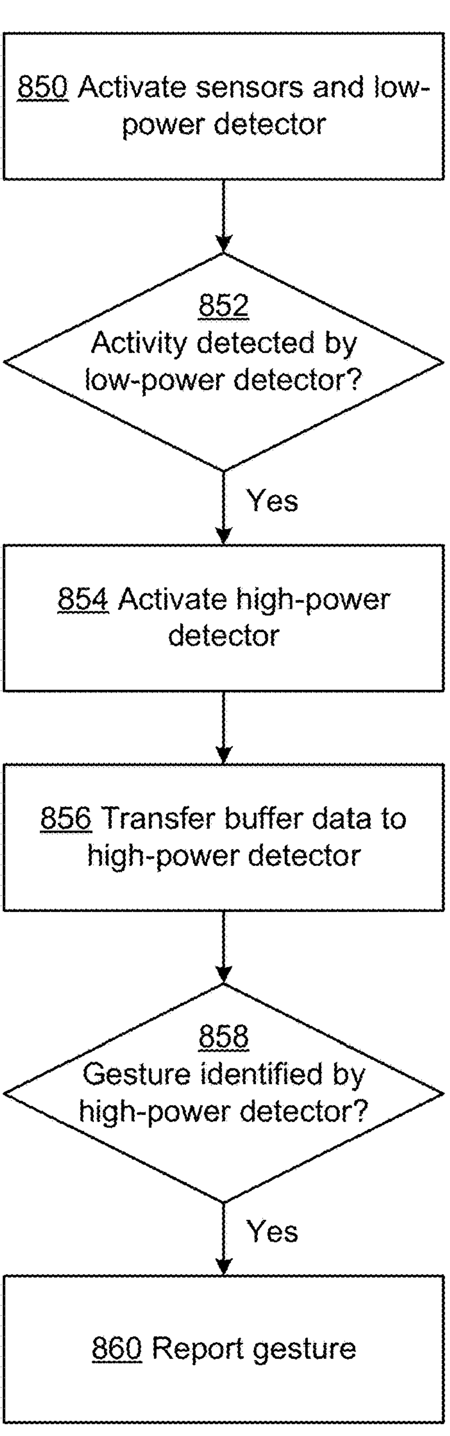

FIG. 8 is a flow diagram illustrating a method 800 for reporting gestures in accordance with some embodiments. The method 800 is performed at a computing system (e.g., a wearable device or intermediary device) having one or more processors and memory. In some embodiments, the memory stores one or more programs configured for execution by the one or more processors. At least some of the operations shown in FIG. 8 correspond to instructions stored in a computer memory or computer-readable storage medium (e.g., the memory 6080, 6050, and/or 7050). In some embodiments, the computing system is a wearable device, such as the wrist-wearable device 104 or the head-wearable device 106. In some embodiments, the computing system is, or includes, an intermediary device such as a smartphone.

The system activates (850) one or more sensors (e.g., the neuromuscular-signal sensing component 402) and a low-power detector (e.g., the low-power detector 414). In some embodiments, the system activates the one or more sensors and the low-power detector in accordance with the system being powered-up, worn by a user, and/or set to a gesture-detection state.

The system determines (852) whether activity is detected by the low-power detector. In accordance with activity being detected, the system activates (854) a high-power detector (e.g., the high-power detector 416). For example, the system supplies additional power to the high-power detector.

The system transfers (856) buffer data to the high-power detector. For example, the system transfers data from the buffers 412 to the high-power detector 416. The system determines (858) whether a gesture is identified using the high-power detector (e.g., based on the buffer data). In accordance with a gesture being identified (recognized), the system reports (860) the gesture (e.g., so that an action corresponding to the gesture can be performed). In some embodiments, in accordance with a gesture not being identified, the high-power detector is disabled (returns to an inactive state) and the system returns to monitoring for activity.

Having thus described example sequences and methods of operation that make use of the example sequences, attention will now be directed to system-level depictions of hardware and software on which (or with which) the methods can be implemented.

Example Systems

FIGS. 9A-9D illustrate example AR systems in accordance with some embodiments. FIG. 9A shows an AR system 5000*a* and example user interactions using a wrist-wearable device 6000, a head-wearable device (e.g., AR system 7000), and/or a handheld intermediary processing device (HIPD) 8000. FIG. 9B shows an AR system 5000*b* and second example user interactions using the wrist-wearable device 6000, the AR system 7000, and/or an HIPD 8000. FIGS. 9C-1 and 9C-2 show an AR system 5000*c* and third example user interactions using a wrist-wearable device 6000, a head-wearable device (e.g., VR headset 7010), and/or an HIPD 8000. FIGS. 9D-1 and 9D-2 show a fourth AR system 5000*d* and fourth example user interactions using a wrist-wearable device 6000, VR headset 7010, and/or device 9000 (e.g., wearable haptic gloves). The above-example AR systems (described in detail below) can perform the various functions and/or operations described above with reference to FIGS. 1-8.

The wrist-wearable device 6000 and its components are described below in reference to FIGS. 10A-10B; the head-wearable devices and their components are described below in reference to FIGS. 11A-11D; and the HIPD 8000 and its components are described below in reference to FIGS. 12A-12B. Wearable gloves and their components are described below in reference to FIGS. 13A-13C. As shown in FIG. 9A, the wrist-wearable device 6000, the head-wearable devices, and/or the HIPD 8000 can communicatively couple via a network 5025 (e.g., cellular, near field, Wi-Fi, personal area network, or wireless LAN). Additionally, the wrist-wearable device 6000, the head-wearable devices, and/or the HIPD 8000 can also communicatively couple with one or more servers 5030, computers 5040 (e.g., laptops and other computers), mobile devices 5050 (e.g., smartphones and tablets), and/or other electronic devices via the network 5025 (e.g., cellular, near field, Wi-Fi, personal area network, or wireless LAN) Similarly, the device 9000 can also communicatively couple with the wrist-wearable device 6000, the head-wearable devices, the HIPD 8000, the one or more servers 5030, the computers 5040, the mobile devices 5050, and/or other electronic devices via the network 5025.

Turning to FIG. 9A, a user 5002 is shown wearing the wrist-wearable device 6000 and the AR system 7000 and having the HIPD 8000 on their desk. The wrist-wearable device 6000, the AR system 7000, and the HIPD 8000 facilitate user interaction with an AR environment. In particular, as shown by the AR system 5000*a*, the wrist-wearable device 6000, the AR system 7000, and/or the HIPD 8000 cause presentation of one or more avatars 5004, digital representations of contacts 5006, and virtual objects 5008. As discussed below, the user 5002 can interact with the one or more avatars 5004, digital representations of the contacts 5006, and virtual objects 5008 via the wrist-wearable device 6000, the AR system 7000, and/or the HIPD 8000.

The user 5002 can use any of the wrist-wearable device 6000, the AR system 7000, and/or the HIPD 8000 to provide user inputs. For example, the user 5002 can perform one or more hand gestures that are detected by the wrist-wearable device 6000 (e.g., using one or more EMG sensors and/or IMUs, described below in reference to FIGS. 12A-12B) and/or AR system 7000 (e.g., using one or more image sensor or camera, described below in reference to FIGS. 11A-11B) to provide a user input. Alternatively, or additionally, the user 5002 can provide a user input via one or more touch surfaces of the wrist-wearable device 6000, the AR system 7000, and/or the HIPD 8000, and/or voice commands captured by a microphone of the wrist-wearable device 6000, the AR system 7000, and/or the HIPD 8000. In some embodiments, the wrist-wearable device 6000, the AR system 7000, and/or the HIPD 8000 include a digital assistant to help the user in providing a user input (e.g., completing a sequence of operations, suggesting different operations or commands, providing reminders, or confirming a command). In some embodiments, the user 5002 provides a user input via one or more facial gestures and/or facial expressions. For example, cameras of the wrist-wearable device 6000, the AR system 7000, and/or the HIPD 8000 can track the user 5002's eyes for navigating a user interface.

The wrist-wearable device 6000, the AR system 7000, and/or the HIPD 8000 can operate alone or in conjunction to allow the user 5002 to interact with the AR environment. In some embodiments, the HIPD 8000 is configured to operate as a central hub or control center for the wrist-wearable device 6000, the AR system 7000, and/or another communicatively coupled device. For example, the user 5002 can provide an input to interact with the AR environment at any of the wrist-wearable device 6000, the AR system 7000, and/or the HIPD 8000, and the HIPD 8000 can identify one or more back-end and front-end tasks to cause the performance of the requested interaction and distribute instructions to cause the performance of the one or more back-end and front-end tasks at the wrist-wearable device 6000, the AR system 7000, and/or the HIPD 8000. In some embodiments, a back-end task is background processing task that is not perceptible by the user (e.g., rendering content, decompression, or compression), and a front-end task is a user-facing task that is perceptible to the user (e.g., presenting information to the user or providing feedback to the user). As described below in reference to FIGS. 12A-12B, the HIPD 8000 can perform the back-end tasks and provide the wrist-wearable device 6000 and/or the AR system 7000 operational data corresponding to the performed back-end tasks such that the wrist-wearable device 6000 and/or the AR system 7000 can perform the front-end tasks. In this way, the HIPD 8000, which can have more computational resources and greater thermal headroom than the wrist-wearable device 6000 and/or the AR system 7000, performs computationally intensive tasks and reduces the computer resource utilization and/or power usage of the wrist-wearable device 6000 and/or the AR system 7000.

In the example shown by the AR system 5000*a*, the HIPD 8000 identifies one or more back-end tasks and front-end tasks associated with a user request to initiate an AR video call with one or more other users (represented by the avatar 5004 and the digital representation of the contact 5006) and distributes instructions to cause the performance of the one or more back-end tasks and front-end tasks. In particular, the HIPD 8000 performs back-end tasks for processing and/or rendering image data (and other data) associated with the AR video call and provides operational data associated with the performed back-end tasks to the AR system 7000 such that the AR system 7000 perform front-end tasks for presenting the AR video call (e.g., presenting the avatar 5004 and the digital representation of the contact 5006).

In some embodiments, the HIPD 8000 operates as a focal or anchor point for causing the presentation of information. This allows the user 5002 to be generally aware of where information is presented. For example, as shown in the AR system 5000*a*, the avatar 5004 and the digital representation of the contact 5006 are presented above the HIPD 8000. In particular, the HIPD 8000 and the AR system 7000 operate in conjunction to determine a location for presenting the avatar 5004 and the digital representation of the contact 5006. In some embodiments, information can be presented a predetermined distance from the HIPD 8000 (e.g., within five meters). For example, as shown in the AR system 5000*a*, virtual object 5008 is presented on the desk some distance from the HIPD 8000. Similar to the above example, the HIPD 8000 and the AR system 7000 can operate in conjunction to determine a location for presenting the virtual object 5008. Alternatively, in some embodiments, presentation of information is not bound by the HIPD 8000. More specifically, the avatar 5004, the digital representation of the contact 5006, and the virtual object 5008 do not have to be presented within a predetermined distance of the HIPD 8000.

User inputs provided at the wrist-wearable device 6000, the AR system 7000, and/or the HIPD 8000 are coordinated such that the user can use any device to initiate, continue, and/or complete an operation. For example, the user 5002 can provide a user input to the AR system 7000 to cause the AR system 7000 to present the virtual object 5008 and, while the virtual object 5008 is presented by the AR system 7000, the user 5002 can provide one or more hand gestures via the wrist-wearable device 6000 to interact and/or manipulate the virtual object 5008.

FIG. 9B shows the user 5002 wearing the wrist-wearable device 6000 and the AR system 7000 and holding the HIPD 8000. In the AR system 5000*b*, the wrist-wearable device 6000, the AR system 7000, and/or the HIPD 8000 are used to receive and/or provide one or more messages to a contact of the user 5002. In particular, the wrist-wearable device 6000, the AR system 7000, and/or the HIPD 8000 detect and coordinate one or more user inputs to initiate a messaging application and prepare a response to a received message via the messaging application.

In some embodiments, the user 5002 initiates, via a user input, an application on the wrist-wearable device 6000, the AR system 7000, and/or the HIPD 8000 that causes the application to initiate on at least one device. For example, in the AR system 5000*b* the user 5002 performs a hand gesture associated with a command for initiating a messaging application (represented by messaging user interface 5012); the wrist-wearable device 6000 detects the hand gesture; and, based on a determination that the user 5002 is wearing AR system 7000, causes the AR system 7000 to present a messaging user interface 5012 of the messaging application. The AR system 7000 can present the messaging user interface 5012 to the user 5002 via its display (e.g., as shown by user 5002's field of view 5010). In some embodiments, the application is initiated and ran on the device (e.g., the wrist-wearable device 6000, the AR system 7000, and/or the HIPD 8000) that detects the user input to initiate the application, and the device provides another device operational data to cause the presentation of the messaging application. For example, the wrist-wearable device 6000 can detect the user input to initiate a messaging application, initiate and run the messaging application, and provide operational data to the AR system 7000 and/or the HIPD 8000 to cause presentation of the messaging application. Alternatively, the application can be initiated and ran at a device other than the device that detected the user input. For example, the wrist-wearable device 6000 can detect the hand gesture associated with initiating the messaging application and cause the HIPD 8000 to run the messaging application and coordinate the presentation of the messaging application.

Further, the user 5002 can provide a user input provided at the wrist-wearable device 6000, the AR system 7000, and/or the HIPD 8000 to continue and/or complete an operation initiated are at another device. For example, after initiating the messaging application via the wrist-wearable device 6000 and while the AR system 7000 present the messaging user interface 5012, the user 5002 can provide an input at the HIPD 8000 to prepare a response (e.g., shown by the swipe gesture performed on the HIPD 8000). The user 5002's gestures performed on the HIPD 8000 can be provided and/or displayed on another device. For example, the user 5002's swipe gestured performed on the HIPD 8000 are displayed on a virtual keyboard of the messaging user interface 5012 displayed by the AR system 7000.

In some embodiments, the wrist-wearable device 6000, the AR system 7000, the HIPD 8000, and/or other communicatively couple device presents one or more notifications to the user 5002. The notification can be an indication of a new message, an incoming call, an application update, or a status update. The user 5002 can select the notification via the wrist-wearable device 6000, the AR system 7000, the HIPD 8000, and cause presentation of an application or operation associated with the notification on at least one device. For example, the user 5002 can receive a notification that a message was received at the wrist-wearable device 6000, the AR system 7000, the HIPD 8000, and/or other communicatively couple device and provide a user input at the wrist-wearable device 6000, the AR system 7000, and/or the HIPD 8000 to review the notification, and the device detecting the user input can cause an application associated with the notification to be initiated and/or presented at the wrist-wearable device 6000, the AR system 7000, and/or the HIPD 8000.

While the above example describes coordinated inputs used to interact with a messaging application, the skilled artisan will appreciate upon reading the descriptions that user inputs can be coordinated to interact with any number of applications including, but not limited to, gaming applications, social media applications, camera applications, web-based applications, and financial applications. For example, the AR system 7000 can present to the user 5002 game application data, and the HIPD 8000 can use a controller to provide inputs to the game. Similarly, the user 5002 can use the wrist-wearable device 6000 to initiate a camera of the AR system 7000, and the user can use the wrist-wearable device 6000, the AR system 7000, and/or the HIPD 8000 to manipulate the image capture (e.g., zoom in or out and/or apply filters) and capture image data.

Having discussed example AR systems, devices for interacting with such AR systems, and other computing systems more generally, will now be discussed in greater detail below. Some definitions of devices and components that can be included in some or all of the example devices discussed below are defined here for ease of reference. A skilled artisan will appreciate that certain types of the components described below may be more suitable for a particular set of devices, and less suitable for a different set of devices. But subsequent reference to the components defined here should be considered to be encompassed by the definitions provided.

In some embodiments discussed below, example devices and systems, including electronic devices and systems, will be discussed. Such example devices and systems are not intended to be limiting, and one of skill in the art will understand that alternative devices and systems to the example devices and systems described herein may be used to perform the operations and construct the systems and device that are described herein.

As described herein, an electronic device is a device that uses electrical energy to perform one or more functions. It can be any physical object that contains electronic components such as transistors, resistors, capacitors, diodes, and integrated circuits. Examples of electronic devices include smartphones, laptops, digital cameras, televisions, gaming consoles, and music players, as well as the example electronic devices discussed herein. As described herein, an intermediary electronic device is a device that sits between two other electronic devices, and/or a subset of components of one or more electronic devices and facilitates communication, and/or data processing and/or data transfer between the respective electronic devices and/or electronic components.

As described herein, a processor (e.g., a central processing unit (CPU)), is an electronic component that is responsible for executing instructions and controlling the operation of an electronic device (e.g., a computer). There are various types of processors that may be used interchangeably, or may be specifically required, by embodiments described herein. For example, a processor may be: (i) a general processor designed to perform a wide range of tasks, such as running software applications, managing operating systems, and performing arithmetic and logical operations; (ii) a microcontroller designed for specific tasks such as controlling electronic devices, sensors, and motors; (iii) a graphics processing unit (GPU) designed to accelerate the creation and rendering of images, videos, and animations (e.g., VR animations, such as three-dimensional modeling); (iv) a field-programmable gate array (FPGA) that can be programmed and reconfigured after manufacturing, and/or can be customized to perform specific tasks, such as signal processing, cryptography, and machine learning; and (v) a digital signal processor (DSP) designed to perform mathematical operations on signals such as audio, video, and radio waves. One of skill in the art will understand that one or more processors of one or more electronic devices may be used in various embodiments described herein.

As described herein, memory refers to electronic components in a computer or electronic device that store data and instructions for the processor to access and manipulate. Examples of memory can include (i) random access memory (RAM) configured to store data and instructions temporarily; (ii) read-only memory (ROM) configured to store data and instructions permanently (e.g., one or more portions of system firmware, and/or boot loaders); (iii) flash memory, which can be configured to store data in electronic devices (e.g., USB drives, memory cards, and/or solid-state drives (SSDs)); and (iv) cache memory configured to temporarily store frequently accessed data and instructions. Memory, as described herein, can include structured data (e.g., SQL databases, MongoDB databases, GraphQL data, and/or JSON data). Other examples of memory can include (i) profile data, including user account data, user settings, and/or other user data stored by the user; (ii) sensor data detected and/or otherwise obtained by one or more sensors; (iii) media content data including stored image data, audio data, documents, and the like; (iv) application data, which can include data collected and/or otherwise obtained and stored during use of an application; and/or (v) any other types of data described herein.

As described herein, controllers are electronic components that manage and coordinate the operation of other components within an electronic device (e.g., controlling inputs, processing data, and/or generating outputs). Examples of controllers can include: (i) microcontrollers, including small, low-power controllers that are commonly used in embedded systems and Internet of Things (IOT) devices; (ii) programmable logic controllers (PLCs) that may be configured to be used in industrial automation systems to control and monitor manufacturing processes; (iii) system-on-a-chip (SoC) controllers that integrate multiple components such as processors, memory, I/O interfaces, and other peripherals into a single chip; and/or (iv) DSPs.

As described herein, a power system of an electronic device is configured to convert incoming electrical power into a form that can be used to operate the device. A power system can include various components, including: (i) a power source, which can be an alternating current (AC) adapter or a direct current (DC) adapter power supply; (ii) a charger input, and can be configured to use a wired and/or wireless connection (which may be part of a peripheral interface, such as a USB, micro-USB interface, near-field magnetic coupling, magnetic inductive and magnetic resonance charging, and/or radio frequency (RF) charging); (iii) a power-management integrated circuit, configured to distribute power to various components of the device and to ensure that the device operates within safe limits (e.g., regulating voltage, controlling current flow, and/or managing heat dissipation); and/or (iv) a battery configured to store power to provide usable power to components of one or more electronic devices.

As described herein, peripheral interfaces are electronic components (e.g., of electronic devices) that allow electronic devices to communicate with other devices or peripherals, and can provide a means for input and output of data and signals. Examples of peripheral interfaces can include: (i) universal serial bus (USB) and/or micro-USB interfaces configured for connecting devices to an electronic device; (ii) Bluetooth interfaces configured to allow devices to communicate with each other, including Bluetooth low energy (BLE); (iii) near field communication (NFC) interfaces configured to be short-range wireless interface for operations such as access control; (iv) POGO pins, which may be small, spring-loaded pins configured to provide a charging interface; (v) wireless charging interfaces; (vi) GPS interfaces; (vii) Wi-Fi interfaces for providing a connection between a device and a wireless network; (viii) and sensor interfaces.

As described herein, sensors are electronic components (e.g., in and/or otherwise in electronic communication with electronic devices, such as wearable devices) configured to detect physical and environmental changes and generate electrical signals. Examples of sensors can include: (i) imaging sensors for collecting imaging data (e.g., including one or more cameras disposed on a respective electronic device); (ii) biopotential-signal sensors; (iii) inertial measurement units (e.g., IMUs) for detecting, for example, angular rate, force, magnetic field, and/or changes in acceleration; (iv) heart rate sensors for measuring a user's heart rate; (v) SpO2 sensors for measuring blood oxygen saturation and/or other biometric data of a user; and (vi) capacitive sensors for detecting changes in potential at a portion of a user's body (e.g., a sensor-skin interface); light sensors (e.g., time-of-flight sensors, infrared light sensors, and/or visible light sensors). As described herein biopotential-signal-sensing components are devices used to measure electrical activity within the body (e.g., biopotential-signal sensors). Some types of biopotential-signal sensors include: (i) electroencephalography (EEG) sensors configured to measure electrical activity in the brain to diagnose neurological disorders; (ii) electrocardiography (ECG or EKG) sensors configured to measure electrical activity of the heart to diagnose heart problems; (iii) electromyography (EMG) sensors configured to measure the electrical activity of muscles and to diagnose neuromuscular disorders; and (iv) electrooculography (EOG) sensors configured to measure the electrical activity of eye muscles to detect eye movement and diagnose eye disorders.

As described herein, an application stored in the memory of an electronic device (e.g., software) includes instructions stored in the memory. Examples of such applications include: (i) games; (ii) word processors; messaging applications; media-streaming applications; financial applications; calendars; clocks; communication interface modules for enabling wired and/or wireless connections between different respective electronic devices (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocols).

As described herein, a communication interface is a mechanism that enables different systems or devices to exchange information and data with each other, including hardware, software, or a combination of both hardware and software. For example, a communication interface can refer to a physical connector and/or port on a device that enables communication with other devices (e.g., USB, Ethernet, HDMI, Bluetooth). In some embodiments, a communication interface can refer to a software layer that enables different software programs to communicate with each other (e.g., application programming interfaces (APIs) and/or protocols like HTTP and TCP/IP).

As described herein, a graphics module is a component or software module that is designed to handle graphical operations and/or processes, and can include a hardware module and/or a software module.

As described herein, non-transitory computer-readable storage media are physical devices or storage media that can be used to store electronic data in a non-transitory form (e.g., such that the data is stored permanently until it is intentionally deleted or modified).

Example Wrist-Wearable Devices

Figure 12A:
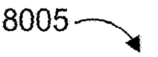
FIGS. 12A-12B illustrate an example handheld device in accordance with some embodiments.
Figure 12A:
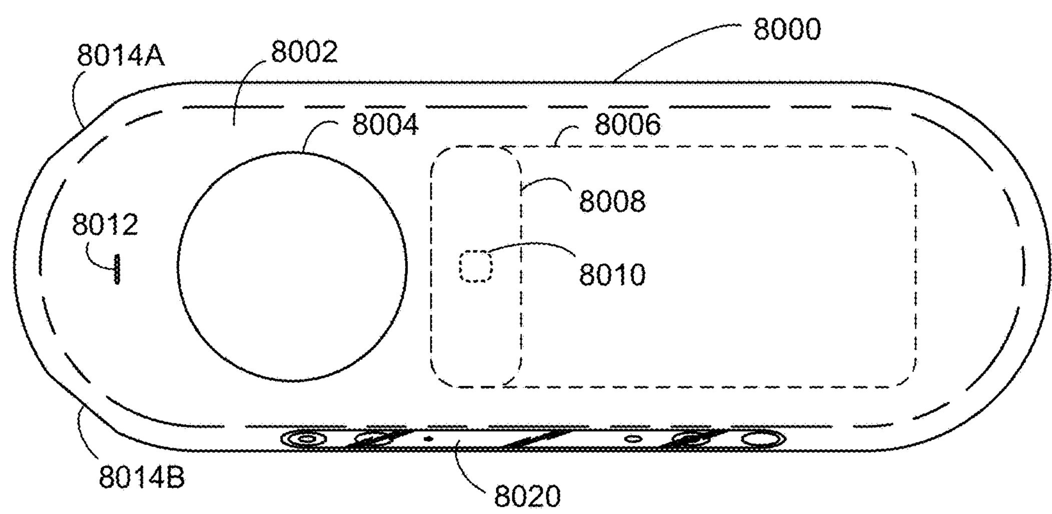
Figure 12A:
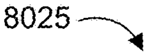
Figure 12A:
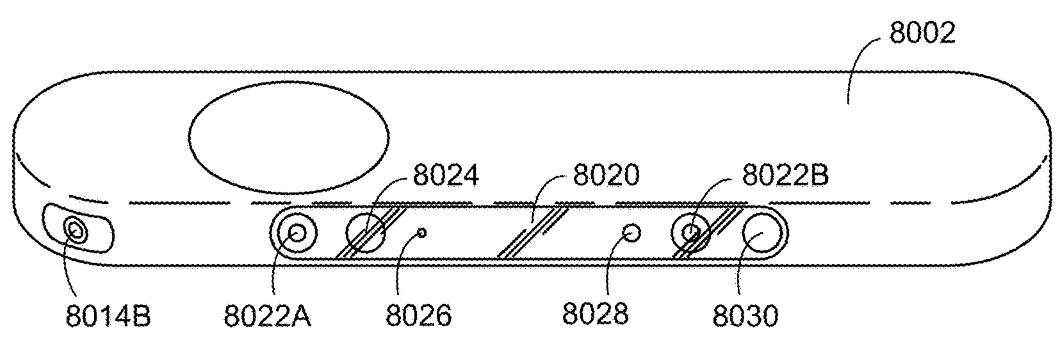
Figure 12B:
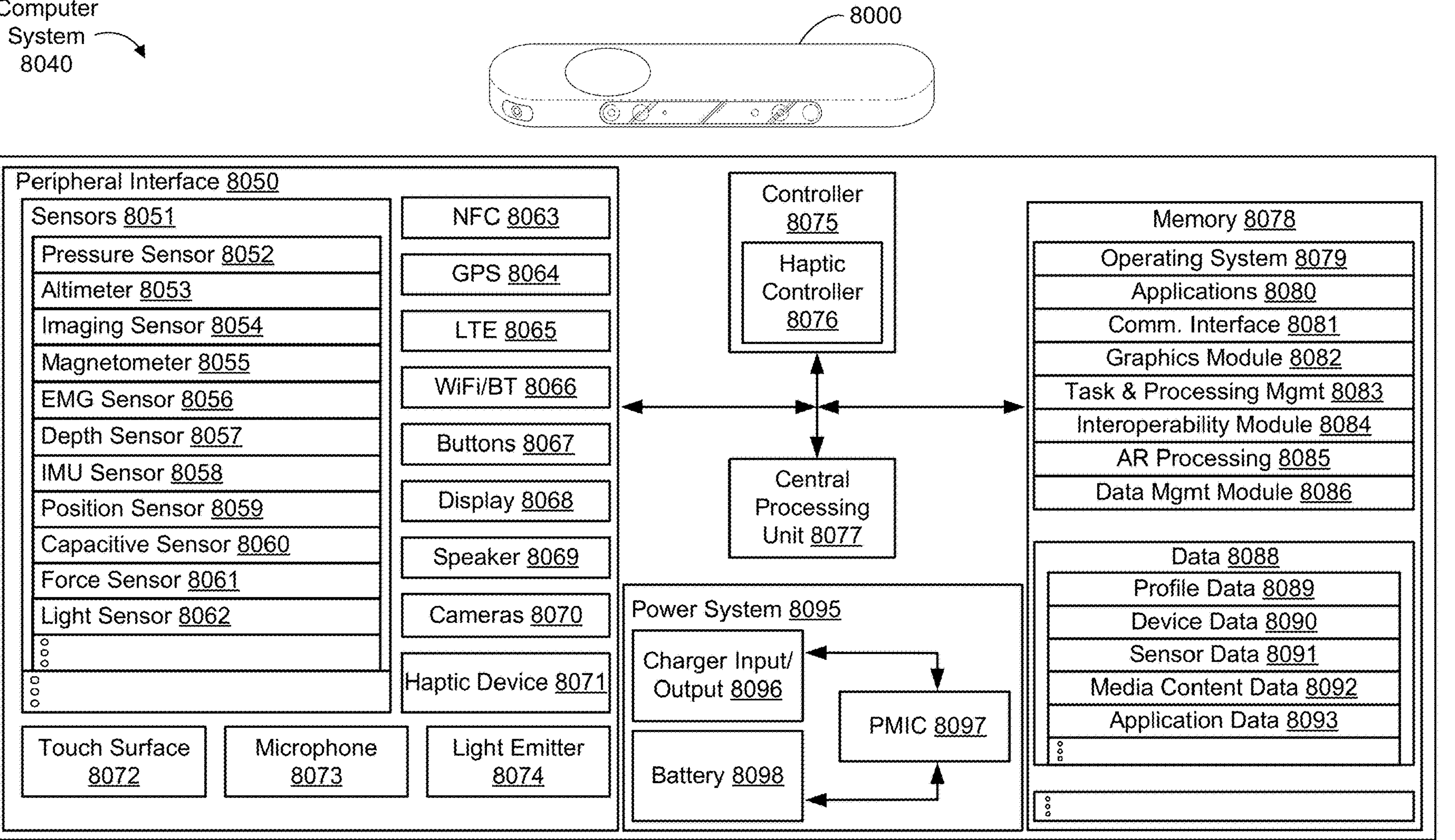

FIGS. 12A and 12B illustrate the wrist-wearable device 6000 in accordance with some embodiments. FIG. 12A illustrates components of the wrist-wearable device 6000, which can be used individually or in combination, including combinations that include other electronic devices and/or electronic components.

FIG. 12A shows a wearable band 6010 and a watch body 6020 (or capsule) being coupled, as discussed below, to form the wrist-wearable device 6000. The wrist-wearable device 6000 can perform various functions and/or operations associated with navigating through user interfaces and selectively opening applications, as well as the functions and/or operations described above with reference to FIGS. 1A-6.

As will be described in more detail below, operations executed by the wrist-wearable device 6000 can include: (i) presenting content to a user (e.g., displaying visual content via a display 6005); (ii) detecting (e.g., sensing) user input (e.g., sensing a touch on peripheral button 6023 and/or at a touch screen of the display 6005, a hand gesture detected by sensors (e.g., biopotential sensors)); (iii) sensing biometric data via one or more sensors 6013 (e.g., neuromuscular signals, heart rate, temperature, and/or sleep); messaging (e.g., text, speech, and/or video); image capture via one or more imaging devices or cameras 6025; wireless communications (e.g., cellular, near field, Wi-Fi, and/or personal area network); location determination; financial transactions; providing haptic feedback; alarms; notifications; biometric authentication; health monitoring; and/or sleep monitoring.

The above-example functions can be executed independently in the watch body 6020, independently in the wearable band 6010, and/or via an electronic communication between the watch body 6020 and the wearable band 6010. In some embodiments, functions can be executed on the wrist-wearable device 6000 while an AR environment is being presented (e.g., via one of the AR systems 5000*a* to 5000*d*). As the skilled artisan will appreciate upon reading the descriptions provided herein, the novel wearable devices described herein can be used with other types of AR environments.

The wearable band 6010 can be configured to be worn by a user such that an inner surface of the wearable band 6010 is in contact with the user's skin. When worn by a user, sensors 6013 contact the user's skin. The sensors 6013 can sense biometric data such as a user's heart rate, saturated oxygen level, temperature, sweat level, neuromuscular signal sensors, or a combination thereof. The sensors 6013 can also sense data about a user's environment, including a user's motion, altitude, location, orientation, gait, acceleration, position, or a combination thereof. In some embodiments, the sensors 6013 are configured to track a position and/or motion of the wearable band 6010. The one or more sensors 6013 can include any of the sensors defined above and/or discussed below with respect to FIG. 10B.

The one or more sensors 6013 can be distributed on an inside and/or an outside surface of the wearable band 6010. In some embodiments, the one or more sensors 6013 are uniformly spaced along the wearable band 6010. Alternatively, in some embodiments, the one or more sensors 6013 are positioned at distinct points along the wearable band 6010. As shown in FIG. 10A, the one or more sensors 6013 can be the same or distinct. For example, in some embodiments, the one or more sensors 6013 can be shaped as a pill (e.g., sensor 6013*a*), an oval, a circle, a square, an oblong (e.g., sensor 6013*c*) and/or any other shape that maintains contact with the user's skin (e.g., such that neuromuscular signal and/or other biometric data can be accurately measured at the user's skin). In some embodiments, the one or more sensors 6013 are aligned to form pairs of sensors (e.g., for sensing neuromuscular signals based on differential sensing within each respective sensor). For example, sensor 6013*b* is aligned with an adjacent sensor to form sensor pair 6014*a* and sensor 6013*d* aligned with an adjacent sensor to form sensor pair 6014*b*. In some embodiments, the wearable band 6010 does not have a sensor pair. Alternatively, in some embodiments, the wearable band 6010 has a predetermined number of sensor pairs (e.g., one pair of sensors, three pairs of sensors, four pairs of sensors, six pairs of sensors, or sixteen pairs of sensors).

The wearable band 6010 can include any suitable number of sensors 6013. In some embodiments, the number and arrangement of sensors 6013 depends on the particular application for which the wearable band 6010 is used. For instance, a wearable band 6010 configured as an armband, wristband, or chest-band may include a plurality of sensors 6013 with different numbers of sensors 6013 and different arrangement for each use case, such as medical use cases as compared to gaming or general day-to-day use cases.

In accordance with some embodiments, the wearable band 6010 further includes an electrical ground electrode and a shielding electrode. The electrical ground and shielding electrodes, like the sensors 6013, can be distributed on the inside surface of the wearable band 6010 such that they contact a portion of the user's skin. For example, the electrical ground and shielding electrodes can be at an inside surface of coupling mechanism 6016 or an inside surface of a wearable structure 6011. The electrical ground and shielding electrodes can be formed and/or use the same components as the sensors 6013. In some embodiments, the wearable band 6010 includes more than one electrical ground electrode and more than one shielding electrode.

The sensors 6013 can be formed as part of the wearable structure 6011 of the wearable band 6010. In some embodiments, the sensors 6013 are flush or substantially flush with the wearable structure 6011 such that they do not extend beyond the surface of the wearable structure 6011. While flush with the wearable structure 6011, the sensors 6013 are still configured to contact the user's skin (e.g., via a skin-contacting surface). Alternatively, in some embodiments, the sensors 6013 extend beyond the wearable structure 6011 a predetermined distance (e.g., 0.1-2 mm) to make contact and depress into the user's skin. In some embodiments, the sensors 6013 are coupled to an actuator (not shown) configured to adjust an extension height (e.g., a distance from the surface of the wearable structure 6011) of the sensors 6013 such that the sensors 6013 make contact and depress into the user's skin. In some embodiments, the actuators adjust the extension height between 0.01 mm-1.2 mm. This allows the user to customize the positioning of the sensors 6013 to improve the overall comfort of the wearable band 6010 when worn while still allowing the sensors 6013 to contact the user's skin. In some embodiments, the sensors 6013 are indistinguishable from the wearable structure 6011 when worn by the user.

The wearable structure 6011 can be formed of an elastic material (e.g., an elastomer) configured to be stretched and fitted to be worn by the user. In some embodiments, the wearable structure 6011 is a textile or woven fabric. As described above, the sensors 6013 can be formed as part of a wearable structure 6011. For example, the sensors 6013 can be molded into the wearable structure 6011 or be integrated into a woven fabric (e.g., the sensors 6013 can be sewn into the fabric and mimic the pliability of fabric (e.g., the sensors 6013 can be constructed from a series of woven strands of fabric)).

The wearable structure 6011 can include flexible electronic connectors that interconnect the sensors 6013, the electronic circuitry, and/or other electronic components (described below in reference to FIG. 10B) that are enclosed in the wearable band 6010. In some embodiments, the flexible electronic connectors are configured to interconnect the sensors 6013, the electronic circuitry, and/or other electronic components of the wearable band 6010 with respective sensors and/or other electronic components of another electronic device (e.g., watch body 6020). The flexible electronic connectors are configured to move with the wearable structure 6011 such that the user adjustment to the wearable structure 6011 (e.g., resizing, pulling, and/or folding) does not stress or strain the electrical coupling of components of the wearable band 6010.

As described above, the wearable band 6010 is configured to be worn by a user. In particular, the wearable band 6010 can be shaped or otherwise manipulated to be worn by a user. For example, the wearable band 6010 can be shaped to have a substantially circular shape such that it can be configured to be worn on the user's lower arm or wrist. Alternatively, the wearable band 6010 can be shaped to be worn on another body part of the user, such as the user's upper arm (e.g., around a bicep), forearm, chest, or legs. The wearable band 6010 can include a retaining mechanism 6012 (e.g., a buckle or a hook-and-loop fastener) for securing the wearable band 6010 to the user's wrist or other body part. While the wearable band 6010 is worn by the user, the sensors 6013 sense data (referred to as sensor data) from the user's skin. In particular, the sensors 6013 of the wearable band 6010 obtain (e.g., sense and record) neuromuscular signals.

The sensed data (e.g., sensed neuromuscular signals) can be used to detect and/or determine the user's intention to perform certain motor actions. In particular, the sensors 6013 sense and record neuromuscular signals from the user as the user performs muscular activations (e.g., movements and/or gestures). The detected and/or determined motor actions (e.g., phalange (or digits) movements, wrist movements, hand movements, and/or other muscle intentions) can be used to determine control commands or control information (instructions to perform certain commands after the data is sensed) for causing a computing device to perform one or more input commands. For example, the sensed neuromuscular signals can be used to control certain user interfaces displayed on the display 6005 of the wrist-wearable device 6000 and/or can be transmitted to a device responsible for rendering an artificial-reality environment (e.g., a head-mounted display) to perform an action in an associated artificial-reality environment, such as to control the motion of a virtual device displayed to the user. The muscular activations performed by the user can include static gestures, such as placing the user's hand palm down on a table; dynamic gestures, such as grasping a physical or virtual object; and covert gestures that are imperceptible to another person, such as slightly tensing a joint by co-contracting opposing muscles or using sub-muscular activations. The muscular activations performed by the user can include symbolic gestures (e.g., gestures mapped to other gestures, interactions, or commands, for example, based on a gesture vocabulary that specifies the mapping of gestures to commands).

The sensor data sensed by the sensors 6013 can be used to provide a user with an enhanced interaction with a physical object (e.g., devices communicatively coupled with the wearable band 6010) and/or a virtual object in an artificial-reality application generated by an artificial-reality system (e.g., user interface objects presented on the display 6005, or another computing device (e.g., a smartphone)).

In some embodiments, the wearable band 6010 includes one or more haptic devices 6046 (FIG. 10B, e.g., a vibratory haptic actuator) that are configured to provide haptic feedback (e.g., a cutaneous and/or kinesthetic sensation) to the user's skin. The sensors 6013 and/or the haptic devices 6046 can be configured to operate in conjunction with multiple applications, including, without limitation, health monitoring, social media, games, and artificial reality (e.g., the applications associated with artificial reality).

The wearable band 6010 can also include coupling mechanism 6016 (e.g., a cradle or a shape of the coupling mechanism can correspond to the shape of the watch body 6020 of the wrist-wearable device 6000) for detachably coupling a capsule (e.g., a computing unit) or watch body 6020 (via a coupling surface of the watch body 6020) to the wearable band 6010. In particular, the coupling mechanism 6016 can be configured to receive a coupling surface proximate to the bottom side of the watch body 6020 (e.g., a side opposite to a front side of the watch body 6020 where the display 6005 is located), such that a user can push the watch body 6020 downward into the coupling mechanism 6016 to attach the watch body 6020 to the coupling mechanism 6016. In some embodiments, the coupling mechanism 6016 can be configured to receive a top side of the watch body 6020 (e.g., a side proximate to the front side of the watch body 6020 where the display 6005 is located) that is pushed upward into the cradle, as opposed to being pushed downward into the coupling mechanism 6016. In some embodiments, the coupling mechanism 6016 is an integrated component of the wearable band 6010 such that the wearable band 6010 and the coupling mechanism 6016 are a single unitary structure. In some embodiments, the coupling mechanism 6016 is a type of frame or shell that allows the watch body 6020 coupling surface to be retained within or on the wearable band 6010 coupling mechanism 6016 (e.g., a cradle, a tracker band, a support base, or a clasp).

The coupling mechanism 6016 can allow for the watch body 6020 to be detachably coupled to the wearable band 6010 through a friction fit, magnetic coupling, a rotation-based connector, a shear-pin coupler, a retention spring, one or more magnets, a clip, a pin shaft, a hook-and-loop fastener, or a combination thereof. A user can perform any type of motion to couple the watch body 6020 to the wearable band 6010 and to decouple the watch body 6020 from the wearable band 6010. For example, a user can twist, slide, turn, push, pull, or rotate the watch body 6020 relative to the wearable band 6010, or a combination thereof, to attach the watch body 6020 to the wearable band 6010 and to detach the watch body 6020 from the wearable band 6010. Alternatively, as discussed below, in some embodiments, the watch body 6020 can be decoupled from the wearable band 6010 by actuation of the release mechanism 6029.

The wearable band 6010 can be coupled with a watch body 6020 to increase the functionality of the wearable band 6010 (e.g., converting the wearable band 6010 into a wrist-wearable device 6000, adding an additional computing unit and/or battery to increase computational resources and/or a battery life of the wearable band 6010, adding additional sensors to improve sensed data). As described above, the wearable band 6010 (e.g., and the coupling mechanism 6016) is configured to operate independently (e.g., execute functions independently) from watch body 6020. For example, the coupling mechanism 6016 can include one or more sensors 6013 that contact a user's skin when the wearable band 6010 is worn by the user and provide sensor data for determining control commands.

A user can detach the watch body 6020 (or capsule) from the wearable band 6010 in order to reduce the encumbrance of the wrist-wearable device 6000 to the user. For embodiments in which the watch body 6020 is removable, the watch body 6020 can be referred to as a removable structure, such that in these embodiments the wrist-wearable device 6000 includes a wearable portion (e.g., the wearable band 6010) and a removable structure (the watch body 6020).

Turning to the watch body 6020, the watch body 6020 can have a substantially rectangular or circular shape. The watch body 6020 is configured to be worn by the user on their wrist or on another body part. More specifically, the watch body 6020 is sized to be easily carried by the user, attached on a portion of the user's clothing, and/or coupled to the wearable band 6010 (forming the wrist-wearable device 6000). As described above, the watch body 6020 can have a shape corresponding to the coupling mechanism 6016 of the wearable band 6010. In some embodiments, the watch body 6020 includes a single release mechanism 6029 or multiple release mechanisms (e.g., two release mechanisms 6029 positioned on opposing sides of the watch body 6020, such as spring-loaded buttons) for decoupling the watch body 6020 and the wearable band 6010. The release mechanism 6029 can include, without limitation, a button, a knob, a plunger, a handle, a lever, a fastener, a clasp, a dial, a latch, or a combination thereof.

A user can actuate the release mechanism 6029 by pushing, turning, lifting, depressing, shifting, or performing other actions on the release mechanism 6029. Actuation of the release mechanism 6029 can release (e.g., decouple) the watch body 6020 from the coupling mechanism 6016 of the wearable band 6010, allowing the user to use the watch body 6020 independently from wearable band 6010, and vice versa. For example, decoupling the watch body 6020 from the wearable band 6010 can allow the user to capture images using rear-facing camera 6025B. Although the release mechanism 6029 is shown positioned at a corner of watch body 6020, the release mechanism 6029 can be positioned anywhere on watch body 6020 that is convenient for the user to actuate. In addition, in some embodiments, the wearable band 6010 can also include a respective release mechanism for decoupling the watch body 6020 from the coupling mechanism 6016. In some embodiments, the release mechanism 6029 is optional and the watch body 6020 can be decoupled from the coupling mechanism 6016 as described above (e.g., via twisting or rotating).

The watch body 6020 can include one or more peripheral buttons 6023 and 6027 for performing various operations at the watch body 6020. For example, the peripheral buttons 6023 and 6027 can be used to turn on or wake (e.g., transition from a sleep state to an active state) the display 6005, unlock the watch body 6020, increase or decrease a volume, increase or decrease a brightness, interact with one or more applications, and/or interact with one or more user interfaces. Additionally, or alternatively, in some embodiments, the display 6005 operates as a touch screen and allows the user to provide one or more inputs for interacting with the watch body 6020.

In some embodiments, the watch body 6020 includes one or more sensors 6021. The sensors 6021 of the watch body 6020 can be the same or distinct from the sensors 6013 of the wearable band 6010. The sensors 6021 of the watch body 6020 can be distributed on an inside and/or an outside surface of the watch body 6020. In some embodiments, the sensors 6021 are configured to contact a user's skin when the watch body 6020 is worn by the user. For example, the sensors 6021 can be placed on the bottom side of the watch body 6020 and the coupling mechanism 6016 can be a cradle with an opening that allows the bottom side of the watch body 6020 to directly contact the user's skin. Alternatively, in some embodiments, the watch body 6020 does not include sensors that are configured to contact the user's skin (e.g., including sensors internal and/or external to the watch body 6020 that configured to sense data of the watch body 6020 and the watch body 6020's surrounding environment). In some embodiments, the sensors 6013 are configured to track a position and/or motion of the watch body 6020.

The watch body 6020 and the wearable band 6010 can share data using a wired communication method (e.g., a Universal Asynchronous Receiver/Transmitter (UART) or a USB transceiver) and/or a wireless communication method (e.g., near field communication or Bluetooth). For example, the watch body 6020 and the wearable band 6010 can share data sensed by the sensors 6013 and 6021, as well as application and device specific information (e.g., active and/or available applications), with output devices (e.g., display and/or speakers), and/or input devices (e.g., touch screen, microphone, and/or imaging sensors).

In some embodiments, the watch body 6020 can include, without limitation, a front-facing camera 6025A and/or a rear-facing camera 6025B, sensors 6021 (e.g., a biometric sensor, an IMU, a heart rate sensor, a saturated oxygen sensor, a neuromuscular signal sensor, an altimeter sensor, a temperature sensor, a bioimpedance sensor, a pedometer sensor, an optical sensor (e.g., imaging sensor 6063; FIG. 10B), a touch sensor, and/or a sweat sensor). In some embodiments, the watch body 6020 can include one or more haptic devices 6076 (FIG. 10B; a vibratory haptic actuator)

that is configured to provide haptic feedback (e.g., a cutaneous and/or kinesthetic sensation) to the user. The sensors 6021 and/or the haptic device 6076 can also be configured to operate in conjunction with multiple applications, including, without limitation, health-monitoring applications, social media applications, game applications, and artificial-reality applications (e.g., the applications associated with artificial reality).

As described above, the watch body 6020 and the wearable band 6010, when coupled, can form the wrist-wearable device 6000. When coupled, the watch body 6020 and wearable band 6010 operate as a single device to execute functions (operations, detections, and/or communications) described herein. In some embodiments, each device is provided with particular instructions for performing the one or more operations of the wrist-wearable device 6000. For example, in accordance with a determination that the watch body 6020 does not include neuromuscular signal sensors, the wearable band 6010 can include alternative instructions for performing associated instructions (e.g., providing sensed neuromuscular signal data to the watch body 6020 via a different electronic device). Operations of the wrist-wearable device 6000 can be performed by the watch body 6020 alone or in conjunction with the wearable band 6010 (e.g., via respective processors and/or hardware components) and vice versa. In some embodiments, operations of the wrist-wearable device 6000, the watch body 6020, and/or the wearable band 6010 can be performed in conjunction with one or more processors and/or hardware components of another communicatively coupled device (e.g., the HIPD 8000; FIGS. 14A-14B).

As described below with reference to the block diagram of FIG. 10B, the wearable band 6010 and/or the watch body 6020 can each include independent resources required to independently execute functions. For example, the wearable band 6010 and/or the watch body 6020 can each include a power source (e.g., a battery), a memory, data storage, a processor (e.g., a central processing unit (CPU)), communications, a light source, and/or input/output devices.

Figure 10A:
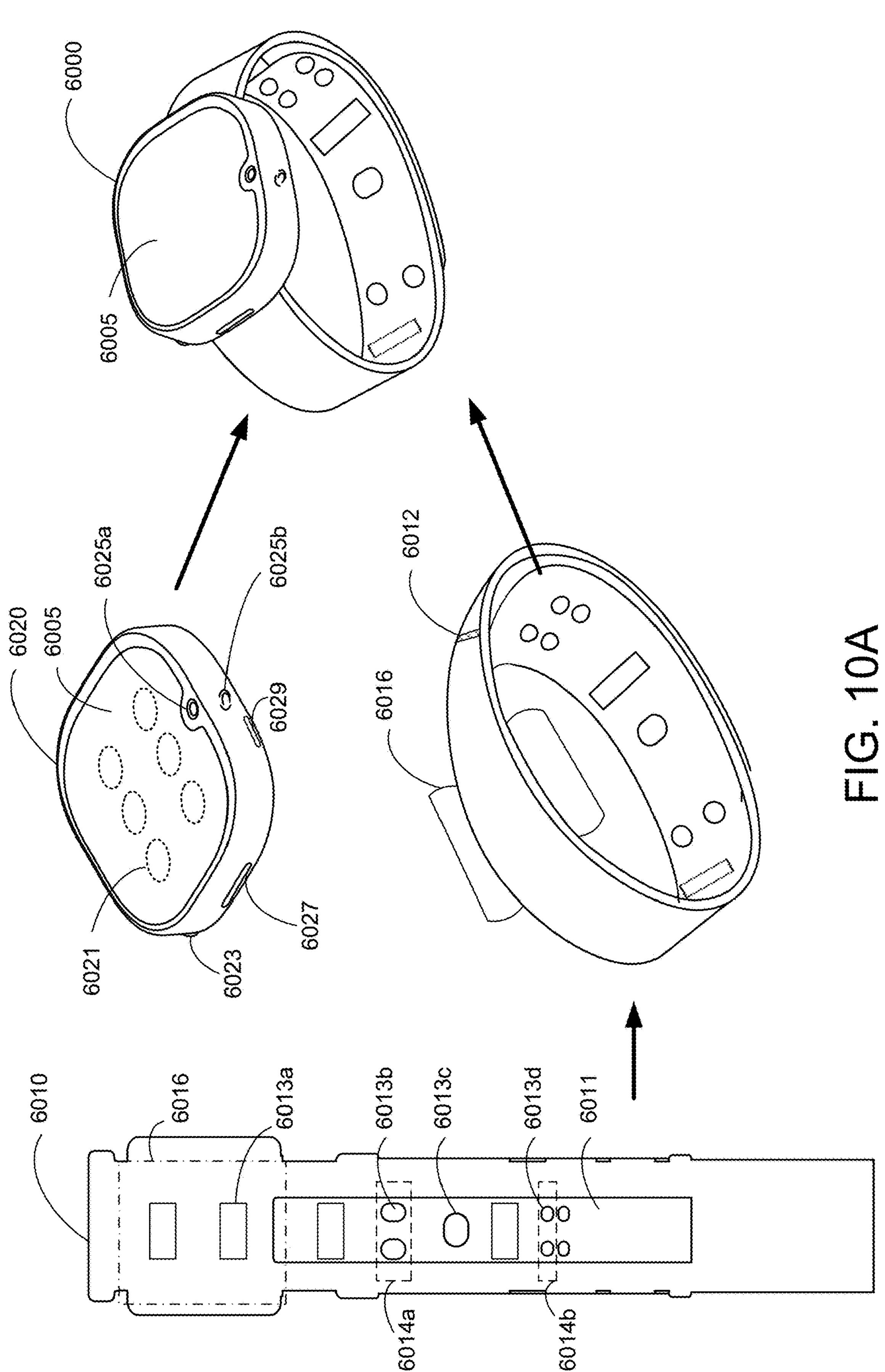
FIGS. 10A-10B illustrate an example wrist-wearable device in accordance with some embodiments.
Figure 10B:
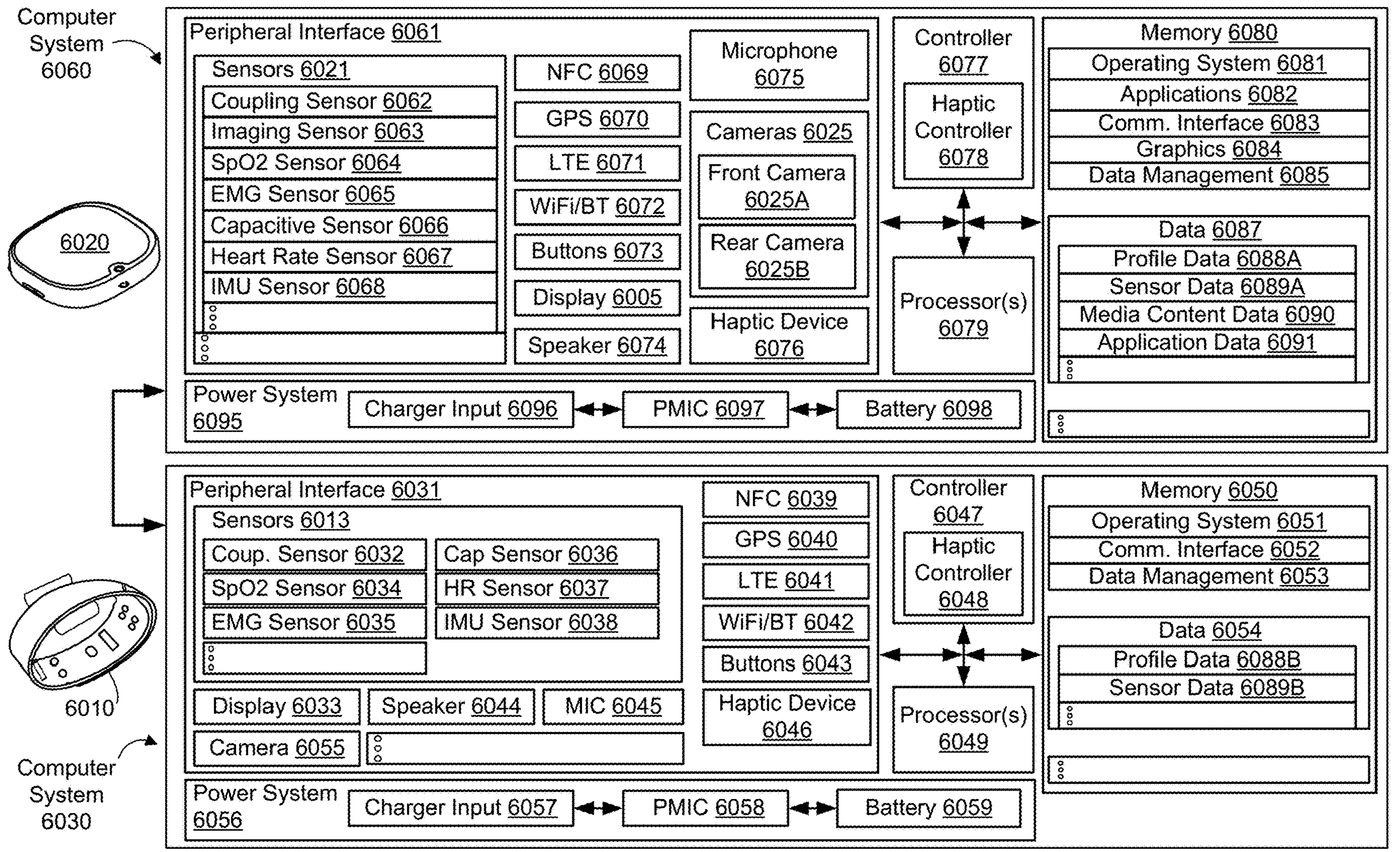

FIG. 10B shows block diagrams of a computing system 6030 corresponding to the wearable band 6010, and a computing system 6060 corresponding to the watch body 6020, according to some embodiments. A computing system of the wrist-wearable device 6000 includes a combination of components of the wearable band computing system 6030 and the watch body computing system 6060, in accordance with some embodiments.

The watch body 6020 and/or the wearable band 6010 can include one or more components shown in watch body computing system 6060. In some embodiments, a single integrated circuit includes all or a substantial portion of the components of the watch body computing system 6060. Alternatively, in some embodiments, components of the watch body computing system 6060 are included in a plurality of integrated circuits that are communicatively coupled. In some embodiments, the watch body computing system 6060 is configured to couple (e.g., via a wired or wireless connection) with the wearable band computing system 6030, which allows the computing systems to share components, distribute tasks, and/or perform other operations described herein (individually or as a single device).

The watch body computing system 6060 can include one or more processors 6079, a controller 6077, a peripheral interface 6061, a power system 6095, and memory (e.g., a memory 6080), each of which is defined above and described in more detail below.

The power system 6095 can include a charger input 6057, a power-management integrated circuit (PMIC) 6097, and a battery 6096, each of which is defined above. In some embodiments, a watch body 6020 and a wearable band 6010 can have respective batteries (e.g., battery 6098 and 6059), and can share power with each other. The watch body 6020 and the wearable band 6010 can receive a charge using a variety of techniques. In some embodiments, the watch body 6020 and the wearable band 6010 can use a wired charging assembly (e.g., power cords) to receive the charge. Alternatively, or in addition, the watch body 6020 and/or the wearable band 6010 can be configured for wireless charging. For example, a portable charging device can be designed to mate with a portion of watch body 6020 and/or wearable band 6010 and wirelessly deliver usable power to a battery of watch body 6020 and/or wearable band 6010. The watch body 6020 and the wearable band 6010 can have independent power systems (e.g., power systems 6095 and 6056) to enable each to operate independently. The watch body 6020 and wearable band 6010 can also share power (e.g., one can charge the other) via respective PMICs (e.g., PMICs 6097 and 6058) that can share power over power and ground conductors and/or over wireless charging antennas.

In some embodiments, the peripheral interface 6061 can include one or more sensors 6021, many of which listed below are defined above. The sensors 6021 can include one or more coupling sensors 6062 for detecting when the watch body 6020 is coupled with another electronic device (e.g., a wearable band 6010). The sensors 6021 can include imaging sensors 6063 (one or more of the cameras 6025, and/or separate imaging sensors 6063 (e.g., thermal-imaging sensors)). In some embodiments, the sensors 6021 include one or more SpO2 sensors 6064. In some embodiments, the sensors 6021 include one or more biopotential-signal sensors (e.g., EMG sensors 6065 and 6035, which may be disposed on a user-facing portion of the watch body 6020 and/or the wearable band 6010). In some embodiments, the sensors 6021 include one or more capacitive sensors 6066. In some embodiments, the sensors 6021 include one or more heart rate sensors 6067. In some embodiments, the sensors 6021 include one or more IMU sensors 6068. In some embodiments, one or more IMU sensors 6068 can be configured to detect movement of a user's hand or other location that the watch body 6020 is placed or held.

In some embodiments, the peripheral interface 6061 includes a near-field communication (NFC) component 6069, a global-position system (GPS) component 6070, a long-term evolution (LTE) component 6071, and/or a Wi-Fi and/or Bluetooth communication component 6072. In some embodiments, the peripheral interface 6061 includes one or more buttons 6073 (e.g., the peripheral buttons 6023 and 6027 in FIG. 10A), which, when selected by a user, cause operation to be performed at the watch body 6020. In some embodiments, the peripheral interface 6061 includes one or more indicators, such as a light emitting diode (LED), to provide a user with visual indicators (e.g., message received, low battery, active microphone and/or camera).

The watch body 6020 can include at least one display 6005, for displaying visual representations of information or data to the user, including user-interface elements and/or three-dimensional virtual objects. The display can also include a touch screen for inputting user inputs, such as touch gestures, swipe gestures, and the like. The watch body 6020 can include at least one speaker 6074 and at least one microphone 6075 for providing audio signals to the user and receiving audio input from the user. The user can provide user inputs through the microphone 6075 and can also receive audio output from the speaker 6074 as part of a haptic event provided by the haptic controller 6078. The watch body 6020 can include at least one camera 6025, including a front camera 6025A and a rear camera 6025B. The cameras 6025 can include ultra-wide-angle cameras, wide-angle cameras, fish-eye cameras, spherical cameras, telephoto cameras, depth-sensing cameras, or other types of cameras.

The watch body computing system 6060 can include one or more haptic controllers 6077 and associated componentry (e.g., haptic devices 6076) for providing haptic events at the watch body 6020 (e.g., a vibrating sensation or audio output in response to an event at the watch body 6020). The haptic controllers 6078 can communicate with one or more haptic devices 6076, such as electroacoustic devices, including a speaker of the one or more speakers 6074 and/or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). The haptic controller 6078 can provide haptic events that are capable of being sensed by a user of the watch body 6020. In some embodiments, the one or more haptic controllers 6078 can receive input signals from an application of the applications 6082.

In some embodiments, the computing system 6030 and/or the computing system 6060 can include memory 6080, which can be controlled by a memory controller of the one or more controllers 6077. In some embodiments, software components stored in the memory 6080 include one or more applications 6082 configured to perform operations at the watch body 6020. In some embodiments, the one or more applications 6082 include games, word processors, messaging applications, calling applications, web browsers, social media applications, media streaming applications, financial applications, calendars, and/or clocks. In some embodiments, software components stored in the memory 6080 include one or more communication interface modules 6083 as defined above. In some embodiments, software components stored in the memory 6080 include one or more graphics modules 6084 for rendering, encoding, and/or decoding audio and/or visual data; and one or more data management modules 6085 for collecting, organizing, and/or providing access to the data 6087 stored in memory 6080. In some embodiments, one or more of applications 6082 and/or one or more modules can work in conjunction with one another to perform various tasks at the watch body 6020.

In some embodiments, software components stored in the memory 6080 can include one or more operating systems 6081 (e.g., a Linux-based operating system or an Android operating system). The memory 6080 can also include data 6087. The data 6087 can include profile data 6088A, sensor data 6089A, media content data 6090, and application data 6091.

It should be appreciated that the watch body computing system 6060 is an example of a computing system within the watch body 6020, and that the watch body 6020 can have more or fewer components than shown in the watch body computing system 6060, combine two or more components, and/or have a different configuration and/or arrangement of the components. The various components shown in watch body computing system 6060 are implemented in hardware, software, firmware, or a combination thereof, including one or more signal processing and/or application-specific integrated circuits.

Turning to the wearable band computing system 6030, one or more components that can be included in the wearable band 6010 are shown. The wearable band computing system 6030 can include more or fewer components than shown in the watch body computing system 6060, combine two or more components, and/or have a different configuration and/or arrangement of some or all of the components. In some embodiments, all, or a substantial portion of the components of the wearable band computing system 6030 are included in a single integrated circuit. Alternatively, in some embodiments, components of the wearable band computing system 6030 are included in a plurality of integrated circuits that are communicatively coupled. As described above, in some embodiments, the wearable band computing system 6030 is configured to couple (e.g., via a wired or wireless connection) with the watch body computing system 6060, which allows the computing systems to share components, distribute tasks, and/or perform other operations described herein (individually or as a single device).

The wearable band computing system 6030, similar to the watch body computing system 6060, can include one or more processors 6049, one or more controllers 6047 (including one or more haptics controller 6048), a peripheral interface 6031 that can include one or more sensors 6013 and other peripheral devices, power source (e.g., a power system 6056), and memory (e.g., a memory 6050) that includes an operating system (e.g., an operating system 6051), data (e.g., data 6054 including profile data 6088B and/or sensor data 6089B), and one or more modules (e.g., a communications interface module 6052 and/or a data management module 6053).

The one or more sensors 6013 can be analogous to sensors 6021 of the computing system 6060 and in light of the definitions above. For example, sensors 6013 can include one or more coupling sensors 6032, one or more SpO2 sensors 6034, one or more EMG sensors 6035, one or more capacitive sensors 6036, one or more heart rate sensors 6037, and one or more IMU sensors 6038.

The peripheral interface 6031 can also include other components analogous to those included in the peripheral interface 6061 of the computing system 6060, including an NFC component 6039, a GPS component 6040, an LTE component 6041, a Wi-Fi and/or Bluetooth communication component 6042, and/or one or more haptic devices 6076, as described above in reference to peripheral interface 6061. In some embodiments, the peripheral interface 6061 includes one or more buttons 6043, a display 6033, a speaker 6044, a microphone 6045, and a camera 6055. In some embodiments, the peripheral interface 6061 includes one or more indicators, such as an LED.

It should be appreciated that the wearable band computing system 6030 is an example of a computing system within the wearable band 6010, and that the wearable band 6010 can have more or fewer components than shown in the wearable band computing system 6030, combine two or more components, and/or have a different configuration and/or arrangement of components. The various components shown in wearable band computing system 6030 can be implemented in one or a combination of hardware, software, and firmware, including one or more signal processing and/or application-specific integrated circuits.

The wrist-wearable device 6000 with respect to FIG. 10A is an example of the wearable band 6010 and the watch body 6020 coupled, so the wrist-wearable device 6000 will be understood to include the components shown and described for the wearable band computing system 6030 and the watch body computing system 6060. In some embodiments, wrist-wearable device 6000 has a split architecture (e.g., a split mechanical architecture, a split electrical architecture) between the watch body 6020 and the wearable band 6010. In other words, all of the components shown in the wearable band computing system 6030 and the watch body computing system 6060 can be housed or otherwise disposed in a combined watch device 6000, or within individual components of the watch body 6020, wearable band 6010, and/or portions thereof (e.g., a coupling mechanism 6016 of the wearable band 6010).

The techniques described above can be used with any device for sensing neuromuscular signals, including the arm-wearable devices of FIGS. 10A-10B, but could also be used with other types of wearable devices for sensing neuromuscular signals (such as body-wearable or head-wearable devices that might have neuromuscular sensors closer to the brain or spinal column).

In some embodiments, a wrist-wearable device 6000 can be used in conjunction with a head-wearable device described below (e.g., AR system 7000 and VR headset 7010) and/or an HIPD 8000; and the wrist-wearable device 6000 can also be configured to be used to allow a user to control aspects of the artificial reality (e.g., by using EMG-based gestures to control user interface objects in the artificial reality and/or by allowing a user to interact with the touch screen on the wrist-wearable device to also control aspects of the artificial reality). In some embodiments, a wrist-wearable device 6000 can also be used in conjunction with a wearable garment, such as the gloves described below in reference to FIGS. 13A-13C. Having thus described example wrist-wearable devices, attention will now be turned to example head-wearable devices, such AR system 7000 and VR headset 7010.

Example Head-Wearable Devices

Figure 11A:
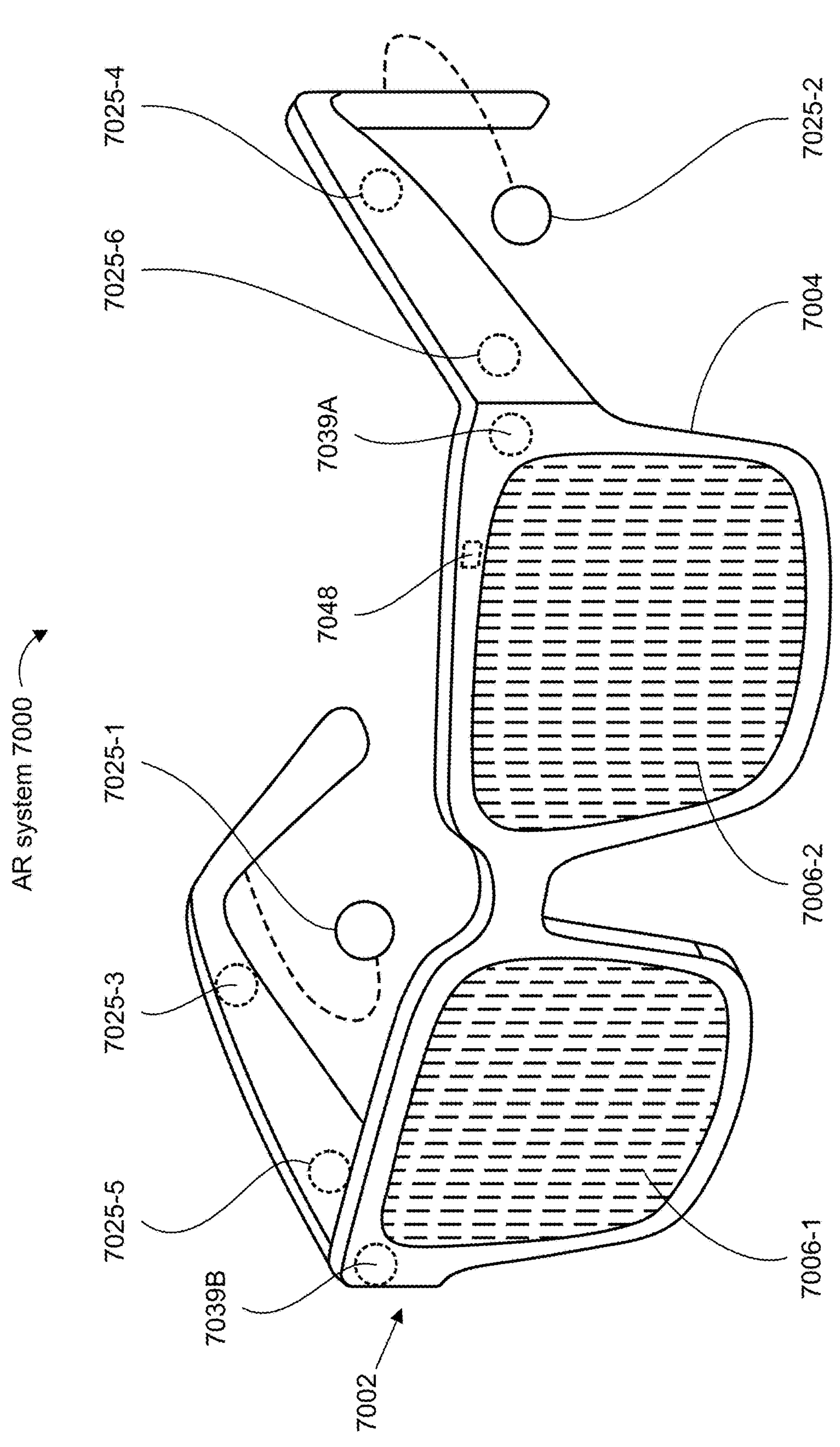
Figures 1, 11B:
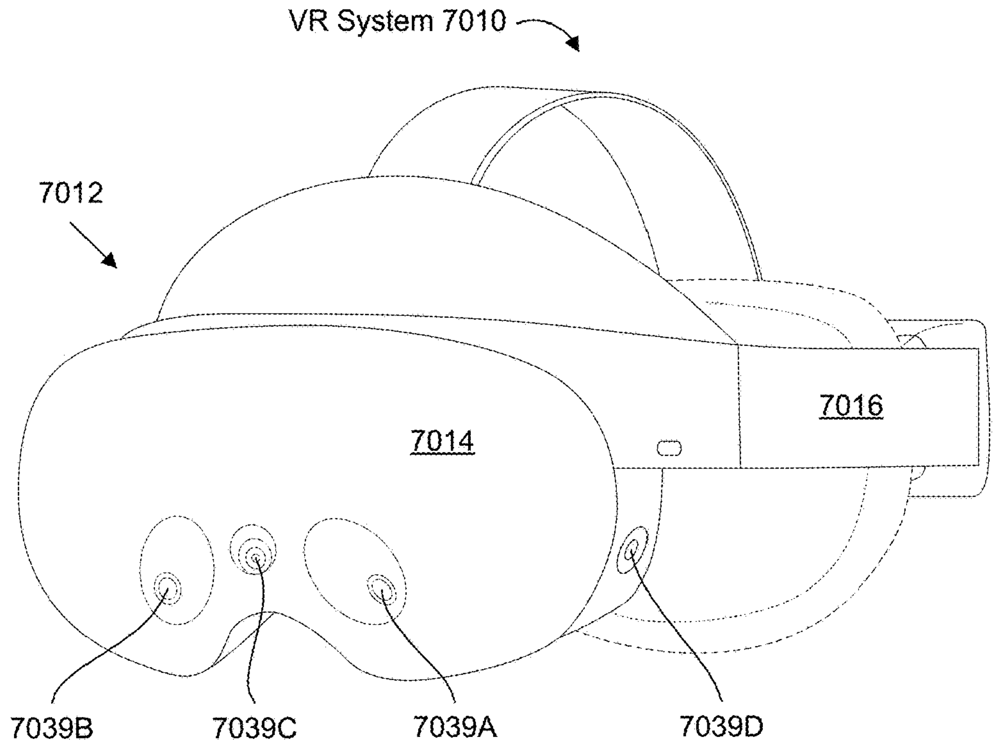
Figures 2, 11B:
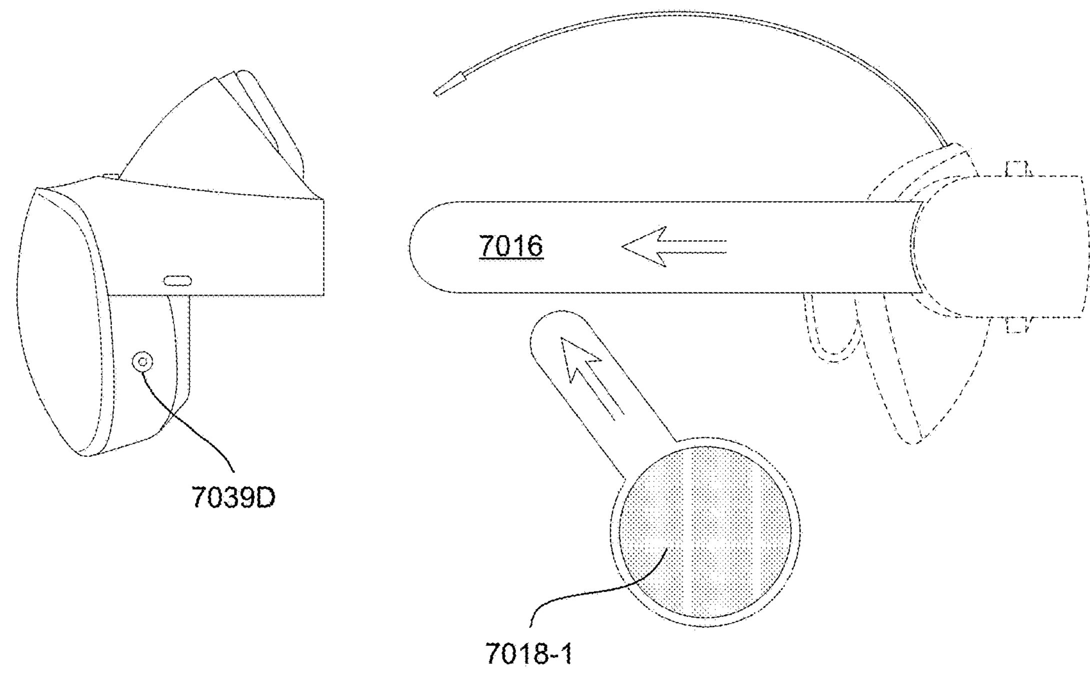
Figure 11C:
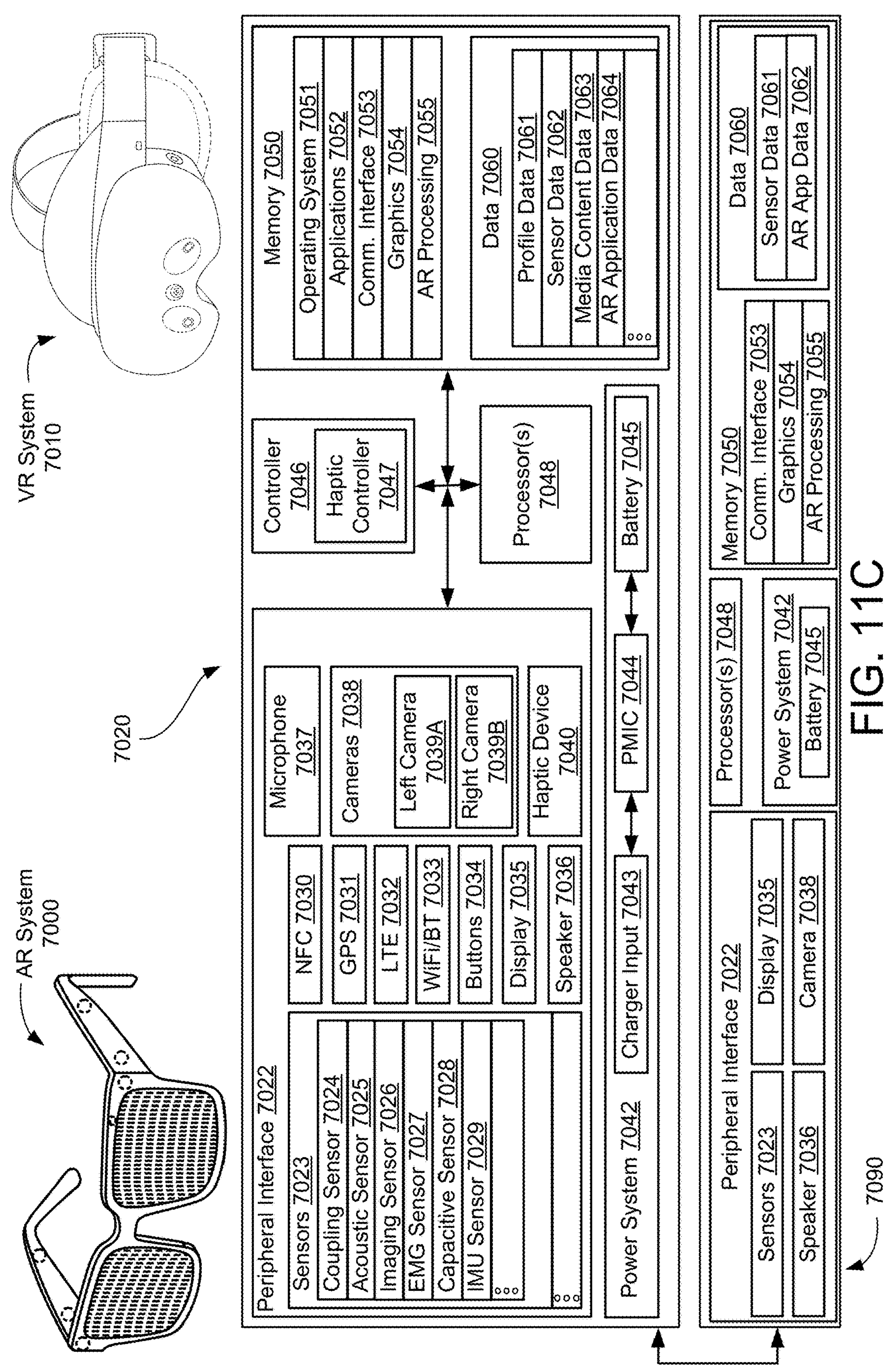

FIGS. 11A to 11C show example artificial-reality systems, including the AR system 7000. In some embodiments, the AR system 7000 is an eyewear device as shown in FIG. 11A. In some embodiments, the VR system 7010 includes a head-mounted display (HMD) 7012, as shown in FIGS. 11B-1 and 11B-2. In some embodiments, the AR system 7000 and the VR system 7010 include one or more analogous components (e.g., components for presenting interactive artificial-reality environments, such as processors, memory, and/or presentation devices including one or more displays and/or one or more waveguides), some of which are described in more detail with respect to FIG. 11C. As described herein, a head-wearable device can include components of the eyewear device 7002, and/or the head-mounted display 7012. Some embodiments of head-wearable devices do not include displays, including any of the displays described with respect to the AR system 7000 and/or the VR system 7010. While the example artificial-reality systems are respectively described herein as the AR system 7000 and the VR system 7010, either or both of the example AR systems described herein can be configured to present fully-immersive VR scenes presented in substantially all of a user's field of view, additionally or alternatively to subtler augmented-reality scenes that are presented within a portion, less than all, of the user's field of view.

FIG. 11A shows an example visual depiction of the AR system 7000 (which may also be described herein as augmented-reality glasses, and/or smart glasses). The AR system 7000 can include additional electronic components that are not shown in FIG. 11A, such as a wearable accessory device and/or an intermediary processing device, in electronic communication or otherwise configured to be used in conjunction with the eyewear device. In some embodiments, the wearable accessory device and/or the intermediary processing device may be configured to couple with the eyewear device via a coupling mechanism in electronic communication with a coupling sensor 7024, where the coupling sensor 7024 can detect when an electronic device becomes physically or electronically coupled with the eyewear device. In some embodiments, the eyewear device is configured to couple to a housing 7090, which may include one or more additional coupling mechanisms configured to couple with additional accessory devices. The components shown in FIG. 11A can be implemented in hardware, software, firmware, or a combination thereof, including one or more signal-processing components and/or application-specific integrated circuits (ASICs).

The eyewear device includes mechanical glasses components, including a frame 7004 configured to hold one or more lenses (e.g., one or both lenses 7006-1 and 7006-2). One of ordinary skill in the art will appreciate that the eyewear device can include additional mechanical components such as hinges configured to allow portions of the frame 7004 of the eyewear device 7002 to be folded and unfolded, a bridge configured to span the gap between the lenses 7006-1 and 7006-2 and rest on the user's nose, nose pads configured to rest on the bridge of the nose and provide support for the eyewear device, earpieces configured to rest on the user's ears and provide additional support for the eyewear device, temple arms configured to extend from the hinges to the earpieces of the eyewear device, and the like. One of ordinary skill in the art will further appreciate that some examples of the AR system 7000 include none of the mechanical components described herein. For example, smart contact lenses configured to present artificial reality to users may not include any components of the eyewear device.

The eyewear device includes electronic components, many of which will be described in more detail below with respect to FIG. 11C. Some example electronic components are illustrated in FIG. 11A, including acoustic sensors 7025-1, 7025-2, 7025-3, 7025-4, 7025-5, and 7025-1, which can be distributed along a substantial portion of the frame 7004 of the eyewear device. The eyewear device also includes a left camera 7039A and a right camera 7039B, which are located on different sides of the frame 7004. And the eyewear device includes a processor 7048 (e.g., an integral microprocessor, such as an ASIC) that is embedded in a portion of the frame 7004.

FIGS. 11B-1 and 11B-2 show a VR system 7010 that includes a head-mounted display (HMD) 7012 (also referred to herein as an artificial-reality headset, a head-wearable device, or a VR headset) in accordance with some embodiments. As noted, some artificial-reality systems may (e.g., the AR system 7000), instead of blending an artificial reality with actual reality, substantially replace one or more of a user's sensory perceptions of the real world with a virtual experience (e.g., the AR systems 5000*c* and 5000*d*).

The HMD 7012 includes a front body 7014 and a frame 7016 (e.g., a strap or band) shaped to fit around a user's head. In some embodiments, the front body 7014 and/or the frame 7016 includes one or more electronic elements for facilitating presentation of and/or interactions with an AR and/or VR system (e.g., displays, IMUs, tracking emitter or detectors). In some embodiments, the HMD 7012 includes output audio transducers (e.g., an audio transducer 7018-1), as shown in FIG. 11B-2. In some embodiments, one or more components, such as the output audio transducer(s) 7018-1 and the frame 7016, can be configured to attach and detach (e.g., are detachably attachable) to the HMD 7012 (e.g., a portion or all of the frame 7016, and/or the audio transducer 7018-1), as shown in FIG. 11B-2. In some embodiments, coupling a detachable component to the HMD 7012 causes the detachable component to come into electronic communication with the HMD 7012.

FIG. 11B-1 to 11B-2 also show that the VR system 7010 includes one or more cameras, such as the left camera 7039A and the right camera 7039B, which can be analogous to the left and right cameras on the frame 7004 of the eyewear device 7002. In some embodiments, the VR system 7010 includes one or more additional cameras (e.g., cameras 7039C and 7039D), which can be configured to augment image data obtained by the cameras 7039A and 7039B by providing more information. For example, the camera 7039C can be used to supply color information that is not discerned by cameras 7039A and 7039B. In some embodiments, one or more of the cameras 7039A to 7039D can include an optional IR cut filter configured to remove IR light from being received at the respective camera sensors.

FIG. 11C illustrates a computing system 7020 and an optional housing 7090, each of which shows components that can be included in the AR system 7000 and/or the VR system 7010. In some embodiments, more or fewer components can be included in the optional housing 7090 depending on practical restraints of the respective AR system being described.

In some embodiments, the computing system 7020 and/or the optional housing 7090 can include one or more peripheral interfaces 7022, one or more power systems 7042, one or more controllers 7046 (including one or more haptic controllers 7047), one or more processors 7048 (as defined above, including any of the examples provided), and memory 7050, which can all be in electronic communication with each other. For example, the one or more processors 7048 can be configured to execute instructions stored in the memory 7050, which can cause a controller of the one or more controllers 7046 to cause operations to be performed at one or more peripheral devices of the peripheral interface 7022. In some embodiments, each operation described can occur based on electrical power provided by the power system 7042.

In some embodiments, the peripheral interface 7022 can include one or more devices configured to be part of the computing system 7020, many of which have been defined above and/or described with respect to wrist-wearable devices shown in FIGS. 10A and 10B. For example, the peripheral interface can include one or more sensors 7023. Some example sensors include: one or more coupling sensors 7024, one or more acoustic sensors 7025, one or more imaging sensors 7026, one or more EMG sensors 7027, one or more capacitive sensors 7028, and/or one or more IMU sensors 7029, and/or any other types of sensors defined above or described with respect to any other embodiments discussed herein.

In some embodiments, the peripheral interface can include one or more additional peripheral devices, including one or more NFC devices 7030, one or more GPS devices 7031, one or more LTE devices 7032, one or more Wi-Fi and/or Bluetooth devices 7033, one or more buttons 7034 (e.g., including buttons that are slidable or otherwise adjustable), one or more displays 7035, one or more speakers 7036, one or more microphones 7037, one or more cameras 7038 (e.g., including the left camera 7039A and/or a right camera 7039B), and/or one or more haptic devices 7040, and/or any other types of peripheral devices defined above or described with respect to any other embodiments discussed herein.

AR systems can include a variety of types of visual feedback mechanisms (e.g., presentation devices). For example, display devices in the AR system 7000 and/or the VR system 7010 can include one or more liquid-crystal displays (LCDs), light-emitting diode (LED) displays, organic LED (OLED) displays, and/or any other suitable types of display screens. Artificial-reality systems can include a single display screen (e.g., configured to be seen by both eyes), and/or can provide separate display screens for each eye, which can allow for additional flexibility for varifocal adjustments and/or for correcting a refractive error associated with the user's vision. Some embodiments of AR systems also include optical subsystems having one or more lenses (e.g., conventional concave or convex lenses, Fresnel lenses, or adjustable liquid lenses) through which a user can view a display screen.

For example, respective displays can be coupled to each of the lenses 7006-1 and 7006-2 of the AR system 7000. The displays coupled to each of the lenses 7006-1 and 7006-2 can act together or independently to present an image or series of images to a user. In some embodiments, the AR system 7000 includes a single display (e.g., a near-eye display) or more than two displays. In some embodiments, a first set of one or more displays can be used to present an augmented-reality environment, and a second set of one or more display devices can be used to present a VR environment. In some embodiments, one or more waveguides are used in conjunction with presenting artificial-reality content to the user of the AR system 7000 (e.g., as a means of delivering light from one or more displays to the user's eyes). In some embodiments, one or more waveguides are fully or partially integrated into the eyewear device 7002. Additionally or alternatively to display screens, some artificial-reality systems include one or more projection systems. For example, display devices in the AR system 7000 and/or the VR system 7010 can include micro-LED projectors that project light (e.g., using a waveguide) into display devices, such as clear combiner lenses that allow ambient light to pass through. The display devices can refract the projected light toward a user's pupil and can enable a user to simultaneously view both artificial-reality content and the real world. Artificial-reality systems can also be configured with any other suitable type or form of image projection system. In some embodiments, one or more waveguides are provided additionally or alternatively to the one or more display(s).

The computing system 7020 and/or the optional housing 7090 of the AR system 7000 or the VR system 7010 can include some or all of the components of a power system 7042. The power system 7042 can include one or more charger inputs 7043, one or more PMICs 7044, and/or one or more batteries 7045.

The memory 7050 includes instructions and data, some or all of which may be stored as non-transitory computer-readable storage media within the memory 7050. For example, the memory 7050 can include one or more operating systems 7051, one or more applications 7052, one or more communication interface applications 7053, one or more graphics applications 7054, one or more AR processing applications 7055, and/or any other types of data defined above or described with respect to any other embodiments discussed herein.

The memory 7050 also includes data 7060 that can be used in conjunction with one or more of the applications discussed above. The data 7060 can include profile data 7061, sensor data 7062, media content data 7063, AR application data 7064, and/or any other type of data defined above or described with respect to any other embodiments discussed herein.

In some embodiments, the controller 7046 of the eyewear device 7002 processes information generated by the sensors 7023 on the eyewear device 7002 and/or another electronic device within the AR system 7000. For example, the controller 7046 can process information from the acoustic sensors 7025-1 and 7025-2. For each detected sound, the controller 7046 can perform a direction-of-arrival (DOA) estimation to estimate a direction from which the detected sound arrived at the eyewear device 7002 of the AR system 7000. As one or more of the acoustic sensors 7025 detects sounds, the controller 7046 can populate an audio data set with the information (e.g., represented in FIG. 11C as sensor data 7062).

In some embodiments, a physical electronic connector can convey information between the eyewear device and another electronic device, and/or between one or more processors of the AR system 7000 or the VR system 7010 and the controller 7046. The information can be in the form of optical data, electrical data, wireless data, or any other transmittable data form. Moving the processing of information generated by the eyewear device to an intermediary processing device can reduce weight and heat in the eyewear device, making it more comfortable and safer for a user. In some embodiments, an optional wearable accessory device (e.g., an electronic neckband) is coupled to the eyewear device via one or more connectors. The connectors can be wired or wireless connectors and can include electrical and/or non-electrical (e.g., structural) components. In some embodiments, the eyewear device and the wearable accessory device can operate independently without any wired or wireless connection between them.

In some situations, pairing an external device, such as an intermediary processing device (e.g., the HIPD 8000) with the eyewear device 7002 (e.g., as part of the AR system 7000) enables the eyewear device 7002 to achieve a similar form factor of a pair of glasses while still providing sufficient battery and computation power for expanded capabilities. Some or all of the battery power, computational resources, and/or additional features of the AR system 7000 can be provided by a paired device or shared between a paired device and the eyewear device 7002, thus reducing the weight, heat profile, and form factor of the eyewear device 7002 overall while allowing the eyewear device 7002 to retain its desired functionality. For example, the wearable accessory device can allow components that would otherwise be included on an eyewear device 7002 to be included in the wearable accessory device and/or intermediary processing device, thereby shifting a weight load from the user's head and neck to one or more other portions of the user's body. In some embodiments, the intermediary processing device has a larger surface area over which to diffuse and disperse heat to the ambient environment. Thus, the intermediary processing device can allow for greater battery and computation capacity than might otherwise have been possible on the eyewear device 7002 standing alone. Because weight carried in the wearable accessory device can be less onerous for a user than weight carried in the eyewear device 7002, a user may tolerate wearing a lighter eyewear device and carrying or wearing the paired device for greater lengths of time than the user would tolerate wearing a heavier eyewear device standing alone, thereby enabling an artificial-reality environment to be incorporated more fully into a user's day-to-day activities.

AR systems can include various types of computer vision components and subsystems. For example, the AR system 7000 and/or the VR system 7010 can include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An AR system can process data from one or more of these sensors to identify a location of a user and/or aspects of the user's real-world physical surroundings, including the locations of real-world objects within the real-world physical surroundings. In some embodiments, the methods described herein are used to map the real world, to provide a user with context about real-world surroundings, and/or to generate digital twins (e.g., interactable virtual objects), among a variety of other functions. For example, FIGS. 11B-1 and 11B-2 show the VR system 7010 having cameras 7039A to 7039D, which can be used to provide depth information for creating a voxel field and a two-dimensional mesh to provide object information to the user to avoid collisions.

In some embodiments, the AR system 7000 and/or the VR system 7010 can include haptic (tactile) feedback systems, which may be incorporated into headwear, gloves, body suits, handheld controllers, environmental devices (e.g., chairs or floormats), and/or any other type of device or system such as the wearable devices discussed herein. The haptic feedback systems may provide various types of cutaneous feedback, including vibration, force, traction, shear, texture, and/or temperature. The haptic feedback systems may also provide various types of kinesthetic feedback, such as motion and compliance. The haptic feedback may be implemented using motors, piezoelectric actuators, fluidic systems, and/or a variety of other types of feedback mechanisms. The haptic feedback systems may be implemented independently of other artificial-reality devices, within other artificial-reality devices, and/or in conjunction with other artificial-reality devices (e.g., the haptic feedback system described with respect to FIGS. 13A to 13C).

In some embodiments of an AR system, such as the AR system 7000 and/or the VR system 7010, ambient light (e.g., a live feed of the surrounding environment that a user would normally see) can be passed through a display element of a respective head-wearable device presenting aspects of the AR system. In some embodiments, ambient light can be passed through a portion comprising less than all of an AR environment presented within a user's field of view (e.g., a portion of the AR environment co-located with a physical object in the user's real-world environment that is within a designated boundary (e.g., a guardian boundary)) configured to be used by the user while they are interacting with the AR environment. For example, a visual user interface element (e.g., a notification user interface element) can be presented at the head-wearable device, and an amount of ambient light (e.g., 15%-50% of the ambient light) can be passed through the user interface element such that the user can distinguish at least a portion of the physical environment over which the user interface element is being displayed.

Example Handheld Intermediary Processing Devices

FIGS. 14A and 14B illustrate an example handheld intermediary processing device (HIPD) 8000, in accordance with some embodiments. The HIPD 8000 is an instance of the intermediary device described herein, such that the HIPD 8000 should be understood to have the features described with respect to any intermediary device defined above or otherwise described herein, and vice versa. FIG. 14A shows a top view 8005 and a side view 8025 of the HIPD 8000. The HIPD 8000 is configured to communicatively couple with one or more wearable devices (or other electronic devices) associated with a user. For example, the HIPD 8000 is configured to communicatively couple with a user's wrist-wearable device 6000 (or components thereof, such as the watch body 6020 and the wearable band 6010), AR system 7000, and/or VR headset 7010. The HIPD 8000 can be configured to be held by a user (e.g., as a handheld controller), carried on the user's person (e.g., in their pocket or in their bag), placed in proximity of the user (e.g., placed on their desk while seated at the desk or on a charging dock), and/or placed at or within a predetermined distance from a wearable device or other electronic device (e.g., where, in some embodiments, the predetermined distance is the maximum distance (e.g., 10 meters) at which the HIPD 8000 can successfully be communicatively coupled with an electronic device, such as a wearable device).

The HIPD 8000 can perform various functions independently and/or in conjunction with one or more wearable devices (e.g., wrist-wearable device 6000, AR system 7000, and/or VR headset 7010). The HIPD 8000 is configured to increase and/or improve the functionality of communicatively coupled devices, such as the wearable devices. The HIPD 8000 is configured to perform one or more functions or operations associated with interacting with user interfaces and applications of communicatively coupled devices, interacting with an AR environment, interacting with a VR environment, and/or operating as a human-machine interface controller. Additionally, as will be described in more detail below, functionality and/or operations of the HIPD 8000 can include, without limitation, task offloading and/or handoffs; thermal offloading and/or handoffs; six degrees of freedom (6DoF) raycasting and/or gaming (e.g., using imaging devices or cameras 8014, which can be used for simultaneous localization and mapping (SLAM) and/or with other image processing techniques); portable charging; messaging; image capturing via one or more imaging devices or cameras 8022; sensing user input (e.g., sensing a touch on a touch input surface 8002); wireless communications and/or interlining (e.g., cellular, near field, Wi-Fi, or personal area network); location determination; financial transactions; providing haptic feedback; alarms; notifications; biometric authentication; health monitoring; and/or sleep monitoring. The above-example functions can be executed independently in the HIPD 8000 and/or in communication between the HIPD 8000 and another wearable device described herein. In some embodiments, functions can be executed on the HIPD 8000 in conjunction with an AR environment. As the skilled artisan will appreciate upon reading the descriptions provided herein, the HIPD 8000 described herein can be used with any type of suitable AR environment.

While the HIPD 8000 is communicatively coupled with a wearable device and/or other electronic device, the HIPD 8000 is configured to perform one or more operations initiated at the wearable device and/or the other electronic device. In particular, one or more operations of the wearable device and/or the other electronic device can be offloaded to the HIPD 8000 to be performed. The HIPD 8000 performs the one or more operations of the wearable device and/or the other electronic device and provides data corresponding to the completed operations to the wearable device and/or the other electronic device. For example, a user can initiate a video stream using AR system 7000, and back-end tasks associated with performing the video stream (e.g., video rendering) can be offloaded to the HIPD 8000, which the HIPD 8000 performs and provides corresponding data to the AR system 7000 to perform remaining front-end tasks associated with the video stream (e.g., presenting the rendered video data via a display of the AR system 7000). In this way, the HIPD 8000, which has more computational resources and greater thermal headroom than a wearable device, can perform computationally intensive tasks for the wearable device, improving performance of an operation performed by the wearable device.

The HIPD 8000 includes a multi-touch input surface 8002 on a first side (e.g., a front surface) that is configured to detect one or more user inputs. In particular, the multi-touch input surface 8002 can detect single-tap inputs, multi-tap inputs, swipe gestures and/or inputs, force-based and/or pressure-based touch inputs, held taps, and the like. The multi-touch input surface 8002 is configured to detect capacitive touch inputs and/or force (and/or pressure) touch inputs. The multi-touch input surface 8002 includes a touch-input surface 8004 defined by a surface depression, and a touch-input surface 8006 defined by a substantially planar portion. The touch-input surface 8004 can be disposed adjacent to the touch-input surface 8006. In some embodiments, the touch-input surface 8004 and the touch-input surface 8006 can be different dimensions, shapes, and/or cover different portions of the multi-touch input surface 8002. For example, the touch-input surface 8004 can be substantially circular and the touch-input surface 8006 is substantially rectangular. In some embodiments, the surface depression of the multi-touch input surface 8002 is configured to guide user handling of the HIPD 8000. In particular, the surface depression is configured such that the user holds the HIPD 8000 upright when held in a single hand (e.g., such that the imaging devices or cameras 8014A and 8014B are pointed toward a ceiling or the sky). Additionally, the surface depression is configured such that the user's thumb rests within the touch-input surface 8004.

In some embodiments, the different touch-input surfaces include a plurality of touch-input zones. For example, the touch-input surface 8006 includes at least a touch-input zone 8008 within a touch-input zone 8006 and a touch-input zone 8010 within the touch-input zone 8008. In some embodiments, one or more of the touch-input zones are optional and/or user-defined (e.g., a user can specific a touch-input zone based on their preferences). In some embodiments, each touch-input surface and/or touch-input zone is associated with a predetermined set of commands. For example, a user input detected within the touch-input zone 8008 causes the HIPD 8000 to perform a first command and a user input detected within the touch-input zone 8006 causes the HIPD 8000 to perform a second command distinct from the first. In some embodiments, different touch-input surfaces and/or touch-input zones are configured to detect one or more types of user inputs. The different touch-input surfaces and/or touch-input zones can be configured to detect the same or distinct types of user inputs. For example, the touch-input zone 8008 can be configured to detect force touch inputs (e.g., a magnitude at which the user presses down) and capacitive touch inputs, and the touch-input zone 8006 can be configured to detect capacitive touch inputs.

The HIPD 8000 includes one or more sensors 8051 for sensing data used in the performance of one or more operations and/or functions. For example, the HIPD 8000 can include an IMU sensor that is used in conjunction with cameras 8014 for three-dimensional object manipulation (e.g., enlarging, moving, or destroying an object) in an AR or VR environment. Non-limiting examples of the sensors 8051 included in the HIPD 8000 include a light sensor, a magnetometer, a depth sensor, a pressure sensor, and a force sensor. Additional examples of the sensors 8051 are provided below in reference to FIG. 14B.

The HIPD 8000 can include one or more light indicators 8012 to provide one or more notifications to the user. In some embodiments, the light indicators are LEDs or other types of illumination devices. The light indicators 8012 can operate as a privacy light to notify the user and/or others near the user that an imaging device and/or microphone are active. In some embodiments, a light indicator is positioned adjacent to one or more touch-input surfaces. For example, a light indicator can be positioned around the touch-input surface 8004. The light indicators can be illuminated in different colors and/or patterns to provide the user with one or more notifications and/or information about the device. For example, a light indicator positioned around the touch-input surface 8004 can flash when the user receives a notification (e.g., a message), change to red when the HIPD 8000 is out of power, operate as a progress bar (e.g., a light ring that is closed when a task is completed (e.g., 0% to 100%)) and/or operate as a volume indicator).

In some embodiments, the HIPD 8000 includes one or more additional sensors on another surface. For example, as shown in FIG. 14A, HIPD 8000 includes a set of one or more sensors (e.g., sensor set 8020) on an edge of the HIPD 8000. The sensor set 8020, when positioned on an edge of the of the HIPD 8000, can be positioned at a predetermined tilt angle (e.g., 26 degrees), which allows the sensor set 8020 to be angled toward the user when placed on a desk or other flat surface. Alternatively, in some embodiments, the sensor set 8020 is positioned on a surface opposite the multi-touch input surface 8002 (e.g., a back surface). The one or more sensors of the sensor set 8020 are discussed in detail below.

The side view 8025 of the of the HIPD 8000 shows the sensor set 8020 and camera 8014B. The sensor set 8020 includes one or more cameras 8022A and 8022B, a depth projector 8024, an ambient light sensor 8028, and a depth receiver 8030. In some embodiments, the sensor set 8020 includes a light indicator 8026. The light indicator 8026 can operate as a privacy indicator to let the user and/or those around them know that a camera and/or microphone is active. The sensor set 8020 is configured to capture a user's facial expression such that the user can puppet a custom avatar (e.g., showing emotions such as smiles and/or laughter on the avatar or a digital representation of the user). The sensor set 8020 can be configured as a side stereo RGB system, a rear indirect Time-of-Flight (iToF) system, or a rear stereo RGB system. As the skilled artisan will appreciate upon reading the descriptions provided herein, the HIPD 8000 described herein can use different sensor set 8020 configurations and/or sensor set 8020 placements.

In some embodiments, the HIPD 8000 includes one or more haptic devices 8071 (e.g., a vibratory haptic actuator) that are configured to provide haptic feedback (e.g., kinesthetic sensation). The sensors 8051 and/or the haptic devices 8071 can be configured to operate in conjunction with multiple applications and/or communicatively coupled devices, including, without limitation, wearable devices, health-monitoring applications, social media applications, game applications, and artificial reality applications (e.g., the applications associated with artificial reality).

The HIPD 8000 is configured to operate without a display. However, in optional embodiments, the HIPD 8000 can include a display 8068 (FIG. 14B). The HIPD 8000 can also income one or more optional peripheral buttons 8067 (FIG. 14B). For example, the peripheral buttons 8067 can be used to turn on or turn off the HIPD 8000. Further, the HIPD 8000 housing can be formed of polymers and/or elastomers. The HIPD 8000 can be configured to have a non-slip surface to allow the HIPD 8000 to be placed on a surface without requiring a user to watch over the HIPD 8000. In other words, the HIPD 8000 is designed such that it would not easily slide off surfaces. In some embodiments, the HIPD 8000 includes one or magnets to couple the HIPD 8000 to another surface. This allows the user to mount the HIPD 8000 to different surfaces and provide the user with greater flexibility in use of the HIPD 8000.

As described above, the HIPD 8000 can distribute and/or provide instructions for performing the one or more tasks at the HIPD 8000 and/or a communicatively coupled device. For example, the HIPD 8000 can identify one or more back-end tasks to be performed by the HIPD 8000 and one or more front-end tasks to be performed by a communicatively coupled device. While the HIPD 8000 is configured to offload and/or hand off tasks of a communicatively coupled device, the HIPD 8000 can perform both back-end and front-end tasks (e.g., via one or more processors, such as CPU 8077; FIG. 14B). The HIPD 8000 can, without limitation, be used to perform augmenting calling (e.g., receiving and/or sending 3D or 2.5D live volumetric calls, live digital human representation calls, and/or avatar calls), discreet messaging, 6DoF portrait/landscape gaming, AR/VR object manipulation, AR/VR content display (e.g., presenting content via a virtual display), and/or other AR/VR interactions. The HIPD 8000 can perform the above operations alone or in conjunction with a wearable device (or other communicatively coupled electronic device).

FIG. 14B shows block diagrams of a computing system 8040 of the HIPD 8000, in accordance with some embodiments. The HIPD 8000, described in detail above, can include one or more components shown in HIPD computing system 8040. The HIPD 8000 will be understood to include the components shown and described below for the HIPD computing system 8040. In some embodiments, all or a substantial portion of the components of the HIPD computing system 8040 are included in a single integrated circuit. Alternatively, in some embodiments, components of the HIPD computing system 8040 are included in a plurality of integrated circuits that are communicatively coupled.

The HIPD computing system 8040 can include a processor (e.g., a CPU 8077, a GPU, and/or a CPU with integrated graphics), a controller 8075, a peripheral interface 8050 that includes one or more sensors 8051 and other peripheral devices, a power source (e.g., a power system 8095), and memory (e.g., a memory 8078) that includes an operating system (e.g., an operating system 8079), data (e.g., data 8088), one or more applications (e.g., applications 8080), and one or more modules (e.g., a communications interface module 8081, a graphics module 8082, a task and processing management module 8083, an interoperability module 8084, an AR processing module 8085, and/or a data management module 8086). The HIPD computing system 8040 further includes a power system 8095 that includes a charger input and output 8096, a PMIC 8097, and a battery 8098, all of which are defined above.

In some embodiments, the peripheral interface 8050 can include one or more sensors 8051. The sensors 8051 can include sensors analogous to those described above in reference to FIG. 10B. For example, the sensors 8051 can include imaging sensors 8054, (optional) EMG sensors 8056, IMU sensors 8058, and capacitive sensors 8060. In some embodiments, the sensors 8051 can include one or more pressure sensors 8052 for sensing pressure data, an altimeter 8053 for sensing an altitude of the HIPD 8000, a magnetometer 8055 for sensing a magnetic field, a depth sensor 8057 (or a time-of-flight sensor) for determining a difference between the camera and the subject of an image, a position sensor 8059 (e.g., a flexible position sensor) for sensing a relative displacement or position change of a portion of the HIPD 8000, a force sensor 8061 for sensing a force applied to a portion of the HIPD 8000, and a light sensor 8062 (e.g., an ambient light sensor) for detecting an amount of lighting. The sensors 8051 can include one or more sensors not shown in FIG. 17B.

Analogous to the peripherals described above in reference to FIG. 10B, the peripheral interface 8050 can also include an NFC component 8063, a GPS component 8064, an LTE component 8065, a Wi-Fi and/or Bluetooth communication component 8066, a speaker 8069, a haptic device 8071, and a microphone 8073. As described above in reference to FIG. 17A, the HIPD 8000 can optionally include a display 8068 and/or one or more buttons 8067. The peripheral interface 8050 can further include one or more cameras 8070, touch surfaces 8072, and/or one or more light emitters 8074. The multi-touch input surface 8002 described above in reference to FIG. 17A is an example of touch surface 8072. The light emitters 8074 can be one or more LEDs, lasers and can be used to project or present information to a user. For example, the light emitters 8074 can include light indicators 8012 and 8026 described above in reference to FIG. 17A. The cameras 8070 (e.g., cameras 8014 and 8022 described above in FIG. 17A) can include one or more wide-angle cameras, fish-eye cameras, spherical cameras, compound eye cameras (e.g., stereo and multi cameras), depth cameras, RGB cameras, ToF cameras, RGB-D cameras (depth and ToF cameras), and/or other available cameras. Cameras 8070 can be used for SLAM; 6 DoF ray-casting, gaming, object manipulation, and/or other rendering; and/or facial recognition and facial expression recognition.

Similar to the watch body computing system 6060 and the watch band computing system 6030 described above in reference to FIG. 10B, the HIPD computing system 8040 can include one or more haptic controllers 8076 and associated componentry (e.g., haptic devices 8071) for providing haptic events at the HIPD 8000.

Memory 8078 can include high-speed random-access memory and/or non-volatile memory, such as one or more magnetic disk storage devices, flash memory devices, or other non-volatile solid-state memory devices. Access to the memory 8078 by other components of the HIPD 8000, such as the one or more processors and the peripheral interface 8050, can be controlled by a memory controller of the controllers 8075.

In some embodiments, software components stored in the memory 8078 include one or more operating systems 8079, one or more applications 8080, one or more communication interface modules 8081, one or more graphics modules 8082, and one or more data management modules 8086, all of which are analogous to the software components described above in reference to FIG. 10B.

In some embodiments, software components stored in the memory 8078 include a task and processing management module 8083 for identifying one or more front-end and back-end tasks associated with an operation performed by the user, performing one or more front-end and/or back-end tasks, and/or providing instructions to one or more communicatively coupled devices that cause performance of the one or more front-end and/or back-end tasks. In some embodiments, the task and processing management module 8083 uses data 8088 (e.g., device data 8090) to distribute the one or more front-end and/or back-end tasks based on communicatively coupled devices' computing resources, available power, thermal headroom, ongoing operations, and/or other factors. For example, the task and processing management module 8083 can cause the performance of one or more back-end tasks (of an operation performed at communicatively coupled AR system 7000) at the HIPD 8000 in accordance with a determination that the operation is utilizing a predetermined amount (e.g., at least 70%) of computing resources available at the AR system 7000.

In some embodiments, software components stored in the memory 8078 include an interoperability module 8084 for exchanging and utilizing information received by and/or provided to distinct communicatively coupled devices. The interoperability module 8084 allows for different systems, devices, and/or applications to connect and communicate in a coordinated way without user input. In some embodiments, software components stored in the memory 8078 include an AR module 8085 that is configured to process signals based at least on sensor data for use in an AR and/or VR environment. For example, the AR module 8085 can be used for 3D object manipulation, gesture recognition, and/or facial and facial expression recognition.

The memory 8078 can also include data 8088, including structured data. In some embodiments, the data 8088 includes profile data 8089, device data 8090 (including device data of one or more devices communicatively coupled with the HIPD 8000, such as device type, hardware, software, and/or configurations), sensor data 8091, media content data 8092, and application data 8093.

It should be appreciated that the HIPD computing system 8040 is an example of a computing system within the HIPD 8000, and that the HIPD 8000 can have more or fewer components than shown in the HIPD computing system 8040, combine two or more components, and/or have a different configuration and/or arrangement of the components. The various components shown in HIPD computing system 8040 are implemented in hardware, software, firmware, or a combination thereof, including one or more signal processing and/or application-specific integrated circuits.

The techniques described above in FIGS. 17A-17B can be used with any device used as a human-machine interface controller. In some embodiments, an HIPD 8000 can be used in conjunction with one or more wearable devices such as a head-wearable device (e.g., AR system 7000 and VR system 7010) and/or a wrist-wearable device 6000 (or components thereof). In some embodiments, an HIPD 8000 is used in conjunction with a wearable garment, such as the gloves in FIGS. 13A-13C. Having thus described example HIPD 8000, attention will now be turned to example feedback devices, such as device 9000.

Example Feedback Devices

Figure 13B:
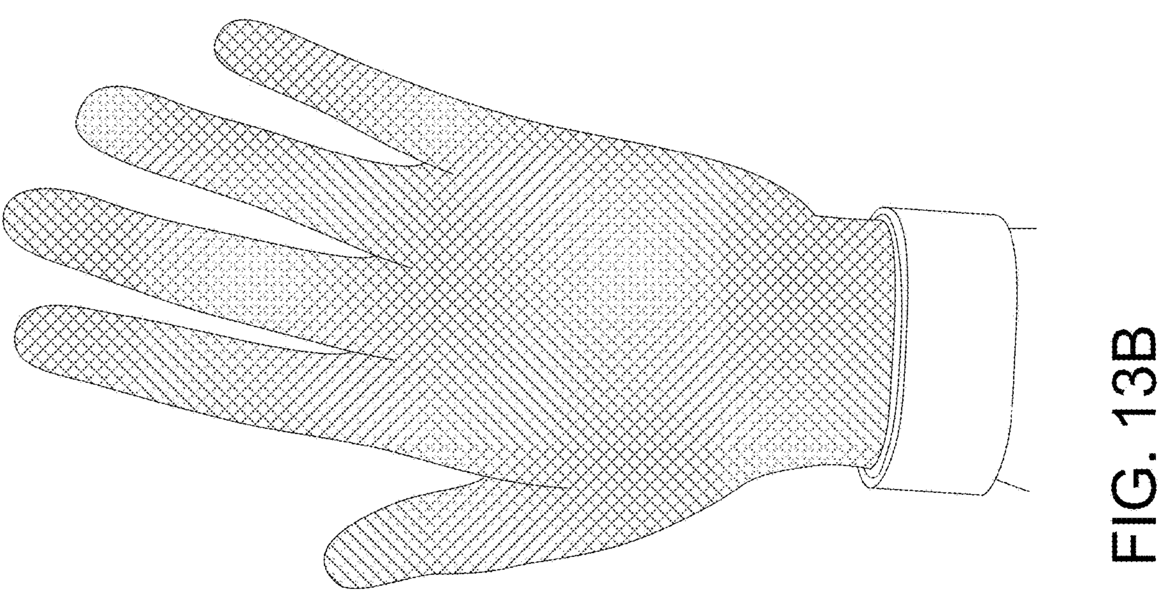
FIGS. 13A-13C illustrate example wearable gloves in accordance with some embodiments.
Figure 13A:
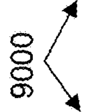
Figure 13A:
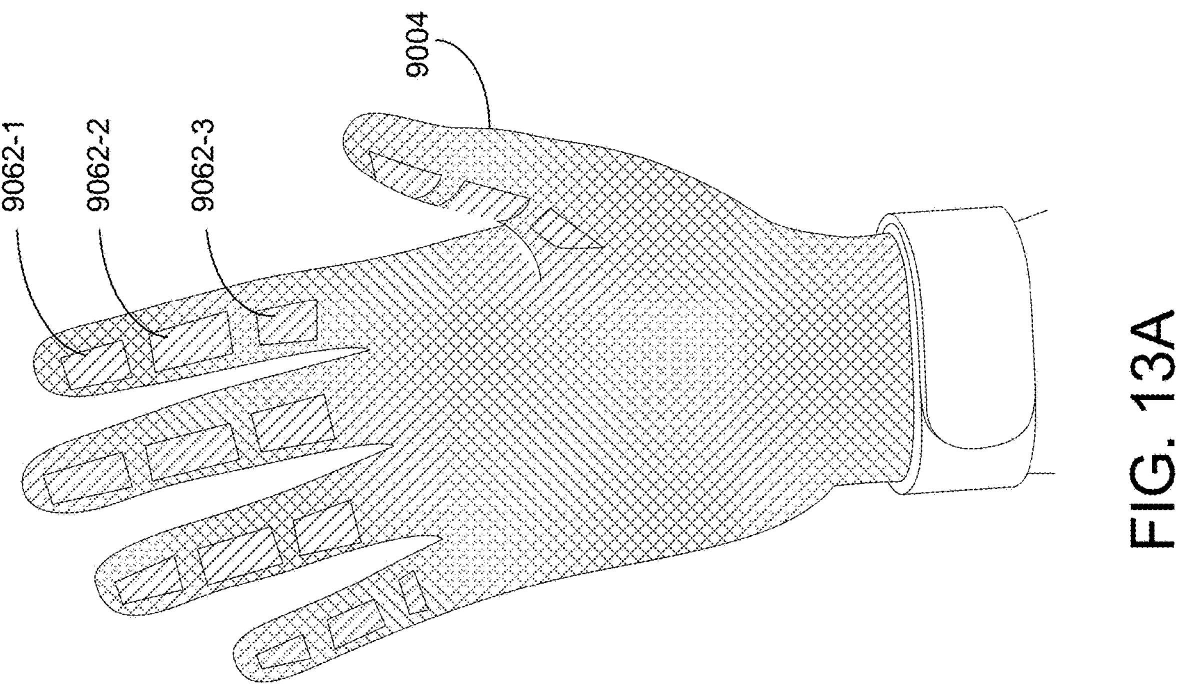

FIGS. 13A and 13B show example haptic feedback systems (e.g., hand-wearable devices) for providing feedback to a user regarding the user's interactions with a computing system (e.g., an artificial-reality environment presented by the AR system 7000 or the VR system 7010). In some embodiments, a computing system (e.g., the AR system 5000*d*) may also provide feedback to one or more users based on an action that was performed within the computing system and/or an interaction provided by the AR system (e.g., which may be based on instructions that are executed in conjunction with performing operations of an application of the computing system). Such feedback may include visual and/or audio feedback and may also include haptic feedback provided by a haptic assembly, such as one or more haptic assemblies 9062 of the device 9000 (e.g., haptic assemblies 9062-1, 9062-2, and 9062-3). For example, the haptic feedback may prevent (or, at a minimum, hinder/resist movement of) one or more fingers of a user from bending past a certain point to simulate the sensation of touching a solid coffee mug. In actuating such haptic effects, the device 9000 can change (either directly or indirectly) a pressurized state of one or more of the haptic assemblies 9062.

Each of the haptic assemblies 9062 includes a mechanism that, at a minimum, provides resistance when the respective haptic assembly 9062 is transitioned from a first pressurized state (e.g., atmospheric pressure or deflated) to a second pressurized state (e.g., inflated to a threshold pressure). Structures of haptic assemblies 9062 can be integrated into various devices configured to be in contact or proximity to a user's skin, including, but not limited to, devices such as glove-worn devices, body-worn clothing device, and headset devices.

As noted above, the haptic assemblies 9062 described herein can be configured to transition between a first pressurized state and a second pressurized state to provide haptic feedback to the user. Due to the ever-changing nature of artificial reality, the haptic assemblies 9062 may be required to transition between the two states hundreds or perhaps thousands of times during a single use. Thus, the haptic assemblies 9062 described herein are durable and designed to quickly transition from state to state. To provide some context, in the first pressurized state the haptic assemblies 9062 do not impede free movement of a portion of the wearer's body. For example, one or more haptic assemblies 9062 incorporated into a glove are made from flexible materials that do not impede free movement of the wearer's hand and fingers (e.g., an electrostatic-zipping actuator). The haptic assemblies 9062 are configured to conform to a shape of the portion of the wearer's body when in the first pressurized state. However, once in the second pressurized state, the haptic assemblies 9062 can be configured to restrict and/or impede free movement of the portion of the wearer's body (e.g., digits of the user's hand). For example, the respective haptic assembly 9062 (or multiple respective haptic assemblies) can restrict movement of a wearer's finger (e.g., prevent the finger from curling or extending) when the haptic assembly 9062 is in the second pressurized state. Moreover, once in the second pressurized state, the haptic assemblies 9062 may take different shapes, with some haptic assemblies 9062 configured to take a planar, rigid shape (e.g., flat and rigid), while other haptic assemblies 9062 are configured to curve or bend, at least partially.

As a non-limiting example, the device 9000 includes a plurality of haptic devices (e.g., a pair of haptic gloves), and a haptics component of a wrist-wearable device (e.g., any of the wrist-wearable devices described with respect to FIGS. 10A-10B). Each of these can include a garment component (e.g., a garment 9004) and one or more haptic assemblies coupled (e.g., physically coupled) to the garment component. For example, each of the haptic assemblies 9062-1, 9062-2, 9062-3, through 9062-N that is physically coupled to the garment 9004 is configured to contact respective phalanges of a user's thumb and fingers. As explained above, the haptic assemblies 9062 are configured to provide haptic simulations to a wearer of the device 9000. The garment 9004 of each device 9000 can be one of various articles of clothing (e.g., gloves, socks, shirts, or pants). Thus, a user may wear multiple devices 9000 that are each configured to provide haptic stimulations to respective parts of the body where the devices 9000 are being worn.

Figure 13C:
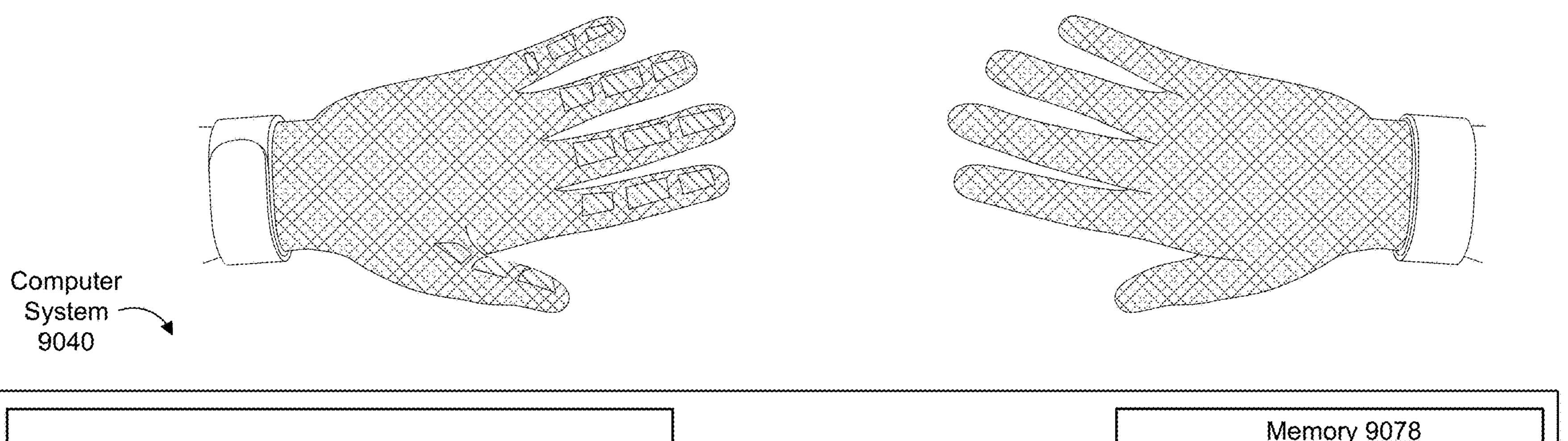
Figure 13C:
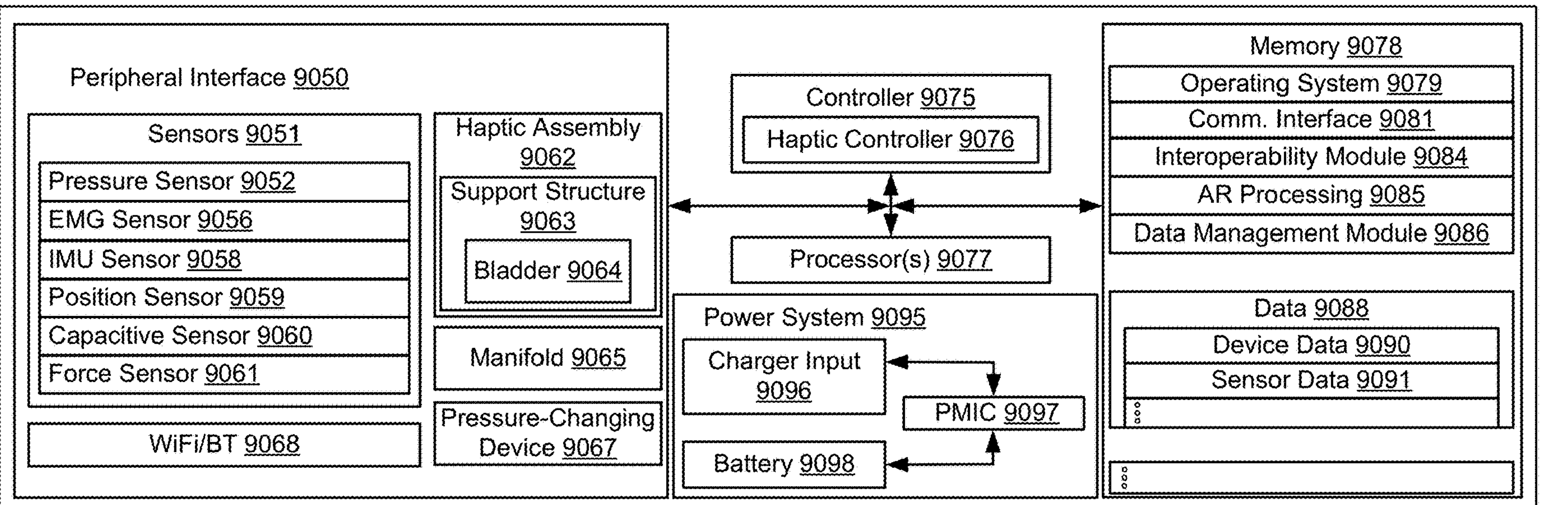

FIG. 13C shows block diagrams of a computing system 9040 of the device 9000, in accordance with some embodiments. The computing system 9040 can include one or more peripheral interfaces 9050, one or more power systems 9095, one or more controllers 9075 (including one or more haptic controllers 9076), one or more processors 9077 (as defined above, including any of the examples provided), and memory 9078, which can all be in electronic communication with each other. For example, the one or more processors 9077 can be configured to execute instructions stored in the memory 9078, which can cause a controller of the one or more controllers 9075 to cause operations to be performed at one or more peripheral devices of the peripheral interface 9050. In some embodiments, each operation described can occur based on electrical power provided by the power system 9095. The power system 9095 includes a charger input 9096, a PMIC 9097, and a battery 9098.

In some embodiments, the peripheral interface 9050 can include one or more devices configured to be part of the computing system 9040, many of which have been defined above and/or described with respect to wrist-wearable devices shown in FIGS. 10A and 10B. For example, the peripheral interface 9050 can include one or more sensors 9051. Some example sensors include one or more pressure sensors 9052, one or more EMG sensors 9056, one or more IMU sensors 9058, one or more position sensors 9059, one or more capacitive sensors 9060, one or more force sensors 9061, and/or any other types of sensors defined above or described with respect to any other embodiments discussed herein.

In some embodiments, the peripheral interface can include one or more additional peripheral devices, including one or more Wi-Fi and/or Bluetooth devices 9068; one or more haptic assemblies 9062; one or more support structures 9063 (which can include one or more bladders 9064); one or more manifolds 9065; one or more pressure-changing devices 9067; and/or any other types of peripheral devices defined above or described with respect to any other embodiments discussed herein.

In some embodiments, each haptic assembly 9062 includes a support structure 9063, and at least one bladder 9064. The bladder 9064 (e.g., a membrane) is a sealed, inflatable pocket made from a durable and puncture-resistant material, such as thermoplastic polyurethane (TPU), a flexible polymer, or the like. The bladder 9064 contains a medium (e.g., a fluid such as air, inert gas, or even a liquid) that can be added to or removed from the bladder 9064 to change a pressure (e.g., fluid pressure) inside the bladder 9064. The support structure 9063 is made from a material that is stronger and stiffer than the material of the bladder 9064. A respective support structure 9063 coupled to a respective bladder 9064 is configured to reinforce the respective bladder 9064 as the respective bladder changes shape and size due to changes in pressure (e.g., fluid pressure) inside the bladder.

The device 9000 also includes a haptic controller 9076 and a pressure-changing device 9067. In some embodiments, the haptic controller 9076 is part of the computer system 9040 (e.g., in electronic communication with one or more processors 9077 of the computer system 9040). The haptic controller 9076 is configured to control operation of the pressure-changing device 9067, and, in turn, operation of the device 9000. For example, the controller 9076 sends one or more signals to the pressure-changing device 9067 to activate the pressure-changing device 9067 (e.g., turn it on and off). The one or more signals may specify a desired pressure (e.g., pounds per square inch) to be output by the pressure-changing device 9067. Generation of the one or more signals, and, in turn, the pressure output by the pressure-changing device 9067, may be based on information collected by the sensors in FIGS. 11A and 11B. For example, the one or more signals may cause the pressure-changing device 9067 to increase the pressure (e.g., fluid pressure) inside a haptic assembly 9062 at a first time, based on the information collected by the sensors in FIGS. 11A and 11B (e.g., the user makes contact with an artificial coffee mug). Then the controller may send one or more additional signals to the pressure-changing device 9067 that cause the pressure-changing device 9067 to further increase the pressure inside the haptic assembly 9062 at a second time after the first time, based on additional information collected by the sensors 9051. Further, the one or more signals may cause the pressure-changing device 9067 to inflate one or more bladders 9064 in a device 9000-A while one or more bladders 9064 in a device 9000-B remain unchanged. Additionally, the one or more signals may cause the pressure-changing device 9067 to inflate one or more bladders 9064 in a device 9000-A to a first pressure and inflate one or more other bladders 9064 in the device 9000-A to a second pressure different from the first pressure. Depending on the number of devices 9000 serviced by the pressure-changing device 9067, and the number of bladders therein, many different inflation configurations can be achieved through the one or more signals and the examples above are not meant to be limiting.

The device 9000 may include an optional manifold 9065 between the pressure-changing device 9067 and the devices 9000. The manifold 9065 may include one or more valves (not shown) that pneumatically couple each of the haptic assemblies 9062 with the pressure-changing device 9067 via tubing. In some embodiments, the manifold 9065 is in communication with the controller 9075, and the controller 9075 controls the one or more valves of the manifold 9065 (e.g., the controller generates one or more control signals). The manifold 9065 is configured to switchably couple the pressure-changing device 9067 with one or more haptic assemblies 9062 of the same or different devices 9000 based on one or more control signals from the controller 9075. In some embodiments, instead of using the manifold 9065 to pneumatically couple the pressure-changing device 9067 with the haptic assemblies 9062, the device 9000 may include multiple pressure-changing devices 9067, where each pressure-changing device 9067 is pneumatically coupled directly with a single (or multiple) haptic assembly 9062. In some embodiments, the pressure-changing device 9067 and the optional manifold 9065 are configured as part of one or more of the devices 9000 (not illustrated), while in other embodiments the pressure-changing device 9067 and the optional manifold 9065 are configured as external to the device 9000. A single pressure-changing device 9067 may be shared by multiple devices 9000.

In some embodiments, the pressure-changing device 9067 is a pneumatic device, hydraulic device, a pneudraulic device, or some other device capable of adding and removing a medium (e.g., fluid, liquid, gas) from the one or more haptic assemblies 9062.

The devices shown in FIGS. 13A to 13C may be coupled via a wired connection (e.g., via busing). Alternatively, one or more of the devices shown in FIGS. 13A to 13C may be wirelessly connected (e.g., via short-range communication signals).

The memory 9078 includes instructions and data, some or all of which may be stored as non-transitory computer-readable storage media within the memory 9078. For example, the memory 9078 can include one or more operating systems 9079, one or more communication interface applications 9081, one or more interoperability modules 9084, one or more AR processing applications 9085, one or more data management modules 9086, and/or any other type of data defined above or described with respect to any other embodiments discussed herein.

The memory 9078 also includes data 9088 that can be used in conjunction with one or more of the applications discussed above. The data 9088 can include device data 9090, sensor data 9091, and/or any other types of data defined above or described with respect to any other embodiments discussed herein.

Having thus described system-block diagrams and then example wearable devices, attention will now be directed to certain example embodiments.

Example Embodiments

Turning now to some example embodiments of the methods, devices, systems, and computer-readable storage media described earlier. In short, the descriptions below proceed by first discussing the paragraphs beginning with an A symbol, which are related to an aspect in which user gestures are identified from neuromuscular signals; following that is a discussion of paragraphs beginning with a B symbol, which relate to circuitry and components for gesture identification.

(A1) In one aspect, some embodiments include a method (e.g., the method 600) of power-efficient processing of neuromuscular signals to confirm occurrence of a predetermined event. In some embodiments, the method is performed at a wearable device (e.g., the wrist-wearable device 104) having memory (e.g., memory 6080 and/or 6050) and one or more processors (e.g., the processor(s) 6079 and/or 6049). The method includes: (i) obtaining a first set of neuromuscular signals from a neuromuscular-signal sensing component (e.g., the neuromuscular-signal sensing component 402) of a wearable device; (ii) after determining, using a low-power detector (e.g., the low-power detector 414) of the wearable device, that a respective neuromuscular signal of the first set of neuromuscular signals requires further processing to confirm that a predetermined in-air hand gesture has been performed at the wearable device: (a) processing multiple signals of the first set of neuromuscular signals using a high-power detector (e.g., the high-power detector 416) of the wearable device, the multiple neuromuscular signals including neuromuscular signals other than the respective neuromuscular signal, the high-power detector configured to detect a first number of in-air hand gestures while consuming a first amount of power from the wearable device and the low-power detector configured to detect a second number of in-air hand gestures, less than the first number of in-air hand gestures, while consuming a second amount of power from the wearable device that is less than the first amount of power from the wearable device; and (b) in accordance with a determination that the processing of the multiple signals using the high-power detector indicates that the predetermined in-air hand gesture did occur, registering an occurrence of the predetermined in-air hand gesture (e.g., as illustrated in FIGS. 1B and 1C); (iii) receiving a second set of neuromuscular signals from the neuromuscular-signal sensing component of the wearable device; and (iv) after determining, based on a respective neuromuscular signal of the second set of neuromuscular signals and using the low-power detector and not using the high-power detector, that a different predetermined in-air hand gesture, distinct from the predetermined in-hand gesture, was performed at the wearable device, performing an action in response to the different predetermined in-air hand gesture at the wearable device (e.g., as illustrated in FIG. 1G). In some embodiments, the low-power detector analyzes fewer signals than the high-power detector (e.g., the low-power detector analyzes one to three EMG channels, and the high-power detector analyzes eight EMG channels).

For example, the different predetermined in-air hand gestures can be of a group of predetermined in-air hand gestures that are associated with instant actions, e.g., actions that are activated without the need to use the high-power detector for further processing. In some embodiments, the method includes determining, based on a respective neuromuscular signal of the second set of neuromuscular signals and using only the low-power detector, that the different predetermined in-air hand gesture was performed at the wearable device. In some embodiments, the method includes, while maintaining the high-power detector in an inactive state, determining, based on a respective neuromuscular signal of the second set of neuromuscular signals and using the low-power detector, that the different predetermined in-air hand gesture was performed at the wearable device.

In some embodiments, instant actions include one or more stateless instant actions and/or one or more stateful instant actions. For example, instant actions may include an index-finger-double-tap gesture (e.g., a stateless action), a middle-finger-double-tap-gesture (e.g., a stateless action), an index-finger-double-hold gesture (e.g., a stateful action), a middle-finger-double-hold gesture (e.g., a stateful action), and/or a thumb-double-tap gesture (e.g., a stateless action). In some embodiments, the instant actions are based on an operating state of the wearable device. For example, a first set of instant actions is available while a camera application is active, and a second set of instant actions is available while a messaging application is active.

For example, when detecting certain types of in-air hand gestures an initial detection is made using a low-power detector and then subsequently confirmed using a high-power detector, while other in-air hand gestures (which can be referred to as instant-action hand gestures, including the different predetermined in-air hand gestures) can be detected using only the low-power detector and without a need to also utilize the high-power detector. Thus, power-efficient processing of neuromuscular signals can be achieved.

(A2) In some embodiments of A1, the predetermined in-air hand gesture comprises a wake gesture. For example, the wake gesture can be an in-air hand gesture in which the user's thumb double taps a side of the user's index finger. Another example is a double tap of the user's middle finger against the user's thumb. In selecting a wake gesture, of importance is that naturalistic actions that could accidentally trigger features are minimized such that double taps of the thumb or middle finger make good candidates as specific wake gestures, as they are less likely to be performed accidentally. In some embodiments, orientation of the user's hand when a wake gesture is performed is also important, such that the wake gesture is only recognized when the user's hand is oriented a particular way (e.g., requiring that the gesture be performed while the user's wrist is oriented a certain way to reduce false positives).

In some embodiments, the low-power detector is configured to identify one or more wake gestures and a plurality of instant actions (e.g., gestures corresponding to popular actions). In some embodiments, the high-power detector is configured to identify all other gestures corresponding to actions at the wearable device. For example, if the device is responsive to 20 different user gestures while in a particular state, the low-power detector may be configured to recognize five of those gestures and the high-power detector may be configured to recognize the other fifteen gestures.

(A3) In some embodiments of A1 or A2: (i) the predetermined in-air hand gesture includes a wake gesture followed by at least one other in-air hand gesture; and (ii) registering the occurrence of the predetermined in-air hand gesture includes: (a) registering an occurrence of the wake gesture to cause the high-power detector to be in an active state; and (b) registering an occurrence of the other in-air hand gesture to cause the wearable device to execute a function that corresponds to the other in-air gesture to perform an action within a user interface. For example, the user interface can be displayed on a display of the wearable device, or on a display of a device that is in communication with the wearable device (e.g., AR or VR glasses).

In some embodiments, the high-power detector remains in the active state for at least a preset amount of time. For example, the high-power detector transitions to an inactive state in accordance with the preset amount of time (e.g., 10 seconds, 30 seconds, or 1 minute) elapsing without registering occurrence of another in-air hand gesture. In some embodiments, registering the occurrence of the other in-air hand gesture causes the wearable device to perform an action within a user interface.

(A4) In some embodiments of any of A1-A3: (i) the neuromuscular-signal sensing component includes a plurality of neuromuscular-signal sensors that correspond to the high-power detector; (ii) while the high-power detector is in an active state, data from the plurality of neuromuscular-signal sensors is processed by the high-power detector; and (iii) while the high-power detector is in an inactive state, data from the plurality of neuromuscular-signal sensors is stored at the wearable device (e.g., stored in the buffers 412) and not processed by the high-power detector. For example, the sensors remain active while the high-power detector is inactive and data from the sensors is stored, at least temporarily, in a buffer. In this way, when the high-power detector is activated, it can process the data in the buffer to identify a recently performed gesture (rather than waiting for the user to perform another gesture).

(A5) In some embodiments of any of A1-A4: (i) prior to determining that the first set of neuromuscular signals requires further processing to confirm that the predetermined in-air hand gesture has been performed at the wearable device, the high-power detector is in an inactive state; and (ii) the method further includes, in accordance with determining that the first set of neuromuscular signals requires further processing to confirm that the predetermined in-air hand gesture has been performed at the wearable device, transitioning the high-power detector to an active state.

In some embodiments, the plurality of neuromuscular-signal sensors are active while the wearable device is in an active state and the high-power detector (which can include a machine-learning model, and can also include hardware components) is transitioned between active and inactive states based on information from the low-power detector or other sensor components, such as sensors 404 (e.g., an IMU component). In some embodiments, the high-power detector is transitioned based on information from an ultra-low-power detector (which can be used to wake up the low-power detector based on sensed muscular activations that can be separate from specific in-air hand gestures). In some embodiments, the high-power detector and the low-power detector consume less power while in the inactive state than while in the active state.

(A6) In some embodiments of any of A1-A5: (i) the low-power detector operates in a default-active state to process detected neuromuscular signals from the neuromuscular-signal sensing component; and (ii) the high-power detector operates in a default-inactive state in which it does not process neuromuscular signals in the absence of a trigger signal. For example, the high-power detector only processes detected neuromuscular signals after switching to an active state based on information received from the low-power detector. In some embodiments, the low-power detector is activated in accordance with activation of a gesture-sensing mode of the wearable device.

For example, the low-power detector can sense one or more predetermined in-air hand gestures used to "wake" the device. The low-power detector is used in this way to save power because the high-power detector (which can recognize more gestures) can use significantly more power to do so. For example, the low-power detector can be configured as a lighter-weight model (as compared to the high-power detector), such that it is built to recognize a small subset (e.g., 2-3) of specific in-air hand gestures (e.g., including a "wake" gesture and/or instant-action gestures). Performance of one of the small subset of specific in-air hand gestures can cause the high-power detector to be activated, and the high-power detector can then be used to confirm occurrence of the small subset of specific in-air hand gestures, and also to detect a larger set of in-air hand gestures (e.g., including the small subset of specific in-air hand gestures, plus at least eight other in-air hand gestures, examples of which are provided below).

The low-power detector can be used to help weed out false positives (alone or in combination with data from other sensors, such as data from an inertial measurement unit) so that the high-power detector is not analyzing every gesture performed, which would be a drain on the battery of the device. In some embodiments, when the low-power module is woken up, it also wakes up the high-power detector. Thus, in such embodiments, the high-power detector is asleep/inactive until the low-power mode is woken up, at which point the high-power detector is woken up as well.

(A7) In some embodiments of any of A1-A6, the method further includes, prior to using the low-power detector to determine that the respective neuromuscular signal of the first set of neuromuscular signals requires further processing to confirm that the predetermined in-air hand gesture has been performed at the wearable device, transitioning the low-power detector from an inactive state to an active state based on muscular activity detected via the neuromuscular-signal sensing component satisfying a muscular-activity wake-up criteria.

For example, the muscular-activity wake-up criteria can be one or more of (i) a minimum voltage level or threshold below which it is considered no activity, (ii) a specific spectral energy content, and (iii) a simple machine-learning model (which can be referred to herein as an ultra-low-power detector) that only identifies any muscle activity without classifying what gesture the muscle activity might be associated with. In some embodiments, the muscular activity is detected by a different type of sensor (e.g., an IMU sensor or an accelerometer) to, for example, detect muscle activity before any gesture has been performed and then wake up the low-power detector.

(A8) In some embodiments of A7, the method further includes, while the low-power detector is in the active state, in accordance with a determination that data from the neuromuscular-signal sensing component indicates that the muscular-activity wake-up criteria are no longer satisfied, transitioning the low-power detector to the inactive state.

In one example, the determination that the data from the neuromuscular-signal sensing component indicates that the muscular-activity wake-up criteria are no longer satisfied can be made when it is determined that no hand gesture has been performed over a threshold amount of time. The determination can also be made when any other example muscular-activity wake-up criterion discussed above is determined to no longer be satisfied (e.g., neuromuscular signals of a certain amplitude or having a certain spectral energy content are no longer detected). In some embodiments, an inactive state is when the low-power detector is powered off and/or non-operational. For example, the detector goes back to sleep mode 10 seconds after wake-up if no actions are detected.

(A9) In some embodiments of any of A1-A8, the method further includes, after performing the action in response to the different predetermined in-air hand gesture at the wearable device, transitioning both the high-power detector and the low-power detector to inactive states in accordance with a predetermined amount of time having elapsed.

In some embodiments, each detector is transitioned to the inactive state a preset amount of time after transitioning to the active state (e.g., after 20 seconds, 30 seconds, or 1 minute). In some embodiments, each detector is transitioned to the inactive state in accordance with a preset amount of time having elapsed since detection of a gesture (e.g., each subsequent gesture resets the time-out period).

(A10) In some embodiments of A9, during the predetermined amount of time, no respective neuromuscular signal is determined to require further processing to confirm that an in-air hand gesture has been performed at the wearable device. For example, the predetermined amount of time is used to manage power at the wearable device, while still ensuring that if another neuromuscular signal requires further processing, the high-power detector can remain in the active state to assist with further processing of that other neuromuscular signal. In some embodiments, the predetermined amount of time is based on an operating mode of the wearable device. In some embodiments, the predetermined amount of time is based on which applications, if any, are actively executing on the wearable device. In some embodiments, the predetermined amount of time is based on an orientation of the wearable device (e.g., the time period is longer if the user's arm is raised than if the user's arm is at their side).

In some embodiments, different timeout periods (e.g., the predetermined amount) can be utilized depending on whether any other in-air hand gestures are detected after the further processing to confirm occurrence of the predetermined in-air hand gesture. For instance, if no other in-air hand gesture is again detected, then the timeout period can be shortened (e.g., to be less than 30 seconds, such as 10 seconds), but, if another in-air hand gesture is again detected, the timeout period can be lengthened (e.g., to be equal to or greater than 30 seconds). This helps to ensure that the high-power detector is properly made available for detecting multiple gestures in sequence.

(A11) In some embodiments of any of A1-A10: (i) the first set of neuromuscular signals is stored in a buffer (e.g., the buffers 412) at the wearable device; and (ii) the high-power detector is configured to obtain the first set of neuromuscular signals from the buffer. In some embodiments, the buffer includes a FIFO buffer and/or a circular buffer. In some embodiments, the buffer includes respective storage for each of the neuromuscular signals. In some embodiments, the buffer stores digital signals that correspond to analog signals from the neuromuscular-signal sensing component. In some embodiments, the wearable device includes an ADC to convert the analog signals from the neuromuscular-signal sensing component to digital signals for storage in the buffer.

In some embodiments, the first set of neuromuscular signals is detected over a particular period of time; the high-power detector requires the buffer to include neuromuscular signals detected during a predetermined length of time to allow the high-power detector to detect whether the predetermined in-air hand gesture did occur; and in accordance with a determination that the particular period of time is less than the predetermined length of time, data is added to the buffer before the multiple signals are processed by using the high-power detector.

(A12) In some embodiments of A11, the method further includes, in accordance with a determination that the buffer has insufficient data to confirm that the predetermined in-air hand gesture has been performed at the wearable device. (i) selecting supplemental data (e.g., the gesture data 415) for the data in the buffer, including one or more of: (a) using machine learning to predict precursor neuromuscular signals; and (b) selecting a predefined set of precursor neuromuscular signals based on the data in the buffer; and (ii) aggregating the data in the buffer and the selected supplemental data.

In some embodiments, one or more default sets of data are available (e.g., stored) at the wearable device. In some embodiments, the sets of data correspond to popular (e.g., most used) gestures. For example, the system can attempt to match the incomplete data to the sets and select a set that aligns best with the incomplete set of data. In some embodiments, transmogrification can be utilized to use data from a buffer of the low-power detector with the high-power detector as well, e.g., can then allow the two detectors to consume data from the same buffer.

(A13) In some embodiments of A12, the method further includes, in accordance with a determination that the buffer has sufficient data to confirm that the predetermined in-air hand gesture has been performed at the wearable device, forgoing selecting supplemental data for the data in the buffer.

(A14) In some embodiments of any of A11-A13, a capacity of the buffer corresponds to a minimum length of a neuromuscular-signal-detection period during which the predetermined in-air hand gesture is performed. The neuromuscular-signal-detection period is thus the period of time when electrodes on the wearable device are picking up the neuromuscular signals that are causing performance of the predetermined in-air hand gesture.

In some embodiments, the length of the neuromuscular-signal-detection period is a length of time that is about 200-300 milliseconds (ms). Thus, remaining data in the buffer (e.g., if the buffer needs 1.6 seconds worth of data, then the remaining data would be everything except for the 200-300 ms of data when the gesture is being performed). In some embodiments, the other approximately 1.3 seconds of data in the buffer is used for false-positive suppression, not for identifying which gesture was actually performed. For example, when the high-power detector is activated, it requires a certain amount of buffer data to operate properly (e.g., it might need 1.6 seconds of buffer data to get its internal state accurate, so the predetermined length of time can be 1.6 seconds in this example).

(A15) In some embodiments of A1-A14, the method further includes: (i) determining, using the low-power detector, that another different predetermined in-air hand gesture was performed at the wearable device, the determination based on a respective neuromuscular signal of a third set of neuromuscular signals, where the another different predetermined in-air hand gesture is distinct from the different predetermined in-air hand gesture and the predetermined in-air hand gesture; and (ii) in response to determining that the another different predetermined in-air hand gesture was performed at the wearable device, performing another action at the wearable device, the another action being distinct from the action. For example, the different predetermined in-air hand gesture can be part of a group of predetermined in-air hand gestures that can be associated with instant actions, which can be actions that are activated without the need to use the high-power detector for further processing.

For example, the action caused by the different predetermined hand gesture can be referred to as a first instant action, which means generally that it is a wearable device action that can be processed and performed without needing to use the high-power detector (and/or some electrodes that might be primarily used in conjunction with the high-power detector). In some embodiments, rather than using only a low-power detector for detecting instant action associated in-air hand gestures, a two-stage modeling can be utilized.

(A16) In some embodiments of A15, the method further includes: (i) determining, by using the low-power detector, that one additional predetermined in-air hand gesture was performed at the wearable device, the determination based on a respective neuromuscular signal of a fourth set of neuromuscular signals, where the one additional predetermined in-air hand gesture is distinct from the another different predetermined in-air hand gesture, the different predetermined in-air hand gesture, and the predetermined in-air hand gesture; and (ii) in response to determining that the one additional predetermined in-air hand gesture was performed at the wearable device, performing yet another action at the wearable device, the yet another action being distinct from the action and the another action.

(A17) In some embodiments of A15 or A16, one or both of the action and the another action are performed while a display of the wearable device is in an off state. In some embodiments there is no display that corresponds to the action and/or the another action. For example, the gesture and action correspond to taking a picture, adjusting audio playback, or turning on a nearby light and the system operates without requiring a display.

(A18) In some embodiments of any of A1-A17, before registering the occurrence of the predetermined in-air hand gesture, evaluating data from a second sensor (e.g., a sensor 404) of the wearable device to confirm that the predetermined in-air hand gesture occurred at the wearable device, where the second sensor is distinct from the neuromuscular-signal sensing component.

EMG-based gesture detection is a function that consumes relatively significant amounts of power (e.g., as compared to an IMU-based gesture detection). In most circumstances, the most power consuming part of EMG-based gesture detection is the calculations for defining gestures. Thus, this part should not be always on for detecting wakeup gestures. IMU-based gesture detection can trigger false positives (e.g., the wakeup was unintentional). A false positive can result in significant power consumption as other components are activated to analyze and identify/recognize the potential gesture. To reduce power consumption and false positives, some of the systems described herein combine EMG-based and IMU-based detection (e.g., by operating only a subset of the EMG-based circuitry in conjunction with the IMU-based circuitry).

For example, the level of power consumption for the EMG-based detection is different for its subparts. For example, an EMG-based detection system may include an AFE, ADC, MCU and DSP. The AFE and ADC have constant power consumption. If the EMG sensor is active, the data constantly comes in to the AFE. However, relative to the MCU and DSP this power consumption can be very low. For example, the most power may be consumed when doing the gesture inference, e.g., the calculations to identify different gestures. Some embodiments introduce a state where both the IMU and EMG components are active for detecting a wakeup action. However, only a portion of the EMG components may be active to buffer input data, e.g., up to 100 samples in the buffer. In this example, no calculations are performed until a wakeup is triggered by the IMU components. Because the EMG data is buffered, a calculation can be performed quickly to determine if the IMU trigger is a false positive. If a gesture is confirmed, the remaining EMG circuitry can be activated; if it is not confirmed, the EMG circuitry can quickly return to a sleep mode until another IMU trigger occurs.

In some embodiments, the second sensor is a different type of sensor (e.g., the device uses a second type of sensor to lower false-positive rates). For example, evaluating IMU data can lower the false-positive rates from around 8%-9% to 3%-4%. In some embodiments, an IMU is used to confirm the in-air hand gesture to lower false-positive rates and save power. In some embodiments, data from the neuromuscular-signal sensing component is aggregated with data from the second sensor (e.g., an accelerometer), the aggregated data is input into a model (e.g., a machine learning model), and the model evaluates the aggregated data to confirm whether the predetermined in-air hand gesture occurred.

(A19) In some embodiments of any of A1-A18, the method further includes, in conjunction with determining, using the low-power detector, that the respective neuromuscular signal requires further processing, evaluating data from a second sensor of the wearable device to confirm that an in-air hand gesture occurred, where the second sensor is distinct from the neuromuscular-signal sensing component. For example, confirm that the respective neuromuscular signal should not be ignored. In some embodiments, there is a second type of sensor on the wrist-wearable device that can confirm whether a pre-determined in-air hand gesture has been performed.

(A20) In some embodiments of any of A17-A19, the second sensor of the wearable device is an inertial measurement unit (IMU). In some embodiments, the wearable device is configured to perform sensor fusion with IMU data and EMG data and to then aggregate all of the input data to be fed as a combined input to a machine-learning model (e.g., either of the low-power or high-power detectors) configured to process the combined input to detect whether an in-air hand gesture has been performed. The data from the second sensor (e.g., the IMU sensor in this example) can be used to help avoid false positives, which can be part of the processing that the machine-learning does or can be part of post-processing that occurs after a gesture has been detected to look at the data from the second sensor to determine whether the gesture might be a false positive (e.g., the IMU data reveals that there was a large amount of vibrations during the gesture so it might be determined that a particular in-air hand gesture was accidentally performed).

The problem of false positives with EMG-based gesture detection can be significant. In particular, a user's normal day-to-day hourly interactions can result in accidental detection of various EMG-based gestures, if those gestures are not filtered out properly. For example, false positive rates can be significantly reduced by also relying on IMU data to filter out the false positives. Without using the IMU data to further lower false positives, wake gestures might be detected erroneously which would further degrade the limited power and computing resources available to the wearable device.

(A21) In some embodiments of any of A1-A20, the neuromuscular-signal sensing component includes an IMU and/or an EMG sensor. In some embodiments, the neuromuscular-signal sensing component includes multiple channels (e.g., the channels 406) where each channel represents differential data from multiple sensors.

(A22) In some embodiments of any of A1-A21, the method further includes: (i) determining, using the low-power detector, that the respective neuromuscular signal of the first set of neuromuscular signals requires further processing to confirm that the predetermined in-air hand gesture has been performed at the wearable device; and (ii) in accordance with the determination that the respective neuromuscular signal of the first set of neuromuscular signals requires further processing, transitioning the high-power detector to an active state and transitioning the low-power detector to an inactive state (e.g., as illustrated in FIGS. 3A and 3B).

(A23) In some embodiments of A22, the method further includes, after registering the occurrence of the predetermined in-air hand gesture, transitioning the high-power detector to an inactive state and transitioning the low-power detector to an active state (e.g., as illustrated in FIGS. 3C and 3D).

(A24) In some embodiments of any of A1-A23: (i) the first set of neuromuscular signals is a set of analog signals; and (ii) the method further includes (a) converting the set of analog signals to a corresponding set of digital signals using an analog-to-digital converter (ADC) component; and (b) the determining that the respective neuromuscular signal requires further processing is based on analysis of a respective digital signal of the corresponding set of digital signals. In some embodiments, activation of the high-power detector includes adjusting operation of the ADC component (e.g., increasing a sample rate). In some embodiments, activation of the high-power detector includes adjusting operation of a digital signal processor (DSP), such as increasing a clock rate. In some embodiments, the DSP is a component of the high-power detector. For example, the DSP for use with the low-power detector can be running at a nominal frequency such as 200 MHz (higher clock rate typically means more power). The high-power model needs to run at real time, so that it may move the DSP to its highest clock rate (600 MHz or greater) to process the 1.6 seconds to populate the buffer.

(A25) In some embodiments of any of A1-A24: (i) the neuromuscular-signal sensing component includes a plurality of neuromuscular-signal sensors that correspond to the high-power detector; (ii) while the high-power detector is in an active state, each of the plurality of neuromuscular-signal sensors are active; and (iii) while the high-power detector is in an inactive state, at least a subset of the plurality of neuromuscular-signal sensors are inactive.

In embodiments in which the subset of the plurality of neuromuscular-signal sensors are also in the inactive state along with the high-power detector, then the neuromuscular-signal sensors that do remain active for use with the low-power detector can be intentionally selected to include those neuromuscular-signal sensors associated with particular muscle groups (e.g., the sensors above include only the flexor and extensor muscle groups, and not any of the other sensors).

For the embodiments that use fewer electrodes (e.g., only using three of eight) with the low-power detector, a training process can be utilized for determining which electrodes to use. In one example, models can be trained for different combinations of electrode usage, e.g., single, pair, six, or eight, and then a determination can be made as to which electrodes pairs and groups have the best performance (e.g., lowest false-positive rates).

In some embodiments, the at least a subset of the plurality of neuromuscular-signal sensors are activated in conjunction with activation of the high-power detector. In some embodiments, activating the high-power detector includes activating (e.g., powering) one or more previously inactive neuromuscular-signal sensors.

In another aspect, some embodiments include a method of power-efficient processing of neuromuscular signals to confirm occurrence of a predetermined event. In some embodiments, the method includes: (i) obtaining a first set of neuromuscular signals from a neuromuscular-signal sensing component of a wearable device (e.g., the wearable device 104); (ii) after determining, using a low-power detector of the wearable device, that the first set of neuromuscular signals require further processing to confirm that a predetermined in-air hand gesture has been performed at the wearable device: (a) processing the first set of neuromuscular signals using a high-power detector of the wearable device, the high-power detector configured to detect a first number of in-air hand gestures while consuming a first amount of power from the wearable device and the low-power detector configured to detect a second number of in-air hand gestures, less than the first number of in-air hand gestures, while consuming a second amount of power from the wearable device that is less than the first amount of power from the wearable device; and (b) in accordance with a determination that the processing indicates that the predetermined in-air hand gesture did occur, registering an occurrence of the predetermined in-air hand gesture; and (iii) receiving a second set of neuromuscular signals from the neuromuscular-signal sensing component of the wearable device; and (iv) after determining, using the low-power detector and not using the high-power detector, that a different predetermined in-air hand gesture, distinct from the predetermined in-hand gesture, was performed at the wearable device, performing an action in response to the different predetermined in-air hand gesture at the wearable device.

(B1) In another aspect, some embodiments include a wearable device including: (i) a plurality of analog frontends (AFEs) (e.g., the AFE component 410) configured to receive neuromuscular signals from a plurality of neuromuscular-signal sensors (e.g., the neuromuscular-signal sensing component 402); (ii) an analog-to-digital converter (ADC) coupled to an output of the plurality of AFEs configured to convert the received neuromuscular signals to corresponding digital signals; (iii) a buffer component (e.g., the buffers 412) coupled to an output of the ADC and configured to store the corresponding digital signals; (iv) a low-power detector component (e.g., the low-power detector 414) coupled to the buffer component and configured to analyze at least a first subset of the digital signals; and (v) a high-power detector component (e.g., the high-power detector 416) coupled to the buffer component and configured to analyze at least a second subset of the digital signals.

(B2) In some embodiments of B1, the wearable device further includes the plurality of neuromuscular-signal sensors coupled to the plurality of AFEs. For example, the plurality of neuromuscular-signal sensors are configured to generate multiple channels of neuromuscular data (e.g., each channel corresponding to a distinct muscle group). In this example, the low-power-detector component is configured to analyze a first channel of data and the high-power detector is configured to analyze two or more channels of data. In some embodiments, the buffer component includes a respective buffer for each neuromuscular-signal sensor and/or a buffer for each channel of neuromuscular signals.

(B3) In some embodiments of B1 or B2, the plurality of AFEs includes respective amplifiers for amplifying the received neuromuscular signals. In some embodiments, the AFEs include one or more signal filters (e.g., high-pass, band-pass, and/or low-pass filters). In some embodiments, the AFEs include respective ADCs.

(B4) In some embodiments of any of B1-B3, the low-power detector component comprises a microcontroller. In some embodiments, the low-power detector component is an ASIC component.

(B5) In some embodiments of any B1-B4, the high-power detector component comprises a system-on-chip (SoC) coupled to the low-power detector component. In some embodiments, the high-power detector component is an ASIC component (e.g., U55) or a microcontroller (MCU). In some embodiments, the high-power detector comprises one or more processors (e.g., CPUs) and a DSP. For example, the high-power-detector component uses more compute power and has a greater precision and accuracy for analyzing a gesture as compared to the low-power component.

(B6) In some embodiments of any of B1-B5, the low-power-detector component is configured to conditionally trigger activation (e.g., via the control line 424) of the high-power detector component based on analysis of the at least the first subset of the digital signals. For example, the low-power detector component is configured to generate a wake-up signal for the high-power detector component based on data from a first sensor and/or sensor channel. In some embodiments, the low-power detector is configured to wake the high-power detector in accordance with sufficient data being stored in the buffer component.

In some embodiments, one or more of the gestures described above (e.g., with respect to FIGS. 1A-1G, 2A-2H, and 3A-3D) are detected with an optical sensor (e.g., a camera) or sensors associated with an IMU rather than (or in addition to, via fusing the sensor inputs to detect the various gestures described herein) the one or more neuromuscular-signal sensors. In some embodiments, the one or more gestures described above (e.g., with respect to FIGS. 1A-1G, 2A-2H, and 3A-3D) are replaced with gestures performed by other parts of the user's body (e.g., head gestures, leg gestures, or torso gestures). As one example, a wake gesture can be detected using one or more of neuromuscular-signal sensors, data from an IMU, and cameras; as another example, a gesture can be a shaking of the user's head (as if the user is indicating "No") or a nodding of the user's head (as if the user is indicating "Yes").

In some embodiments, the wearable device detects neuromuscular signals traveling through the user's neck or back, which can be done using neuromuscular-signal sensors coupled with the VR goggles or the AR glasses in some example embodiments. In some embodiments, the one or more gestures described above (e.g., with respect to FIGS. 1A-1G, 2A-2H, and 3A-3D) are replaced with (or performed using) in-air hand gestures on a controller (e.g., a handheld controller or foot pedal controller). In some embodiments, the one or more in-air hand gestures described above (e.g., with respect to FIGS. 1A-1G, 2A-2H, and 3A-3D) are replaced with audio commands (e.g., spoken-word commands or non-word commands such as a tongue click).

In another aspect, some embodiments include a computing system with one or more processors and memory coupled to the one or more processors, the memory storing one or more programs configured to be executed by the one or more processors, the one or more programs including instructions for performing any of the methods described herein (e.g., methods 600, 700, and 800, as well as A1-A25 above).

In yet another aspect, some embodiments include a non-transitory computer-readable storage medium storing one or more programs for execution by one or more processors of a computing system, the one or more programs including instructions for performing any of the methods described herein (e.g., methods 600, 700, and 800, as well as A1-A25 above).

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for the purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of power-efficient processing of neuromuscular signals to confirm occurrence of a predetermined event, the method comprising:

obtaining a first set of neuromuscular signals from a neuromuscular-signal sensing component of a wearable device;

determining, using a low-power detector of the wearable device, that a respective neuromuscular signal of the first set of neuromuscular signals requires further processing to confirm that a predetermined in-air hand gesture has been performed at the wearable device:

processing the first set of neuromuscular signals using a high-power detector of the wearable device to generate processed neuromuscular signals, the high-power detector configured to detect a first set of in-air hand gestures while consuming a first amount of power from the wearable device and the low-power detector configured to detect a second set of in-air hand gestures while consuming a second amount of power from the wearable device, the second set of in-air hand gestures includes less in-air hand gestures than the first set of in-air hand gestures and the second amount of power is less than the first amount of power; and in accordance with a determination, based on the processed neuromuscular signals that the predetermined in-air hand gesture did occur, registering an occurrence of the predetermined in-air hand gesture;

receiving a second set of neuromuscular signals from the neuromuscular-signal sensing component of the wearable device; and after determining, based on a respective neuromuscular signal of the second set of neuromuscular signals and using the low-power detector and not using the high-power detector, that a different predetermined in-air hand gesture, distinct from the predetermined in-air hand gesture, was performed at the wearable device:

performing an action in response to the different predetermined in-air hand gesture at the wearable device.

2. The method of claim 1, wherein:

the predetermined in-air hand gesture includes a wake gesture followed by another in-air hand gesture; and registering the occurrence of the predetermined in-air hand gesture includes:

registering an occurrence of the wake gesture to cause the high-power detector to remain in an active state; and registering an occurrence of the another in-air hand gesture to cause the wearable device to execute a function that corresponds to the another in-air hand gesture performing an action within a user interface.

3. The method of claim 1, wherein:

the neuromuscular-signal sensing component includes a plurality of neuromuscular-signal sensors that correspond to the high-power detector;

while the high-power detector is in an active state, data from the plurality of neuromuscular-signal sensors is processed by the high-power detector; and while the high-power detector is in an inactive state, data from the plurality of neuromuscular-signal sensors is stored at the wearable device and not processed by the high-power detector.

4. The method of claim 1, wherein, prior to determining that the respective neuromuscular signal of the first set of neuromuscular signals requires further processing to confirm that the predetermined in-air hand gesture has been performed at the wearable device, the high-power detector is in an inactive state; and the method further comprises, in accordance with determining that the respective neuromuscular signal of the first set of neuromuscular signals requires further processing to confirm that the predetermined in-air hand gesture has been performed at the wearable device, transitioning the high-power detector to an active state.

5. The method of claim 1, wherein:

the low-power detector operates in a default active state to process detected neuromuscular signals from the neuromuscular-signal sensing component; and the high-power detector operates in a default inactive state in which it does not process neuromuscular signals in the absence of a trigger signal.

6. The method of claim 1, further comprising:

prior to using the low-power detector to determine that the respective neuromuscular signal of the first set of neuromuscular signals requires further processing to confirm that the predetermined in-air hand gesture has been performed at the wearable device:

transitioning the low-power detector from an inactive state to an active state based on muscular activity detected via the neuromuscular-signal sensing component satisfying a muscular-activity wake-up criterion.

7. The method of claim 6, further comprising:

while the low-power detector is in the active state:

in accordance with a determination that data from the neuromuscular-signal sensing component indicates that the muscular-activity wake-up criteria are no longer satisfied, transitioning the low-power detector to the inactive state.

8. The method of claim 1, further comprising:

after performing the action in response to the different predetermined in-air hand gesture at the wearable device, transitioning both the high-power detector and the low-power detector to inactive states in accordance with a predetermined amount of time having elapsed.

9. The method of claim 8, wherein, during the predetermined amount of time, no respective neuromuscular signal is determined to require further processing to confirm that an in-air hand gesture has been performed at the wearable device.

10. The method of claim 1, further comprising:

determining, using the low-power detector, that another different predetermined in-air hand gesture was performed at the wearable device, the determining based on a respective neuromuscular signal of a third set of neuromuscular signals, wherein the another different predetermined in-air hand gesture is distinct from the different predetermined in-air hand gesture and the predetermined in-air hand gesture; and in response to determining that the another different predetermined in-air hand gesture was performed at the wearable device, performing another action at the wearable device, the another action being distinct from the action.

11. The method of claim 1, further comprising:

before registering the occurrence of the predetermined in-air hand gesture, evaluating data from a second sensor of the wearable device to confirm that the predetermined in-air hand gesture occurred at the wearable device, wherein the second sensor is distinct from the neuromuscular-signal sensing component.

12. A non-transitory, computer-readable storage medium including instructions that when executed by a system including a wearable, cause the system to:

obtain a first set of neuromuscular signals from a neuromuscular-signal sensing component of a wearable device;

determine, using a low-power detector of the wearable device, that a respective neuromuscular signal of the first set of neuromuscular signals requires further processing to confirm that a predetermined in-air hand gesture has been performed at the wearable device:

process the first set of neuromuscular signals using a high-power detector of the wearable device to generate processed neuromuscular signals, the high-power detector configured to detect a first set of in-air hand gestures while consuming a first amount of power from the wearable device and the low-power detector configured to detect a second set of in-air hand gestures while consuming a second amount of power from the wearable device, the second set of in-air hand gestures includes less in-air hand gestures than the first set of in-air hand gestures and the second amount of power; and in accordance with a determination, based on the processed neuromuscular signals that the predetermined in-air hand gesture did occur, register an occurrence of the predetermined in-air hand gesture;

receive a second set of neuromuscular signals from the neuromuscular-signal sensing component of the wearable device; and after determining, based on a respective neuromuscular signal of the second set of neuromuscular signals and using the low-power detector and not using the high-power detector, that a different predetermined in-air hand gesture, distinct from the predetermined in-air hand gesture, was performed at the wearable device:

perform an action in response to the different predetermined in-air hand gesture at the wearable device.

13. The non-transitory, computer-readable storage medium of claim 12, wherein:

registering the occurrence of the predetermined in-air hand gesture includes:

registering an occurrence of the wake gesture to cause the high-power detector to remain in an active state; and registering an occurrence of the another in-air hand gesture to cause the wearable device to execute a function that corresponds to the another in-air hand gesture performing an action within a user interface.

14. The non-transitory, computer-readable storage medium of claim 12, wherein:

the neuromuscular-signal sensing component includes a plurality of neuromuscular-signal sensors that correspond to the high-power detector;

while the high-power detector is in an active state, data from the plurality of neuromuscular-signal sensors is processed by the high-power detector; and while the high-power detector is in an inactive state, data from the plurality of neuromuscular-signal sensors is stored at the wearable device and not processed by the high-power detector.

15. The non-transitory, computer-readable storage medium of claim 12, wherein:

the low-power detector operates in a default active state to process detected neuromuscular signals from the neuromuscular-signal sensing component; and the high-power detector operates in a default inactive state in which it does not process neuromuscular signals in the absence of a trigger signal.

16. The non-transitory, computer-readable storage medium of claim 12, further including instructions that cause the system to:

prior to using the low-power detector to determine that the respective neuromuscular signal of the first set of neuromuscular signals requires further processing to confirm that the predetermined in-air hand gesture has been performed at the wearable device:

transition the low-power detector from an inactive state to an active state based on muscular activity detected via the neuromuscular-signal sensing component satisfying a muscular-activity wake-up criterion.

17. The non-transitory, computer-readable storage medium of claim 16, further including instructions that cause the system to:

while the low-power detector is in the active state:

in accordance with a determination that data from the neuromuscular-signal sensing component indicates that the muscular-activity wake-up criteria are no longer satisfied, transition the low-power detector to the inactive state.

18. The non-transitory, computer-readable storage medium of claim 12, further including instructions that cause the system to:

after performing the action in response to the different predetermined in-air hand gesture at the wearable device, transition both the high-power detector and the low-power detector to inactive states in accordance with a predetermined amount of time having elapsed.

19. The non-transitory, computer-readable storage medium of claim 18, wherein, during the predetermined amount of time, no respective neuromuscular signal is determined to require further processing to confirm that an in-air hand gesture has been performed at the wearable device.

20. The non-transitory, computer-readable storage medium of claim 12, further including instructions that cause the system to:

before registering the occurrence of the predetermined in-air hand gesture, evaluate data from a second sensor of the wearable device to confirm that the predetermined in-air hand gesture occurred at the wearable device, wherein the second sensor is distinct from the neuromuscular-signal sensing component.

* * * * *